United States Patent
Lee et al.

(10) Patent No.: US 8,730,579 B2
(45) Date of Patent: May 20, 2014

(54) OPTICAL SHEET HAVING ENHANCED OPTICAL CHARACTERISTICS

(75) Inventors: Dae-Hwan Lee, Bucheon (KR); Woo-Tae Kim, Busan (KR); Kyoung-Soo Lee, Osan (KR); Suk Kim, Suwon (KR); Jae-Sun Hwang, Siheung (KR); Kwang-Joon An, Anyang (KR); Jin-Yong Chung, Yongin (KR); Dal-Seok Byun, Yongin (KR)

(73) Assignees: Dae-Hwan Lee, Bucheon (KR); TSC Optos Co. Ltd., Anseong (KR)

( * ) Notice: Subject to any disclaimer, the term of this patent is extended or adjusted under 35 U.S.C. 154(b) by 925 days.

(21) Appl. No.: 12/509,729

(22) Filed: Jul. 27, 2009

(65) Prior Publication Data

US 2010/0027294 A1 Feb. 4, 2010

(30) Foreign Application Priority Data

Jul. 29, 2008 (KR) .................. 10-2008-0074226
Jul. 29, 2008 (KR) .................. 10-2008-0074235
Oct. 17, 2008 (KR) .................. 10-2008-0101952

(51) Int. Cl.
*G02B 5/02* (2006.01)

(52) U.S. Cl.
USPC ........................................ 359/599

(58) Field of Classification Search
USPC ........... 359/599, 601, 614; 349/112; 428/156, 428/163, 167; 362/606, 607, 608, 615, 620, 362/626, 628
See application file for complete search history.

(56) References Cited

U.S. PATENT DOCUMENTS

| | | | |
|---|---|---|---|
| 6,771,335 B2 * | 8/2004 | Kimura et al. | 349/112 |
| 7,056,005 B2 | 6/2006 | Lee | |
| 7,137,718 B2 * | 11/2006 | Egashira | 362/19 |
| 7,289,202 B2 * | 10/2007 | Groess et al. | 356/239.2 |
| 7,401,967 B2 | 7/2008 | Wei et al. | |
| 7,710,512 B2 | 5/2010 | Lee | |
| 7,784,954 B1 * | 8/2010 | Coleman | 362/19 |

(Continued)

FOREIGN PATENT DOCUMENTS

| | | |
|---|---|---|
| CN | 1397827 | 2/2003 |
| CN | 2791693 | 6/2006 |

(Continued)

OTHER PUBLICATIONS

English abstract for CN2791693.

(Continued)

*Primary Examiner* — Stephone B. Allen
*Assistant Examiner* — Tamara Y Washington
(74) *Attorney, Agent, or Firm* — Fildes & Outland, P.C.

(57) ABSTRACT

An optical sheet includes a base film in which light is incident from a lower side, a plurality of prism patterns and a diffusion member. The prism patterns are protruded to be spaced apart from each other on the base film to enhance the front luminance of light incident from the lower side of the base film. The diffusion member is disposed between prism patterns to have a diffusion surface in parallel with the base film. The diffusion member includes a plurality of diffusion dots capable of enhancing the luminance uniformity of light incident from the lower side of the base film. Thus, front luminance and luminance uniformity may be enhanced due to a juxtaposition of the prism patterns and the diffusion portion, and the viewing angle of the LCD device may be enhanced.

14 Claims, 61 Drawing Sheets

(56) References Cited

U.S. PATENT DOCUMENTS

| | | |
|---|---|---|
| 8,025,934 B2 | 9/2011 | Jones et al. |
| 2009/0213464 A1* | 8/2009 | Kurachi et al. ............... 359/599 |
| 2012/0162773 A1* | 6/2012 | Kim et al. ..................... 359/599 |

FOREIGN PATENT DOCUMENTS

| | | |
|---|---|---|
| CN | 101071221 | 11/2007 |
| CN | 101137915 | 3/2008 |
| KR | 2005-14880 | 2/2005 |
| KR | 2007-112526 | 11/2007 |
| KR | 2007-117077 | 12/2007 |
| KR | 2008-12706 | 2/2008 |
| KR | 20080019803 | 3/2008 |

OTHER PUBLICATIONS

English abstract for CN101071221.
English abstract for CN1397827.
English abstract for CN101137915.
English abstract for KR20080019803.

\* cited by examiner 2412 2416'  2201

2636' 2635' 2622 2630'

OPTICAL SHEET HAVING ENHANCED OPTICAL CHARACTERISTICS

PRIORITY STATEMENT

This application claims priority under 35 U.S.C. §119 to Korean Patent Application No. 2008-74226, filed on Jul. 29, 2008, No. 2008-74235, filed on Jul. 29, 2008, and No. 2008-101952, filed on Oct. 17, 2008 in the Korean Intellectual Property Office (KIPO), the contents of which are herein incorporated by reference in their entireties.

BACKGROUND OF THE INVENTION

1. Field of the Invention

Example embodiments of the present invention relate to an optical sheet and a method of manufacturing the optical sheet. More particularly, example embodiments of the present invention relate to an optical sheet having enhanced optical characteristics and a method of manufacturing the optical sheet.

2. Description of the Related Art

Generally, a liquid crystal display (LCD) panel of an LCD device includes two substrates facing each other, and a liquid crystal layer interposed between the substrates. The LCD panel controls the light transmittance of the liquid crystal layer to display an image.

LCD devices have characteristics such as thinness, light weight, low driving voltage and low power consumption compared to those of other display devices, and thus the LCD devices have been used in many industrial fields and have been widely used for portable computers, communication devices, television sets, etc. However, since the LCD panel of an LCD device is a non-light-emitting device that is not capable of emitting light on its own, a backlight assembly for supplying light to the LCD panel is required in the LCD device.

The backlight assembly includes a light source and an optical sheet enhancing optical characteristics of light generated by the light source. The optical sheet includes a prism sheet, a diffusion sheet, a light guide plate, etc.

When the optical sheet includes various optical sheets, optical characteristics of a backlight assembly may be enhanced. However, when the number of the optical sheets is increased, assembly properties may be decreased and manufacturing costs may be increased.

In addition, defects due to scratches may be generated in an area where the optical sheets contact each other.

In addition, the viewing angle of an LCD device may be limited due to the thickness of the liquid crystal layer.

SUMMARY OF THE INVENTION

Example embodiments of the present invention provide an optical sheet having enhanced optical characteristics.

Example embodiments of the present invention also provide a method of manufacturing the above-mentioned optical sheet.

According to one aspect of the present invention, an optical sheet includes a base film in which light is incident from a lower side, a plurality of prism patterns and a diffusion member. The prism patterns are protruded to be spaced apart from each other on the base film to enhance the front luminance of light incident from the lower side of the base film. The diffusion member is disposed between prism patterns to have a diffusion surface in parallel with the base film. The diffusion member includes a plurality of diffusion dots capable of enhancing the luminance uniformity of light incident from the lower side of the base film.

According to another aspect of the present invention, an optical sheet includes a base film in which light is incident from a lower side, a plurality of prism patterns and a diffusion member. The prism patterns are protruded to be spaced apart from each other on the base film to enhance the front luminance of light incident from the lower side of the base film. The diffusion member is disposed between prism patterns to have a diffusion surface in parallel with the base film. The diffusion member includes a plurality of diffusion grooves enhancing luminance uniformity of light incident from the lower side of the base film.

According to still another aspect of the present invention, an optical sheet includes a base film, a plurality of prism patterns, a diffusion member and an auxiliary diffusion member. The base film includes a prism area, a diffusion area and an auxiliary diffusion area disposed between the prism area and the diffusion area are defined thereon. The prism patterns include a right-angle triangle shape being formed by inclined surfaces that are spaced apart from each other within the prism area on the base film. The diffusion member is disposed within the diffusion area on the base film and is disposed between adjacent lower sides of adjacent prism patterns. The diffusion member includes a diffusion surface parallel with the base film. The diffusion member includes a plurality of diffusion dots disposed on the diffusion surface. The auxiliary diffusion member is disposed within the auxiliary diffusion area to have the same material as the prism patterns and the diffusion member. The auxiliary diffusion member is integrally formed with the prism patterns and the diffusion member. The auxiliary diffusion member is disposed between adjacent upper sides of the prism patterns to refract or reflect light incident light therethrough.

According to still further another aspect of the present invention, an optical sheet includes a first base film and a light control film. The light control film includes a plurality of air tunnels, a plurality of prism patterns and an organic layer. The air tunnels are disposed on the first base film to be arranged in a direction parallel with the first base film. The prism patterns are attached on an upper surface of the first base film. The organic layer covers upper edges of the prism patterns to define upper surfaces of the air tunnels. Side surface edges of each of the air tunnels are rounded.

According to still further another aspect of the present invention, an optical sheet includes a first base film, a temporary adhesive layer and a second base film. The temporary adhesive layer is disposed on the first base film. The temporary adhesive layer includes a plurality of grooves formed thereon arranged in parallel with the first base film and a contact portion between adjacent grooves. The second base film is attached to the contact portion to cover the grooves.

According to still further another aspect of the present invention, an optical sheet includes a first base film, a first temporary adhesive layer, a second base film, a second temporary adhesive layer and a third base film. The first temporary adhesive layer is disposed on the first base film. The first temporary adhesive layer includes a plurality of first grooves formed thereon arranged in parallel with the first base film and a first contact portion between adjacent first grooves. The second base film is attached on the first contact portion to cover the first grooves. The second temporary adhesive layer is disposed on the second base film. The second temporary adhesive layer includes a plurality of second grooves formed thereon arranged in parallel with each other and a second contact portion between adjacent second grooves. The third base film is adhered on the second contact portion to cover the second grooves.

According to still further another aspect of the present invention, there is provided a method of manufacturing an optical sheet. In the method, a plurality of prism patterns is formed, which is extended in parallel with each other on a first base film. Then, a coating layer is coated on a second base film. Then, the second base film is arranged on the base substrate so that the coating layer faces the prism patterns. Then, upper portion of the prism patterns are inserted in the coating layer by pressing the second film toward the first base film. Then, the coating layer is cured to form an organic layer.

According to still further another aspect of the present invention, there is provided a method of manufacturing an optical sheet. In the method, a temporary adhesive coating layer is formed by depositing a temporary adhesive solution on a first base film. Then, a plurality of grooves is formed, which is arranged in parallel with the first base film and a contact portion between adjacent grooves by patterning the adhesive coating layer. Then, a second base film is adhered to the contact portion of the adhesive coating layer to cover the grooves.

According to still further another aspect of the present invention, there is provided a method of manufacturing an optical sheet. In the method, a photocurable resin is deposited on a first base film to form a photocurable coating layer. Then, the photocurable coating layer is patterned to form a plurality of grooves arranged in parallel with the first base film and a contact portion between adjacent grooves. Then, a second base film is temporarily adhered to the contact portion of the photocurable coating layer to cover the grooves. Then, the photocurable coating layer is cured.

According to the present invention, front luminance and luminance uniformity may be enhanced due to a juxtaposition of prism patterns and a diffusion portion, and the viewing angle of a liquid crystal display (LCD) device may be enhanced. Thus, the display quality of the LCD device may be enhanced. Moreover, recesses or protrusions which diffuse light rays by using refracting and reflecting characteristics is used in the LCD device without a diffuser diffusing light rays by using dispersion characteristics, so that the luminance of the LCD device may be enhanced.

In addition, air tunnels are formed within a light control film to enhance the front luminance of the LCD device. Moreover, an upper edge of the prism patterns is not exposed to an outer side thereof, so that scratches may be prevented in another optical sheet. Moreover, the optical sheet includes the diffusion portion or air capsules, so that the luminance uniformity of an LCD device may be enhanced. Moreover, an additional diffusion sheet is omitted, so that an assembly process of the LCD device may be simple and manufacturing costs of the LCD device may be decreased.

In addition, the optical sheet includes a temporary adhesive layer, so that defects due to external impacts may be easily repaired. Moreover, a temporary adhesive pattern according to the present invention maintains an active combination state, so that resistance to external impacts may be enhanced. Furthermore, the display quality of a display device may be improved through enhanced luminance, a viewing angle, etc., and the thickness of a backlight assembly or the LCD device may be decreased so that the display device may be manufactured in a slim form. Furthermore, the manufacturing process of the optical sheet may be simple, so that the defect rate of the optical sheet may be decreased so that manufacturing costs of the optical sheet may be decreased.

BRIEF DESCRIPTION OF THE DRAWINGS

The above and other features and advantages of the present invention will become more apparent by describing in detailed example embodiments thereof with reference to the accompanying drawings, in which.

DETAILED DESCRIPTION OF THE INVENTION

Figure 1:
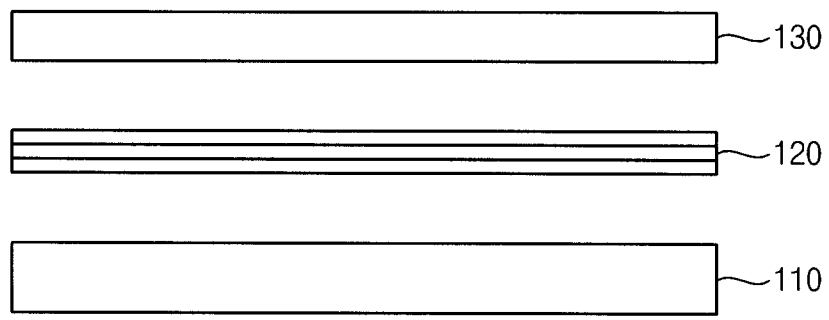
FIG. 1 is a cross-sectional view illustrating a liquid crystal display (LCD) device according to Example Embodiment 1.

The present invention is described more fully hereinafter with reference to the accompanying drawings, in which example embodiments of the present invention are shown. The present invention may, however, be embodied in many different forms and should not be construed as limited to the example embodiments set forth herein. Rather, these example embodiments are provided so that this disclosure will be thorough and complete, and will fully convey the scope of the present invention to those skilled in the art. In the drawings, the sizes and relative sizes of layers and regions may be exaggerated for clarity.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular example embodiments only and is not intended to be limiting of the present invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Example embodiments of the invention are described herein with reference to cross-sectional illustrations that are schematic illustrations of idealized example embodiments (and intermediate structures) of the present invention. As such, variations from the shapes of the illustrations as a result, for example, of manufacturing techniques and/or tolerances, are to be expected. Thus, example embodiments of the present invention should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, the present invention will be explained in detail with reference to the accompanying drawings.

Example Embodiment 1

FIG. 1 is a cross-sectional view illustrating a liquid crystal display (LCD) device according to Example Embodiment 1.

Referring to FIG. 1, the LCD device includes a light source module 110, an optical sheet 120 and an LCD panel 130.

The light source module 110 provides light toward the optical sheet 120. The light source module 110 may be classified as either a direct illumination type light source module or an edge illumination type light source module.

When the light source module 110 is a direct illumination type light source module, a plurality of light sources (not shown) such as a cold cathode fluorescent lamp (CCFL), a flat fluorescent lamp (FFL), a light-emitting diode (LED), etc., may be arranged on a plane.

When the light source module 110 is an edge illumination type light source module, the light source module 110 may include a light source such as a fluorescent lamp, an LED, etc., and a light guide plate (not shown) guiding light generated by the light source toward the optical sheet 120.

The optical sheet 120 is disposed on the light source module 110 to enhance optical characteristics of light generated by the light source module 110. For example, the optical sheet 120 may enhance front luminance, luminance uniformity, etc. The optical sheet 120 may include a diffusion plate, a diffusion sheet, a prism sheet, a semitransmissive film, a protective film, etc. In the present embodiment, the optical sheet 120 may include a prism sheet which will be described below.

The LCD panel 130 is disposed on the optical sheet 120 to display an image by transmitting light passing through the optical sheet 120 through a liquid crystal layer interposed between two substrates. Alternatively, instead of the LCD panel 130, various passive-type display panels such as an electrophoretic display device may be employed.

Figure 2:
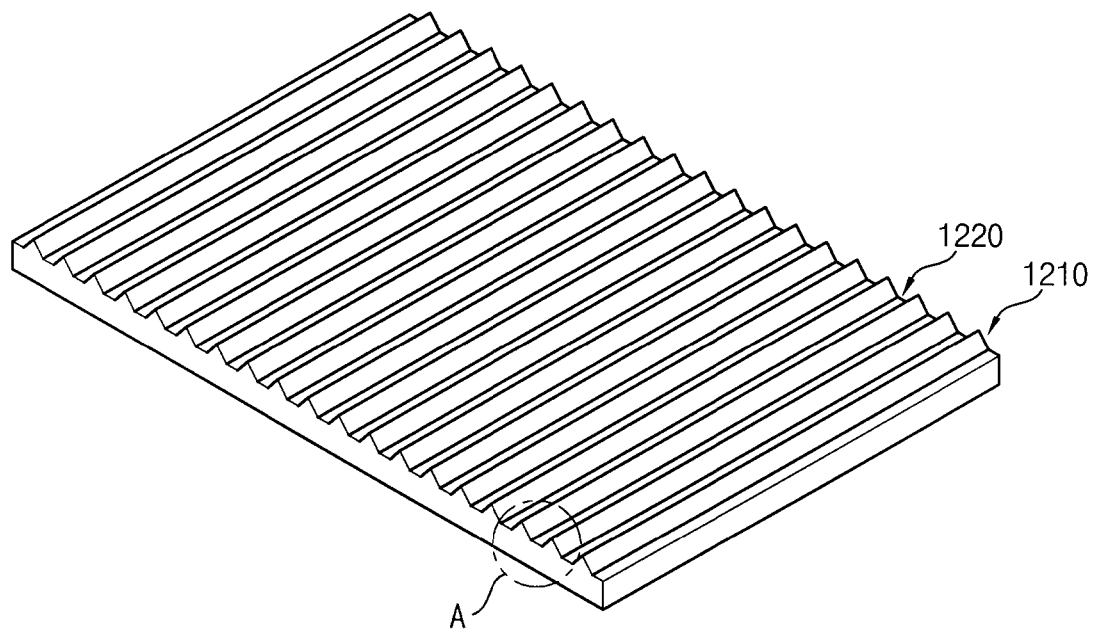
FIG. 2 is a perspective view illustrating the optical sheet of FIG. 1.
Figure 3:
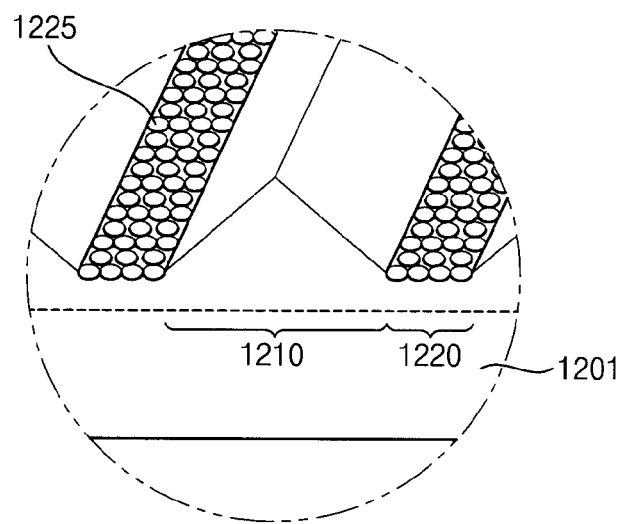
FIG. 3 is an enlarged perspective view of a portion 'A' of FIG. 2.

FIG. 2 is a perspective view illustrating the optical sheet of FIG. 1. FIG. 3 is an enlarged perspective view of a portion 'A' of FIG. 2.

Referring to FIGS. 2 and 3, the optical sheet includes a base film 1201, a prism pattern 1210 and a diffusion member 1220. In the present embodiment, the optical sheet may further include a plurality of prism patterns 1210 and a plurality of diffusion members 1220.

The base film 1201 may have a film shape. The base film 1201 may include a transparent synthetic resin. For example, the synthetic resin may include polyethylene terephthalate (PET), a methacrylic resin, an acrylic resin, a polycarbonate (PC) resin, a polyester resin, a vinyl chloride resin, etc. In the present embodiment, the base film 1201 includes polyethylene terephthalate (PET).

The prism patterns 1210 are spaced apart from each other on the base film 1201 to be protruded. In the present embodiment, the prism patterns 1210 integrally formed with the base film 1201.

The prism patterns 1210 have various many cross-sectional view shapes. In FIGS. 2 and 3, a cross-sectional view of each of the prism patterns 1210 may have an isosceles triangle shape. In this case, a cross-section of each of the prism patterns 1210 may have a right-angle triangle shape. In another embodiment, a cross-section of each of the prism patterns 1210 may have three to thirty-two sides. For example, a lower side of each of the prism patterns 1210 may have a trapezoidal shape, a pentagonal shape, a heptagonal shape, etc.

When a cross-section of each of the prism patterns 1210 has an isosceles triangle shape, a vertex of the isosceles triangle shape may have a range of about 1 degree to about 179 degrees.

The prism patterns 1210 include a transparent synthetic resin. In the present embodiment, the prism patterns 1210 includes a photocurable material, a thermosetting material, etc., and includes a different material from that of the base film 1201. In this case, the prism patterns 1210 guides light incident from the base film 1201 in a vertical direction to the base film 1201, so that the front luminance of the LCD device may be enhanced.

The diffusion member 1220 is disposed between the prism patterns 1210. The diffusion member 1220 is disposed between side surfaces of adjacent prism patterns 1210. For example, the diffusion member 1220 may be integrally formed with the base film 1201 and the prism patterns 1210. The diffusion member 1220 and the prism patterns 1210 are formed from the same layer.

A diffusion surface of the diffusion member 1220 is parallel with the base film 1201.

A plurality of diffusion dots is formed through the diffusion surface of the diffusion member 1220. In the present embodiment, the diffusion dots include a plurality of recesses 1225 formed thereon. The recesses 1225 are inserted into each of the prism patterns 1210 toward a direction opposite to a protrusion direction of each of the prism patterns 1210 with respect to the diffusion surface.

When viewed from a plan view, centers of adjacent recesses 1225 are arranged in a triangle shape. Alternatively, centers of adjacent recesses may be arranged in a rectangular shape.

For example, the recesses 1225 may have a hemispherical shape. That is, when viewed from a plan view, the prism patterns 1210 have a shape extended in a first direction; however, each of the recesses 1225 has a circular dot shape. Alternatively, each of the recesses 1225 may have various shapes such as an elliptical dot shape, a polygonal dot shape, etc.

In the present embodiment, the recesses 1225 are disposed adjacent to each other. In another embodiment, the recesses 1225 are spaced apart from each other, and a planar portion may be between adjacent recesses 1225.

Figure 4A:
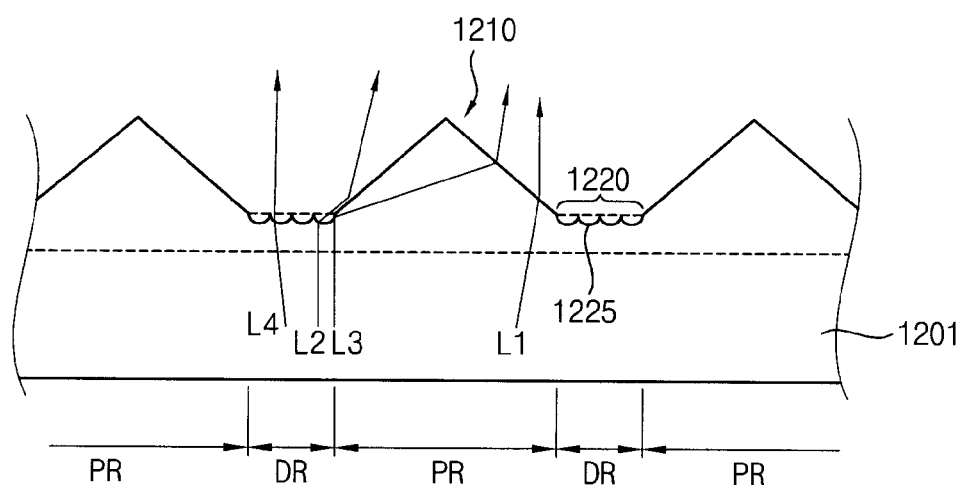
FIG. 4A is a cross-sectional view illustrating light rays transmitting through the optical sheet of FIG. 3.
Figure 4B:
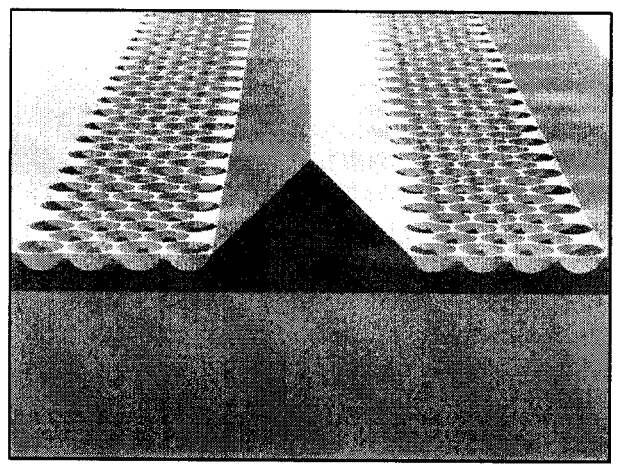
FIG. 4B is an image showing the optical sheet of FIG. 4A.

FIG. 4A is a cross-sectional view illustrating light rays transmitting through the optical sheet of FIG. 3. FIG. 4B is an image showing the optical sheet of FIG. 4A.

Referring to FIGS. 1, 2, 3, 4A and 4B, light rays L1, L2, L3 and L4 generated by the light source module 110 are incident to a lower surface of the base film 1201. The optical sheet includes a prism area PR corresponding to the prism patterns 1210 and a diffusion area DR corresponding to the diffusion member 1220.

The light ray L1 traveling toward the prism area PR of the optical sheet is refracted at an outer surface of the prism patterns 1210 to be guided in a vertical direction of the base film 1201.

The light rays L2, L3 and L4 traveling toward the diffusion area DR of the optical sheet are diffused by the recesses 1225 of the diffusion member 1220.

A portion of the light rays traveling toward the diffusion area DR is refracted by the recesses 1225, and then is fully reflected by an outer side of each of the prism patterns 1210 to be guided in a vertical direction of the base film 1201.

Moreover, a portion of the light ray L3 traveling toward the diffusion area DR is fully reflected by a surface of the recesses 1225, and then is refracted by each of the prism patterns 1210 to be guided in a vertical direction of the base film 1201.

In this case, a portion of the light ray L4 traveling toward the diffusion area DR is also refracted by the recesses 1225, and then is directly incident to the LCD panel 130.

In the present embodiment, the recesses 1235 of the diffusion member 1230 may perform a micro-lens which refracts or reflects the light rays L2, L3 and L4.

According to the present embodiment, the prism patterns 1210 and the diffusion portion 1230 are placed side by side, so that front luminance and luminance uniformity are simultaneously enhanced.

Moreover, the recesses 1225 which diffuses light rays by using refracting and reflecting characteristics is used in the LCD device without a diffuser diffusing light rays by using dispersion characteristics, so that the luminance of the LCD device may be enhanced.

Example Embodiment 2

Figure 5A:
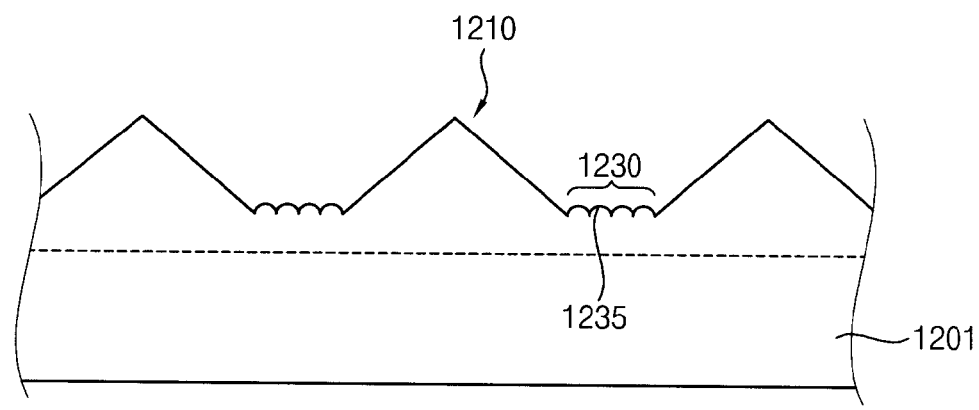
FIG. 5A is a cross-sectional view illustrating an optical sheet according to Example Embodiment 2 of the present invention.
Figure 5B:
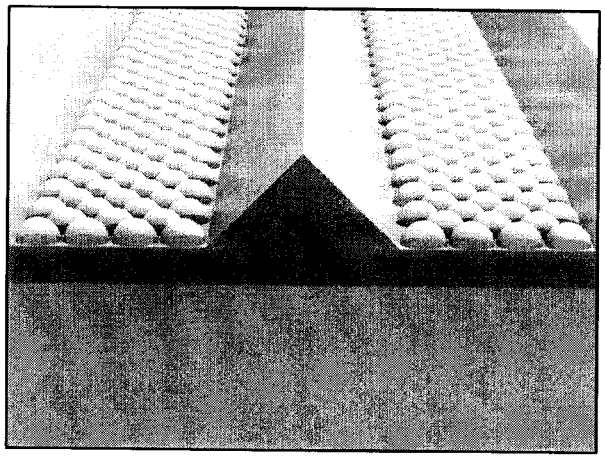
FIG. 5B is an image showing the optical sheet of FIG. 5A.

FIG. 5A is a cross-sectional view illustrating an optical sheet according to Example Embodiment 2 of the present invention. FIG. 5B is an image showing the optical sheet of FIG. 5A. In the present embodiment, the optical sheet is substantially the same as the optical sheet of Example Embodiment 1 except for the diffusion member, and thus any further detailed descriptions concerning the same elements will be omitted.

Referring to FIGS. 5A and 5B, the diffusion member 1230 is disposed between the prism patterns 1210.

A plurality of protrusion portions 1235 is formed on a diffusion surface of the diffusion member 1230. The protrusion portions 1235 are protruded in a direction identical to a protrusion direction of each of the prism patterns 1210 with respect to the diffusion surface.

For example, the protrusion portions 1235 may have a hemispherical shape. That is, the prism patterns 1210 have a shape extended in a first direction when viewed from a plan view; however, each of the protrusion portions 1235 has a circular dot shape. Alternatively, each of the protrusion portions 1235 may have an elliptical dot shape, a polygonal dot shape, etc. In another embodiment, each of the protrusion portions 1235 may have a random polygonal pattern.

In the present embodiment, the protrusion parts 1235 are disposed adjacent to each other. In another embodiment, the protrusion parts 1235 are disposed adjacent to each other, and a planar portion may be between adjacent protrusion parts 1235.

Figure 5C:
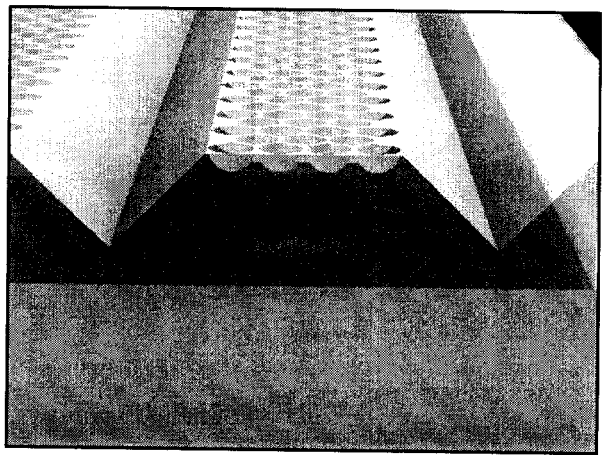
FIG. 5C is an image showing an optical sheet according to another embodiment of the present invention.

FIG. 5C is an image showing an optical sheet according to another embodiment of the present invention. In the present embodiment, the optical sheet is substantially the same as the optical sheet of Example Embodiment 2 except for the diffusion member, and thus any further detailed descriptions concerning the same elements will be omitted.

Referring to FIG. 5C, the diffusion member is disposed on a prism pattern, and a plurality of recesses is formed on a diffusion surface parallel with a base substrate. The recesses have a hemispherical shape.

Figure 5D:
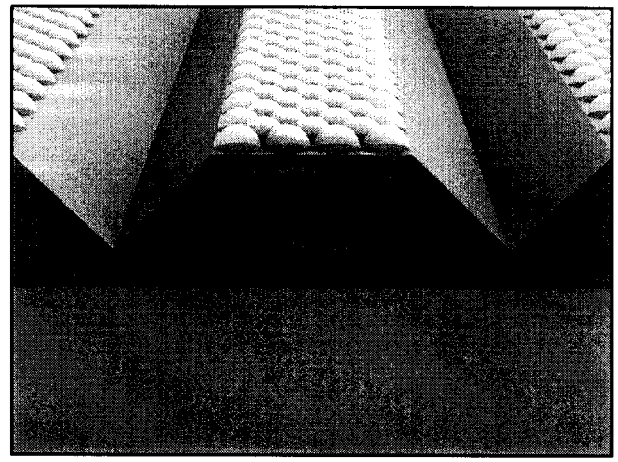
FIG. 5D is an image showing an optical sheet according to still another embodiment of the present invention.

FIG. 5D is an image showing an optical sheet according to still another embodiment of the present invention. In this embodiment, the optical sheet is substantially the same as the optical sheet of FIG. 5C except for the diffusion member, and thus any further detailed descriptions concerning the same elements will be omitted.

Referring to FIG. 5D, a plurality of protrusion portions is formed on a diffusion surface of the diffusion member. The protrusion portions have a hemispherical shape.

Example Embodiment 3

Figure 6:
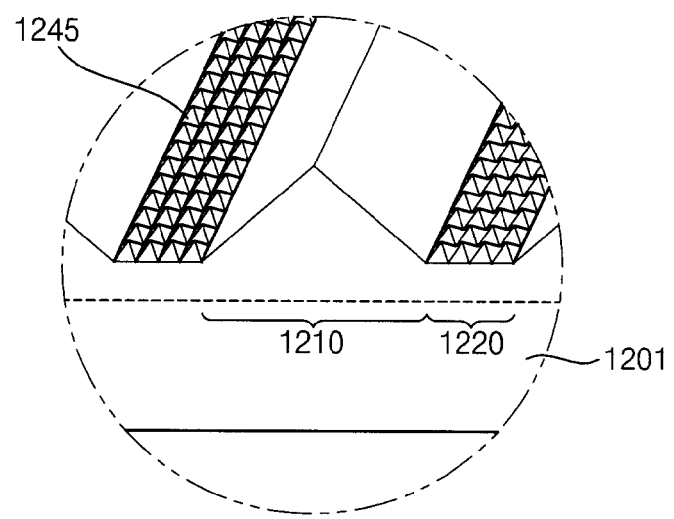
FIG. 6 is a perspective view illustrating an optical sheet according to Example Embodiment 3 of the present invention.
Figure 7A:
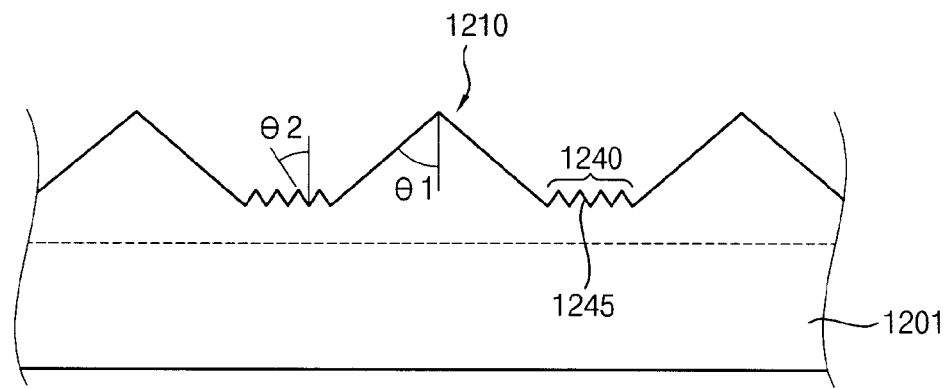
FIG. 7A is a cross-sectional view illustrating the optical sheet of FIG. 6.
Figure 7B:
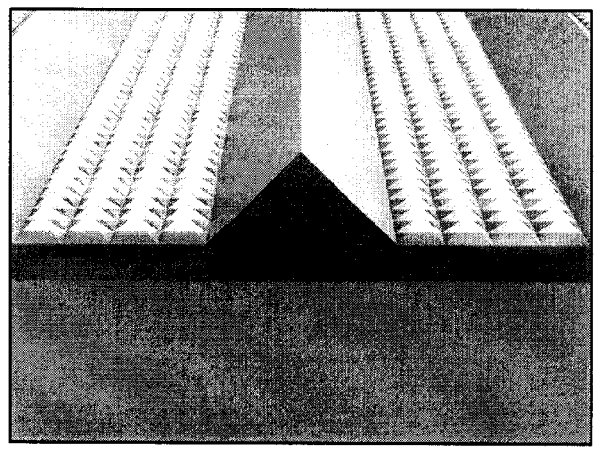
FIG. 7B is an image showing the optical sheet of FIG. 6.

FIG. 6 is a perspective view illustrating an optical sheet according to Example Embodiment 3 of the present invention. FIG. 7A is a cross-sectional view illustrating the optical sheet of FIG. 6. FIG. 7B is an image showing the optical sheet of FIG. 6. In the present embodiment, the optical sheet is substantially the same as the optical sheet of Example Embodiment 1 except for the diffusion member, and thus any further detailed descriptions concerning the same elements will be omitted.

Referring to FIGS. 6, 7A and 7B, a plurality of recesses 1245 is formed on a diffusion surface of the diffusion member 1240. The recesses 1245 are depressed in a direction opposite to a protrusion direction of each of the prism patterns 1210 with respect to the diffusion surface. In another embodiment, a plurality of protrusion portions (not shown) may be formed to be protruded in a direction identical to a protrusion direction of each of the prism patterns 1210 on the diffusion surface.

For example, the recesses 1245 may have a pyramid shape. That is, the prism patterns 1210 have a shape extended in a first direction; however, each of the recesses 1245 has a rectangular dot shape.

In FIG. 7A, an interior angle θ1 of a vertex of each of the prism patterns 1210 is different from an interior angle θ2 of a vertex of each of the recesses 1245 with respect to a vertical direction of the base film 1201. For example, the interior angle θ1 of the vertex of each of the prism patterns 1210 may be greater than the interior angle θ2 of the vertex of each of the recesses 1245.

In the present embodiment, the recesses 1245 are disposed adjacent to each other. In another embodiment, the recesses 1245 may be disposed to be spaced apart from each other, and a flat portion may exist between adjacent recesses 1245.

Figure 7C:
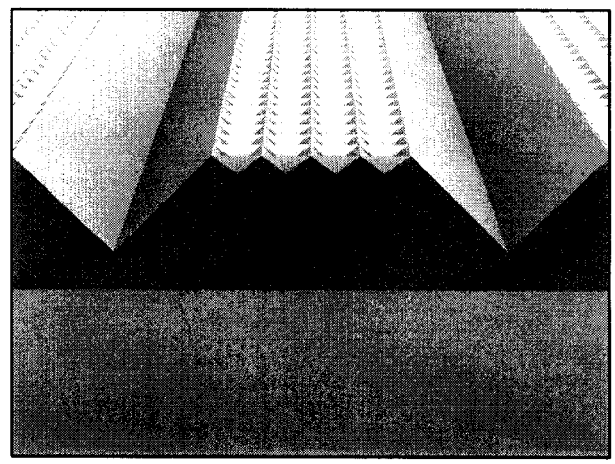
FIG. 7C is an image showing an optical sheet according to another embodiment of the present invention.

FIG. 7C is an image showing an optical sheet according to another embodiment of the present invention. In the present embodiment, the optical sheet is substantially the same as the optical sheet of Example Embodiment 3 except for the diffusion member, and thus any further detailed descriptions concerning the same elements will be omitted.

Referring to FIG. 7C, the diffusion member is disposed on a prism pattern, and a plurality of recesses is formed on a diffusion surface parallel with a base substrate. The recesses have a pyramid shape.

Example Embodiment 4

Figure 8:
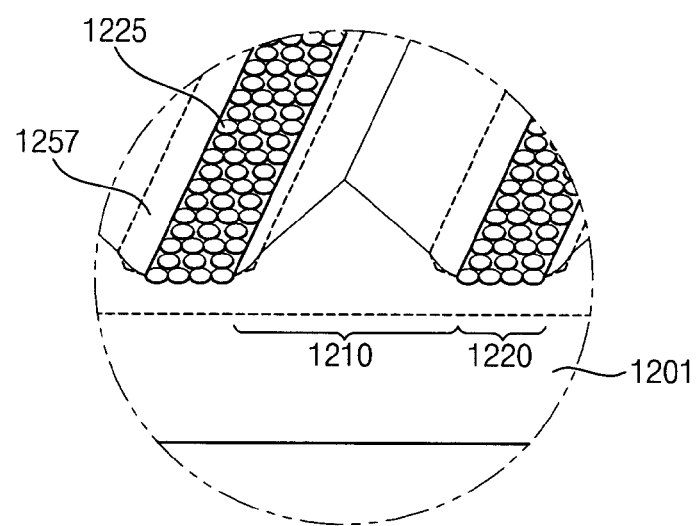
FIG. 8 is a perspective view illustrating an optical sheet according to Example Embodiment 4 of the present invention.
Figure 9:
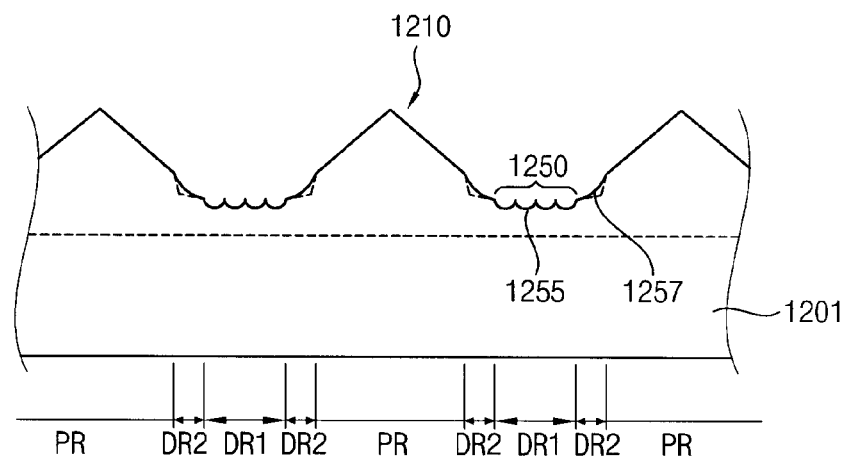
FIG. 9 is a cross-sectional view illustrating the optical sheet of FIG. 8.

FIG. 8 is a perspective view illustrating an optical sheet according to Example Embodiment 4 of the present invention. FIG. 9 is a cross-sectional view illustrating the optical sheet of FIG. 8. In the present embodiment, the optical sheet is substantially the same as the optical sheet of Example Embodiment 1 except for an auxiliary diffusion member, and thus any further detailed descriptions concerning the same elements will be omitted.

Referring to FIGS. 8 and 9, the optical sheet includes a base film 1201, a plurality of prism patterns 1210, a diffusion member 1250 and an auxiliary diffusion member 1257. In the present embodiment, a prism area PR corresponding to the prism patterns 1210, a diffusion area DR1 corresponding to the diffusion member 1250 and an auxiliary diffusion area DR2 corresponding to the auxiliary diffusion member 1257 are defined on the optical sheet.

The diffusion member 1250 is disposed between adjacent prism patterns 1210. In the present embodiment, the diffusion member 1250 is spaced apart from the adjacent prism patterns 1210.

A plurality of recesses 1255 is formed on a diffusion surface of the diffusion member 1250.

The auxiliary diffusion member 1257 is disposed between the diffusion member 1250 and the prism patterns 1210 to connect the diffusion member 1250 and the prism patterns 1210.

The auxiliary diffusion member 1257 has a slightly curved surface shape parallel with the prism patterns 1210 to refract or reflect light which travels to the auxiliary diffusion area DR2, so that the auxiliary diffusion member 12557 may enhance the front luminance and luminance uniformity of the LCD device. In the present embodiment, the auxiliary diffusion member 1250 may have various shapes such as a protruding portion, a recess, etc.

In the present embodiment, the prism patterns 1210, the diffusion member 1250 and the auxiliary diffusion member 1257 are formed from the same layer, and are integrally formed with the base film 1201.

According to the present embodiment, the optical sheet has the auxiliary diffusion member 1257, so that the front luminance and luminance uniformity of the LCD device may be enhanced.

Example Embodiment 5

Figure 10:
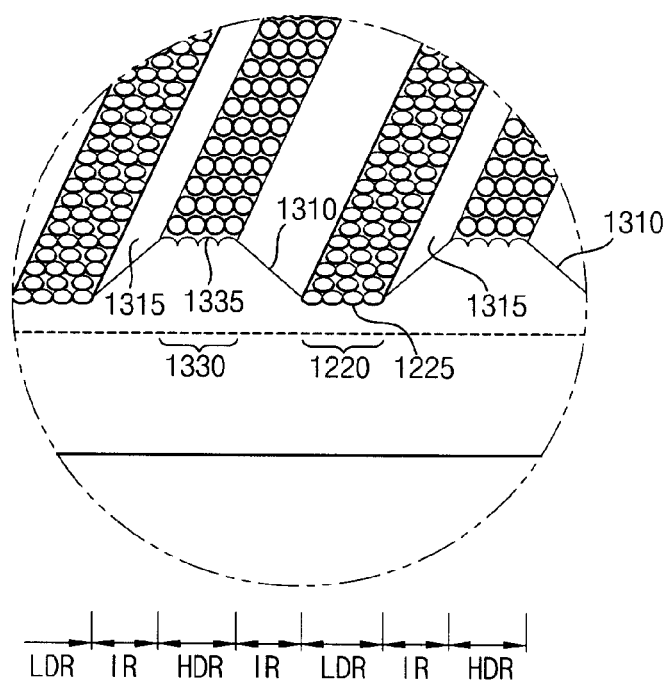
FIG. 10 is a perspective view illustrating an optical sheet according to Example Embodiment 5 of the present invention.

FIG. 10 is a perspective view illustrating an optical sheet according to Example Embodiment 5 of the present invention. In the present embodiment, the optical sheet is substantially the same as the optical sheet of Example Embodiment 1 except for a prism pattern and an auxiliary diffusion member, and thus any further detailed descriptions concerning the same elements will be omitted.

Referring to FIG. 10, the optical sheet includes a base film 1201, a plurality of prism patterns 1310 and 1315, a diffusion member 1220 and an auxiliary diffusion member 1330. In the present embodiment, a prism area PR which corresponds to the prism patterns 1310, a diffusion area LDR1 which corresponds to the diffusion member 1220 and an auxiliary diffusion area HDR which corresponds to the auxiliary diffusion member 1330 are defined on the optical sheet.

The prism patterns 1310 and 1315 are disposed on the base film 1201 to be spaced apart from each other. In the present embodiment, the prism patterns 1310 and 1315 have rectangular shapes which face each other. The prism members 1310 and 1315 and the base film 1201 are integrally formed with a photocurable resin.

The diffusion member 1220 is disposed between adjacent lower sides of adjacent prism patterns 1310 and 1315 to connect the adjacent lower sides thereof.

A plurality of recesses 1225 is formed on a diffusion surface of the diffusion member 1220. In the present embodiment, each of the recesses 1225 has a hemispherical shape. In this case, each of the recesses 1225 may have an elliptical hemisphere shape, a polygonal pyramid shape, etc. In another embodiment, a plurality of protrusion portions (not shown) may be formed on the diffusion surface of the diffusion member 1220.

The auxiliary diffusion member 1330 is disposed between adjacent upper sides of adjacent prism patterns 1310 and 1315 to connect adjacent upper sides thereof.

A plurality of auxiliary protrusion portions 1335 is formed on an auxiliary diffusion surface of the auxiliary diffusion member 1330. In the present embodiment, each of the auxiliary protrusion portions 1335 has a hemispherical shape. Alternatively, each of the auxiliary protrusion portions 1335 may have a hemispherical shape, an elliptical hemisphere shape, a polygonal pyramid shape, etc. In another embodiment, a plurality of recesses (not shown) may be formed on the auxiliary diffusion surface of the auxiliary diffusion member 1330.

In the present embodiment, the prism patterns 1310 and 1315, the diffusion member 1220 and the auxiliary diffusion member 1330 has a photocurable resin to be integrally formed with the base film 1201.

Figure 11:
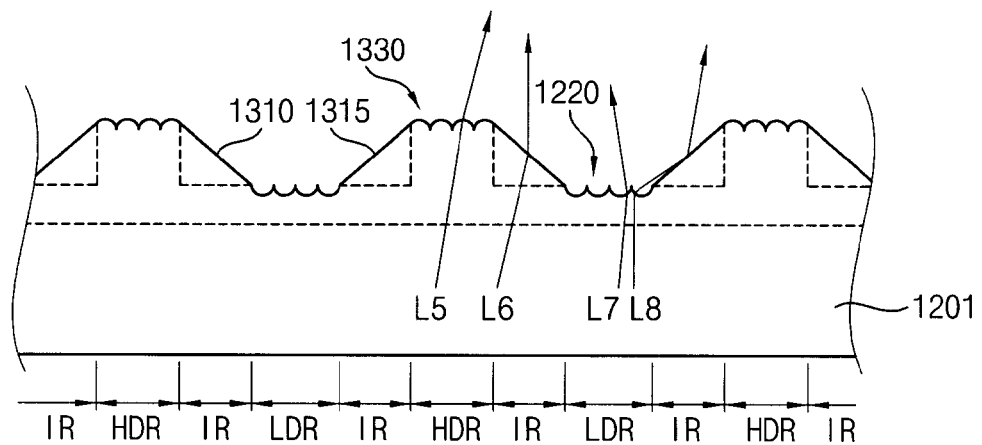
FIG. 11 is a cross-sectional view illustrating light rays transmitting through the optical sheet of FIG. 10.

FIG. 11 is a cross-sectional view illustrating light rays transmitting through the optical sheet of FIG. 10.

Referring to FIGS. 1, 10 and 11, light rays L5, L6, L7 and L8 generated from the light source module 110 are incident from a lower surface of the base film 1201. The optical sheet includes a prism area IR corresponding to the prism patterns 1310 and 1315, a diffusion area LDR corresponding to the diffusion member 1220, and an auxiliary diffusion area HDR corresponding to the auxiliary diffusion member 1330.

The light ray L6 traveling toward the prism area IR of the optical sheet is refracted on an outer surface of the prism patterns 1310 and 1315 to be guided in a direction perpendicular to the base film 1201.

Among the incident light rays L5, L6, L7 and L8, a portion of the light rays L7 and L8 which travel toward the diffusion area LDR of the optical sheet, that is, the light ray L7, is diffused by the recesses 1225 of the diffusion member 1220, and the remaining portion of the light rays, that is, the light ray L8 is diffused by the diffusion member 1220 to be diffused or refracted by the prism patterns 13010 and 1315.

The light ray L5 traveling toward the auxiliary diffusion area HDR of the optical sheet is diffused by the protrusions 1335 of the auxiliary diffusion member 1330.

In the present embodiment, the recesses 1225 of the diffusion member 1220 and the protrusions 1335 of the auxiliary diffusion member 1330 may perform a function of refracting or reflecting the light rays L5, L7 and L8.

According to the present embodiment, the optical sheet has the auxiliary diffusion member 1330, so that the front luminance and luminance uniformity of the LCD device may be enhanced.

Figure 12:
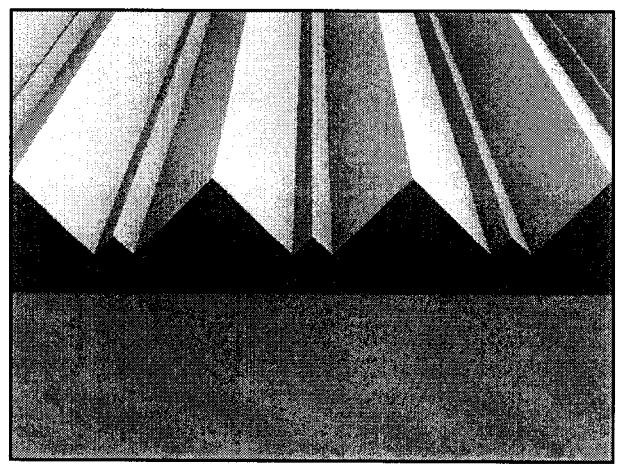
FIG. 12 is an image showing an optical sheet according to another embodiment of the present invention.

FIG. 12 is an image showing an optical sheet according to another embodiment of the present invention. In the present embodiment, the optical sheet is substantially the same as the optical sheet of Example Embodiment 1 except for the diffusion member, and thus any further detailed descriptions concerning the same elements will be omitted.

Referring to FIG. 12, the diffusion member is disposed between adjacent prism patterns to include a plurality of auxiliary prism patterns extended in a direction parallel with the prism patterns. In the present embodiment, an auxiliary prism pattern is disposed between adjacent prism patterns.

Figure 13:
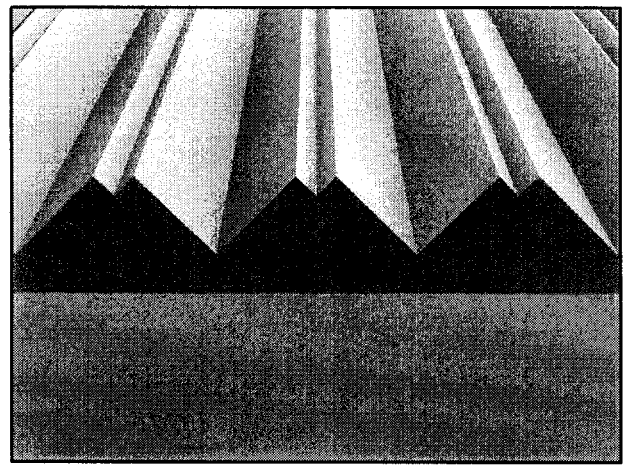
FIG. 13 is an image showing an optical sheet according to still another embodiment of the present invention.

FIG. 13 is an image showing an optical sheet according to still another embodiment of the present invention. In the present embodiment, the optical sheet is substantially the same as the optical sheet of Example Embodiment 1 except for the diffusion member, and thus any further detailed descriptions concerning the same elements will be omitted.

Referring to FIG. 13, the diffusion member is disposed on each of the prism patterns. The diffusion member includes a diffusion groove extended in a direction parallel with the prism patterns. In the present embodiment, the diffusion groove has a triangular cross-sectional shape.

Figure 14:
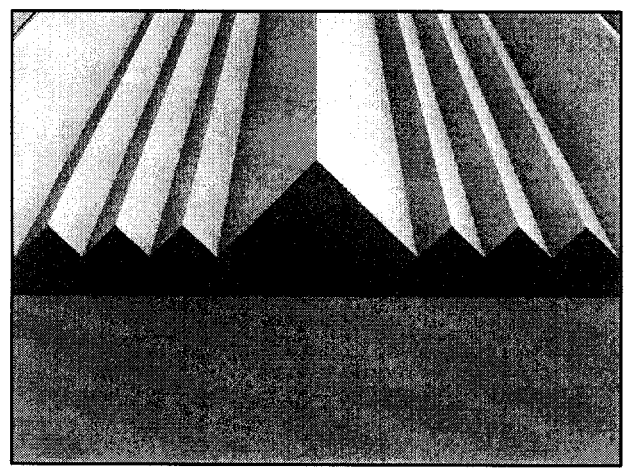
FIG. 14 is an image showing an optical sheet according to further still another embodiment of the present invention.

FIG. 14 is an image showing an optical sheet according to further still another embodiment of the present invention. In the present embodiment, the optical sheet is substantially the same as the optical sheet of Example Embodiment 1 except for the diffusion member, and thus any further detailed descriptions concerning the same elements will be omitted.

Referring to FIG. 14, the diffusion member is disposed between adjacent prism patterns to include a plurality of auxiliary prism patterns.

Figure 15:
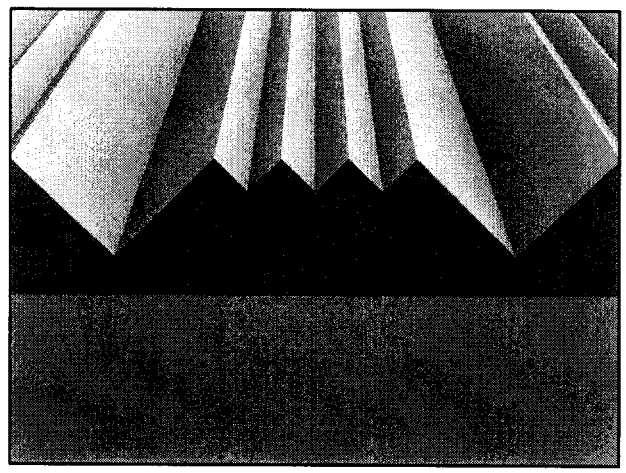
FIG. 15 is an image showing an optical sheet according to further still another embodiment of the present invention.

FIG. 15 is an image showing an optical sheet according to further still another embodiment of the present invention. In the present embodiment, the optical sheet is substantially the same as the optical sheet of Example Embodiment 1 except for the diffusion member, and thus any further detailed descriptions concerning the same elements will be omitted.

Referring to FIG. 15, the diffusion member is disposed on an upper portion of each of the prism patterns to have a plurality of diffusion grooves extended in a direction parallel with the prism patterns. In the present embodiment, each of the diffusion grooves has a triangular cross-sectional shape.

Figure 75:
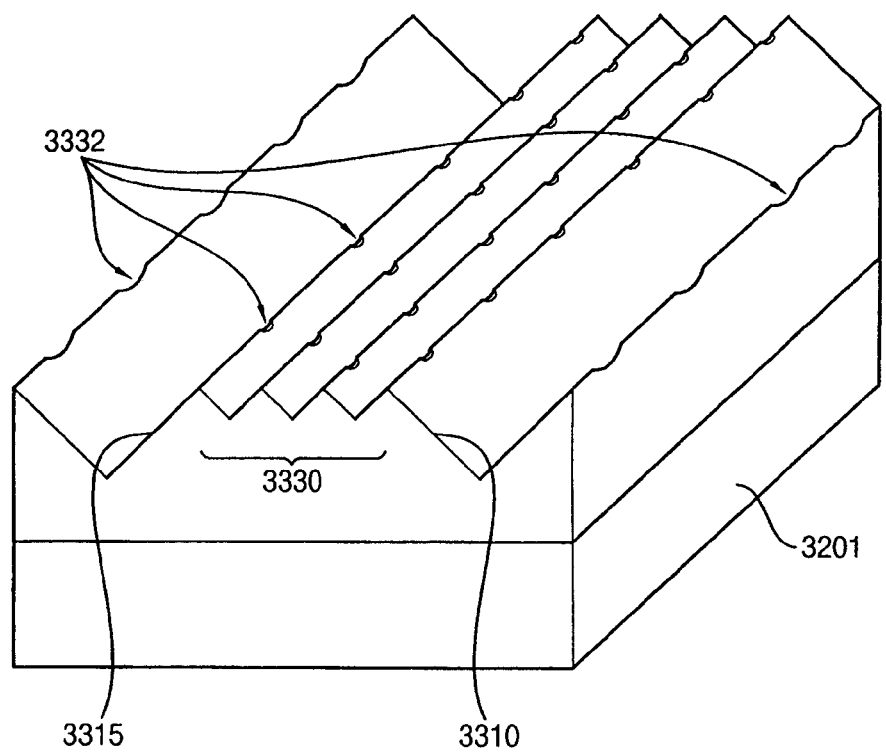
FIG. 75 is a perspective view illustrating an optical sheet according to another embodiment of the present invention.

FIG. 75 is a perspective view showing an optical sheet according to another further embodiment of the present invention. In this embodiment, the optical sheet is substantially the same as the optical sheet of FIG. 15 except for fine scratches or fine cracks. In FIG. 75, the optical sheet includes a base film 3201, a plurality of prism patterns 3310 and 3315 disposed on the base film 3201 to be spaced apart from each other, and a diffusion member 3330 disposed between adjacent upper sides of adjacent prism patterns 3310 and 3315 to connect adjacent upper sides thereof. In this embodiment, fine scratches 3332 or fine cracks are formed on surfaces of each of the prism patterns 3310 and 3315 and the diffusion dots, so that the luminance uniformity, viewing angle and half-power angle of the optical sheet may be enhanced.

According to the present invention, front luminance and luminance uniformity may be enhanced due to a juxtaposition of the prism patterns and the diffusion portion, and the viewing angle of the LCD device may be enhanced. Moreover, display defects such as white spots, black spots, a moiré phenomenon, etc., may be improved.

Moreover, recesses or protrusions which diffuse light rays by using refracting and reflecting characteristics is used in the LCD device without a diffuser diffusing light rays by using dispersion characteristics, so that the luminance of the LCD device may be enhanced.

Furthermore, the optical sheet has the auxiliary diffusion member, so that the front luminance and luminance uniformity of the LCD device may be enhanced.

Example Embodiment 6

Figure 16:
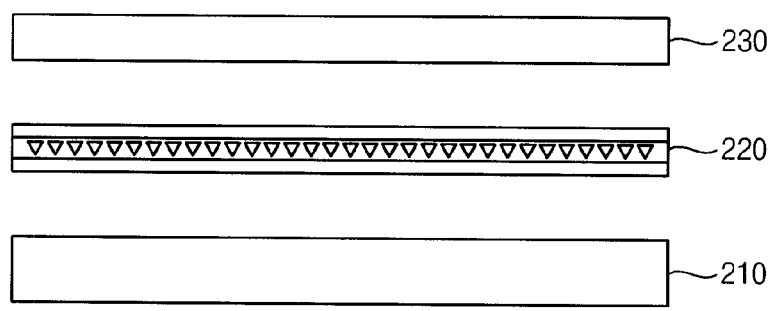
FIG. 16 is a cross-sectional view illustrating an LCD device according to Example Embodiment 6 of the present invention.

FIG. 16 is a cross-sectional view illustrating an LCD device according to Example Embodiment 6 of the present invention.

Referring to FIG. 16, the LCD device includes a light source module 210, an optical sheet 220 and an LCD panel 230.

The light source module 210 provides light to the optical sheet 220. The light source module 210 may include a direct illumination type light source module and an edge illumination type light source module.

When the light source module 210 is a direct illumination type light source module, a plurality of light sources (not shown) such as a CCFL, an FFL, an LED, etc., may be arranged on a plane.

When the light source module 210 is an edge illumination type light source module, the light source module 210 may include a light source such as a fluorescent lamp, an LED, etc., and a light guide plate (not shown) guiding light generated by the light source toward the optical sheet 220.

The optical sheet 120 is disposed on the light source module 110 to enhance optical characteristics of light generated by the light source module 110. In the present embodiment, the optical sheet 220 enhances front luminance, luminance uniformity, etc. In the present embodiment, the optical sheet 220 may include a prism sheet which will be described below.

In another embodiment, the LCD device may further include various optical sheets such as a diffusion plate, a diffusion sheet, a prism sheet, a semitransmissive film, a second base film, etc.

The LCD panel 230 is disposed on the optical sheet 220 to display an image by transmitting light passing through the optical sheet 220 through a liquid crystal layer interposed between two substrates. Alternatively, instead of the LCD panel 230, various passive-type display panels such as an electrophoretic display device may be employed.

Figure 17:
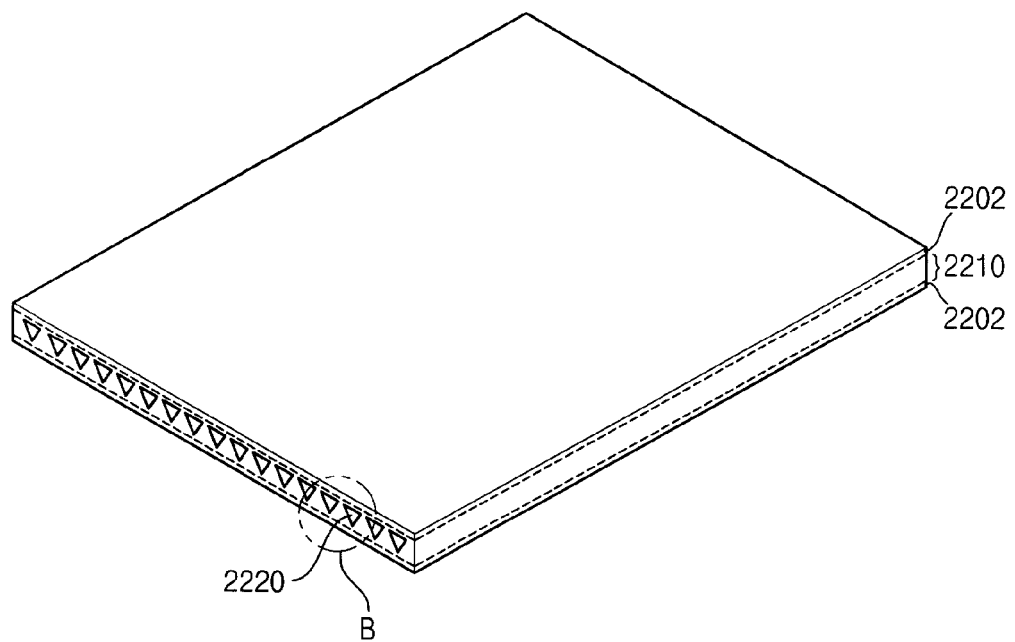
FIG. 17 is a perspective view illustrating the optical sheet of FIG. 16.
Figure 18:
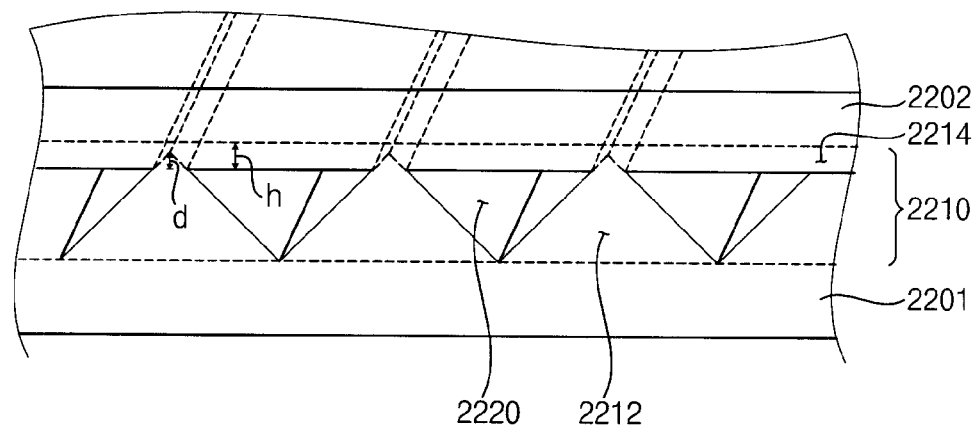
FIG. 18 is an enlarged perspective view of a portion 'B' of FIG. 17.

FIG. 17 is a perspective view illustrating the optical sheet of FIG. 16. FIG. 18 is an enlarged perspective view of a portion 'B' of FIG. 17.

Referring to FIGS. 17 and 18, the optical sheet 220 includes a first base film 2201, a light control film 2210 and a second base film 2202.

The first base film 2201 may have a film shape. The first base film 2201 may include a transparent synthetic resin. For example, the synthetic resin may include polyethylene terephthalate (PET), a methacrylic resin, an acrylic resin, a polycarbonate (PC) resin, a polyester resin, a vinyl chloride resin, etc. In the present embodiment, the first base film 2201 includes polyethylene terephthalate (PET).

The light control film 2210 is disposed on the first base film 2201 to include a plurality of air tunnels 2220 arranged in a direction parallel with the first base film 2201.

In the present embodiment, a plurality of prism patterns 2212 and the organic layer 2214 are coupled with each other to form the air tunnels 2220 of the light control film 2210, so that the air tunnels 2220 has a cross-section of a triangle shape. Alternatively, each of the air tunnels 2220 may have an isosceles triangle shape, a right-angle triangle shape, a trapezoidal shape, etc. In another embodiment, each of the air tunnels 2220 may have a cross-sectional shape such as a polygonal shape, a horseshoe shape, a semicircular shape, a round shape, etc.

The prism patterns 2212 are attached to an upper surface of the first base film 2201 to define surfaces of the air tunnels 2220.

The prism patterns 2212 include a transparent synthetic resin. In the present embodiment, the prism patterns 2210 includes a photocurable material, a thermosetting material, etc., and includes a different material from that of the base film 1201. In this case, the prism patterns 2212 and the first base film 2201 may be formed from the same layer. That is, a material of the prism patterns 2212 is the same as that of the first base film 2201. Thus, light rays incident from the first base film 2201 is guided in a vertical direction to the first base film 2201 by the first base film 2201 to enhance the front luminance of the LCD device.

The organic layer 2214 covers upper edges of the prism patterns 2212 to define an upper surface of the air tunnels 2220. In the present embodiment, the organic layer 2214 has a material identical to that of the prism patterns 2212 to be integrally formed with the prism patterns 2212.

The depth of an imaginary edge to which two side surfaces of the prism patterns 2212 are extended is smaller than the thickness of the organic layer 2214.

In the present embodiment, the prism patterns 2210 is integrally formed with the first base film 2201.

The second base film 2202 is disposed on the organic layer 2214 of the light control film 2210 to protect the light control film 2210. In the present embodiment, the second base film 2202 has a material identical to that of the first base film 2201. Alternatively, the second base film 2202 may be omitted.

The first base film 2201, the light control film 2210 and the second base film 2202 may be integrally formed with each other.

Figure 19A:
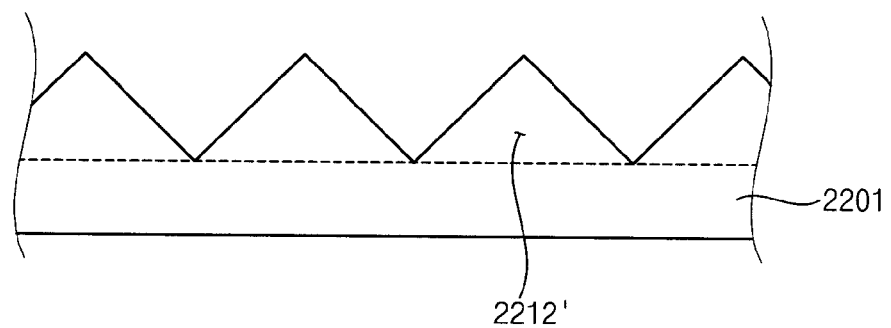
FIGS. 19A, 20, 21, 22 and 23A are cross-sectional views illustrating a method of manufacturing the optical sheet of FIG. 18.
Figure 19B:
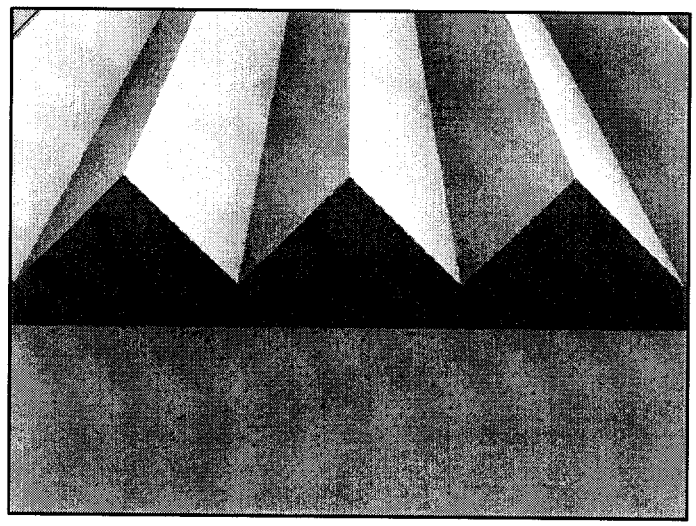
FIG. 19B is an image showing the prism patterns of FIG. 19A.

FIGS. 19A, 20, 21, 22 and 23A are cross-sectional views illustrating a method of manufacturing the optical sheet of FIG. 18. FIG. 19B is an image showing the prism patterns of FIG. 19A. FIG. 19A is a cross-sectional view illustrating a step of forming prism patterns 2212' on the first base film 2201, and FIG. 19B is an image showing the prism patterns 2212' of FIG. 19A.

Referring to FIGS. 19A and 19B, a plurality of prism patterns 2212' is formed on the first base film 2201, which is extended in a direction parallel with each other. The prism patterns 2212' may be formed on the first base film 2201 through various methods such as roller, pressing, printing, etching, etc.

Figure 20:
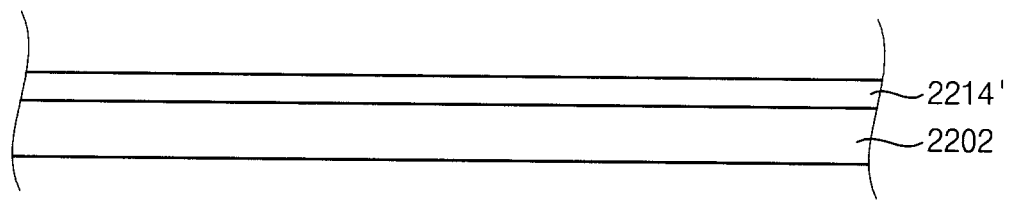

FIG. 20 is a cross-sectional view illustrating a step of coating a coating layer 2214' on the second base film 2202.

Referring to FIG. 20, the coating layer 2214' is not cured to thus have fluidity. For example, the coating layer 2214' may include a polyethylene resin.

Figure 21:
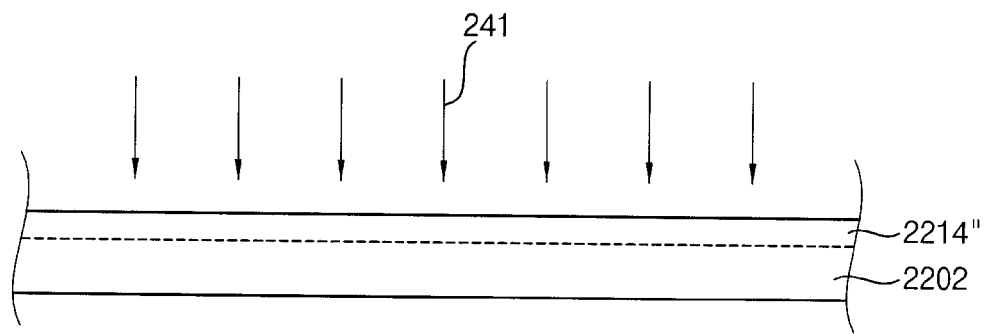

FIG. 21 is a cross-sectional view illustrating a step of irradiating light on the coating layer.

Referring to FIG. 21, an ultraviolet light is irradiated to the coating layer 2214' (as shown in FIG. 20) coated on the second base film 2202 to increase viscosity. In the present embodiment, the strength of the ultraviolet is controlled to be irradiated to the coating layer 2214', so that the coating layer 2214' in which the ultraviolet light is irradiated has a gel form maintaining fluidity.

In another embodiment, a solvent is evaporated from the coating layer 2214' coated on the second base film 2202, so that the coating layer 2214' may have a gel form. When the coating layer 2214' coated on the second base film 2202 has a gel form having a high viscosity, the step of irradiating the ultraviolet light may be omitted.

Figure 22:
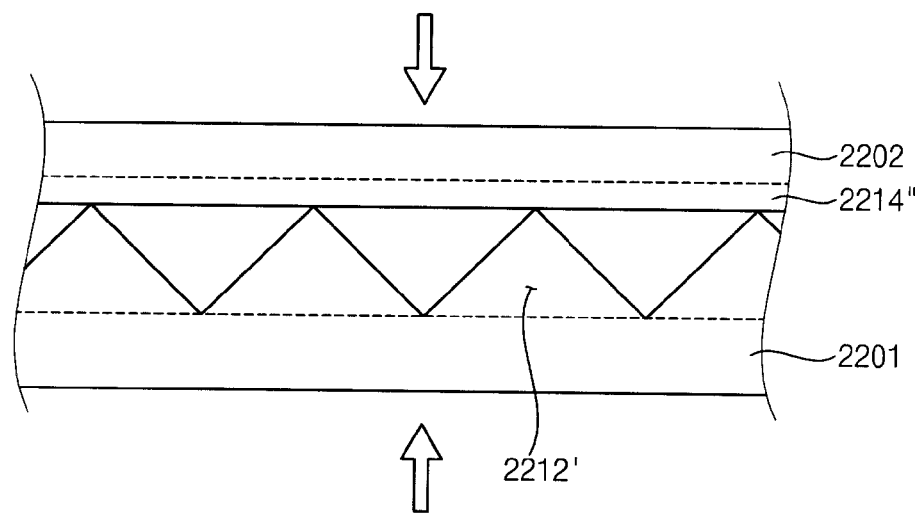

FIG. 22 is a cross-sectional view illustrating a step arranging the second base film of FIG. 21 on the first base film of FIG. 19A.

Referring to FIG. 22, the second base film 2202 is arranged on the first base film 2201 so that the coating layer 2214", to which the ultraviolet light is irradiated, faces the prism patterns 2212'.

In the present embodiment, the coating layer 2214", to which the ultraviolet light is irradiated, has a high viscosity, so that the coating layer 2214" is not sprayed toward a side surface of the prism patterns 2212', and thus a side surface edge of the air tunnels 2220 has an acute angle.

Then, the second base film 2202 is pressed toward the first base film 2201 to insert an upper portion of the prism patterns 2212' into the coating layer 2214' to which the ultraviolet light is irradiated. For example, the second base film 2202 may be pressed through machinery such as a press, a roller, etc.

Figure 23A:
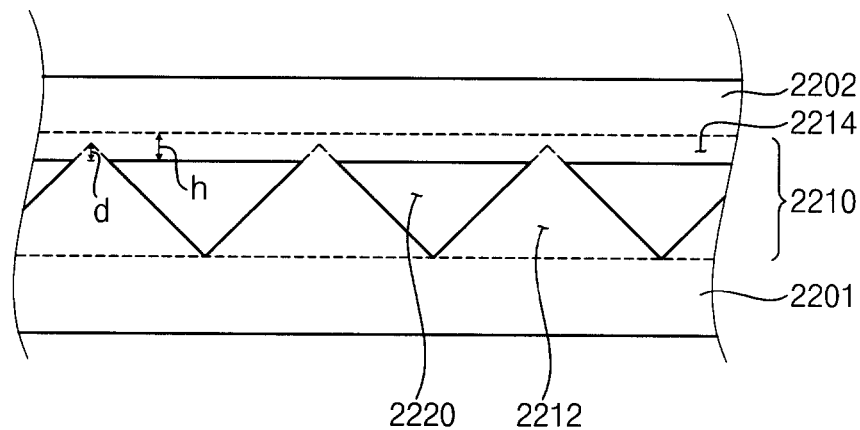

FIG. 23A is a cross-sectional view illustrating prism patterns of FIG. 22 are coupled with a coating layer.

Referring to FIGS. 22 and 23A, ultraviolet light is irradiated to the coating layer 2214", to which the ultraviolet light is irradiated, to form the organic layer 2214.

An insertion depth of the prism patterns 2212' into the coating layer 2214", to which the ultraviolet light is irradiated, is smaller than the thickness of the coating layer 2214". That is, the depth 'd' of an imaginary edge to which two side surfaces of each of the prism patterns 2212 are extended is smaller than the thickness 'h' of the organic layer 2214.

Thus, a side surface is defined by the prism patterns 2212 and an upper surface is defined by the organic layer 2214, so that the air tunnels 2220 are formed.

According to the present embodiment, the air tunnels 2220 are formed within the light control film 2210 to enhance the front luminance of the LCD device. Moreover, an upper edge of the prism patterns 2212 is not exposed to an outer side thereof, so that scratches may be prevented in another optical sheet.

Figure 23B:
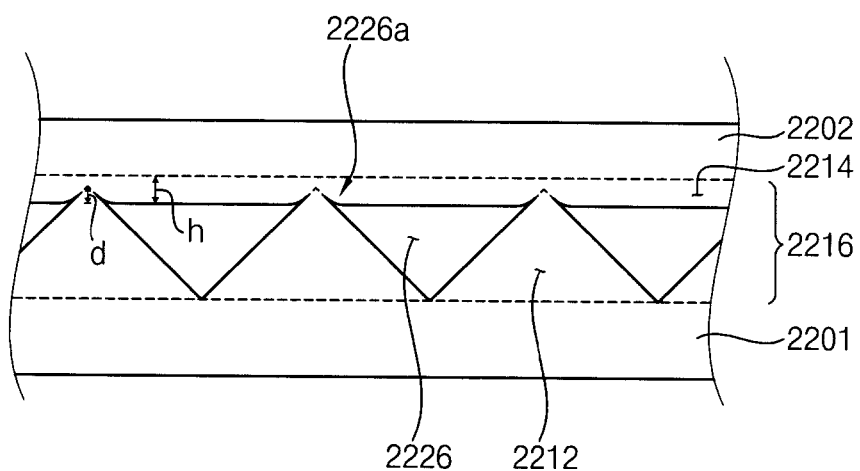
FIG. 23B is a cross-sectional view illustrating an optical sheet according to another embodiment of the present invention.

FIG. 23B is a cross-sectional view illustrating an optical sheet according to another embodiment of the present invention. In the present embodiment, the optical sheet is substantially the same as the optical sheet of Example Embodiment 6 except for air tunnels 2226, and thus any further detailed descriptions concerning the same elements will be omitted.

Referring to FIG. 23B, the optical sheet includes a first base film 2201, a light control film 2216 and a second base film 2202.

The light control film 2216 is disposed on the first base film 2201 to include a plurality of air tunnels 2226 arranged in a direction parallel with the first base film 2201. In the present embodiment, a side edge of each air tunnels 2226 has a sharp shape.

In the present embodiment, a plurality of prism patterns 2212, an organic layer 2214 and a diffusion edge portion 2226a are combined with each other to define the air tunnels 2226 of the light control film 2216.

The organic layer 2214 covers upper edges of the prism patterns 2212 to define an upper surface of the air tunnels 2226. In the present embodiment, the organic layer 2214 has a material identical to that of the prism patterns 2212 to be integrally formed with the prism patterns 2212. In another embodiment, the organic layer 2214 may include an adhesive resin that is different from a material of the prism patterns 2212.

The diffusion edge portion 2226a is formed at a boundary portion between the prism patterns 2212 and the organic layer 2214 along a direction parallel with the air tunnels 2226 to diffuse light rays.

A manufacturing method in according to the present embodiment is substantially the same as the manufacturing method of the optical sheet of FIGS. 19A, 19B, 20, 21, 22 and 23A. However, in a step of irradiating ultraviolet light of FIG. 21, the irradiation amount of ultraviolet light is increased more than of Example Embodiment 6 in order to form the diffusion edge portion 2226a in each of the air tunnels 2226, so that the viscosity of the coating layer is increased.

Example Embodiment 7

Figure 24:
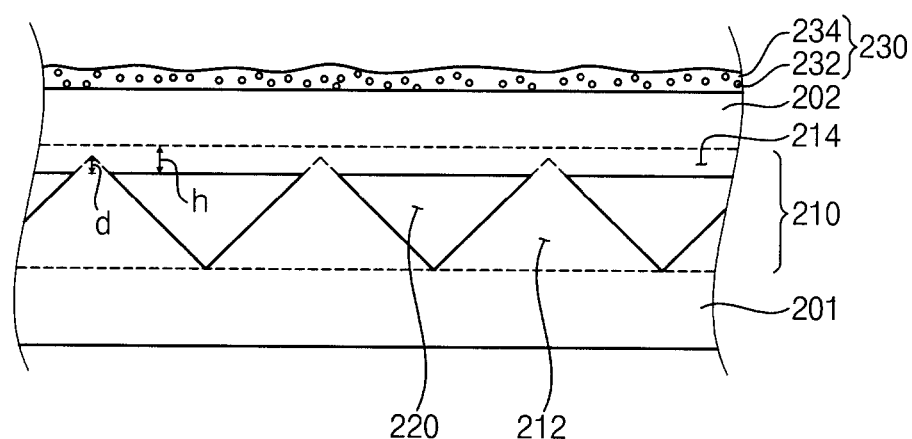
FIG. 24 is a cross-sectional view illustrating an optical sheet according to Example Embodiment 7 of the present invention.

FIG. 24 is a cross-sectional view illustrating an optical sheet according to Example Embodiment 7 of the present invention. In the present embodiment, the optical sheet is substantially the same as the optical sheet of Example Embodiment 1 except for the diffusion layer, and thus any further detailed descriptions concerning the same elements will be omitted.

Referring to FIG. 24, the optical sheet includes a first base film 2201, a light control film 2210, a second base film 2202 and a diffusion layer 2230.

The diffusion layer 2230 is attached on the second base film 2202 to include a plurality of diffusion particles 2232 and a resin 2234. The resin 2234 attaches the diffusion particles 2232 to the second base film 2202. In another embodiment, the diffusion particles 2232 may be disposed inside the second base film 2202 or the first base film 2201.

According to the present embodiment, the optical sheet includes the diffusion layer 2230, so that the luminance uniformity of an LCD device may be enhanced. Moreover, an additional diffusion sheet is omitted, so that an assembly process of the LCD device may be simple and manufacturing costs of the LCD device may be decreased.

Example Embodiment 8

Figure 25A:
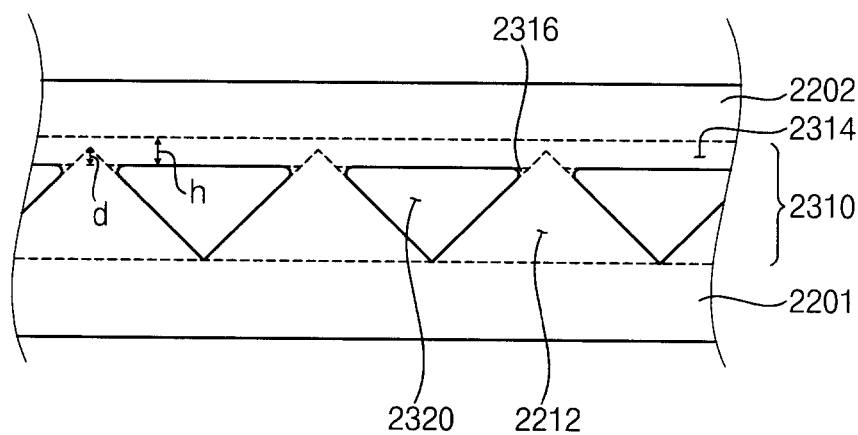
FIG. 25A is a perspective view illustrating an optical sheet according to Example Embodiment 8 of the present invention.
Figure 25B:
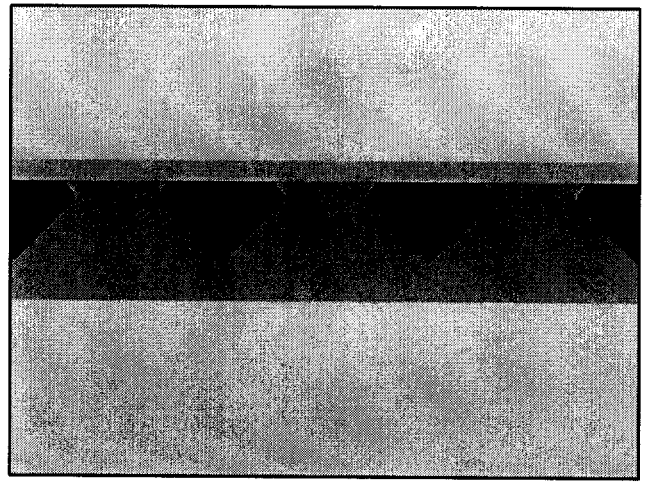
FIGS. 25B and 25C are images showing the optical sheet of FIG. 25A.
Figure 25C:
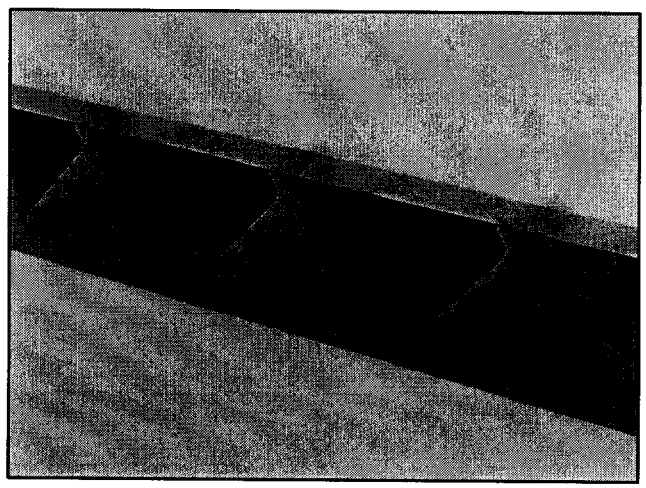

FIG. 25A is a perspective view illustrating an optical sheet according to Example Embodiment 8 of the present invention. FIGS. 25B and 25C are images showing the optical sheet of FIG. 25A. In the present embodiment, the optical sheet is substantially the same as the optical sheet of Example Embodiment 1 except for a light control film, and thus any further detailed descriptions concerning the same elements will be omitted.

Referring to FIGS. 25A, 25B and 25C, the optical sheet includes a first base film 2201, a light control film 2310 and a second base film 2202.

The light control film 2310 is disposed on the first base film 2201 to include a plurality of air tunnels 2320 that are arranged in a direction parallel with the first base film 2201. In the present embodiment, side edges of the air tunnels 2320 may have a rounded shape.

In the present embodiment, a plurality of prism patterns 2212, an organic layer 2314 and a curved surface portion 2316 are coupled to form the air tunnels 2320 of the light control film 2310.

The organic layer 2314 covers upper edges of the prism patterns 2212 to define upper surfaces of the air tunnels 2320. In the present embodiment, the organic layer 2314 has a material identical to that of the prism patterns 2212 to be integrally formed with the prism patterns 2212.

The depth of an imaginary edge to which two side surfaces of the prism patterns 2212 are extended is smaller than the thickness of the organic layer 2314.

The curved surface portion 2316 is formed at a boundary portion between the prism patterns 2212 and the organic layer 2314 along a direction parallel with the air tunnels 2320 to diffuse light rays.

In the present embodiment, the prism patterns 2212, the organic layer 2314 and the curved surface portion 2316 have a material identical to each other to be integrally formed with each other.

Figure 26:
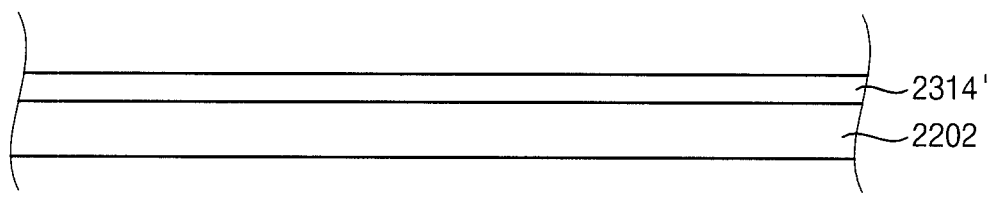
FIGS. 26, 27 and 28 are cross-sectional views illustrating a method of manufacturing the optical sheet of FIG. 25A.
Figure 27:
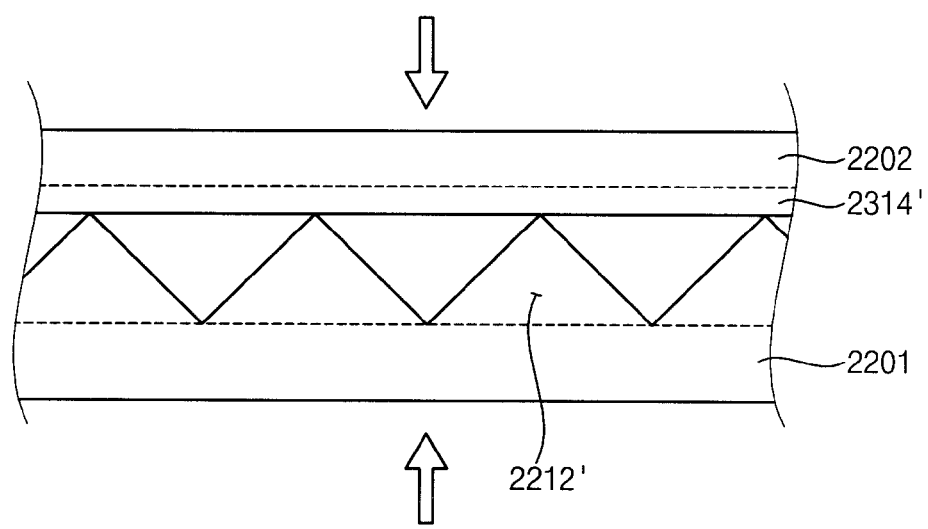
Figure 28:
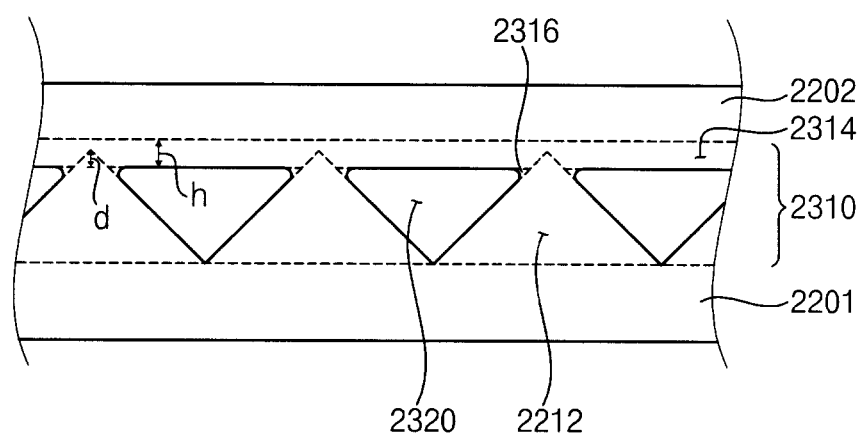

FIGS. 26, 27 and 28 are cross-sectional views illustrating a method of manufacturing the optical sheet of FIG. 25A.

As shown in FIG. 19A, a plurality of prism patterns 2212' is formed on the first base film 2201.

FIG. 26 is a cross-sectional view illustrating a step of coating a coating layer 2314' on the second base film 2202.

Referring to FIG. 26, the coating layer 2314' is not cured to thus have fluidity. In the present embodiment, a step of irradiating additional light as shown in FIG. 21 will be omitted.

FIG. 27 is a cross-sectional view illustrating a step of arranging the second base film of FIG. 26 on the first base film of FIG. 19A.

Referring to FIG. 28, the second base film 2202 is arranged on the first base film 2201, so that the coating layer 2314' faces the prism patterns 2212'.

Then, the second base film 2202 is pressed toward the first base film 2201, so that an upper portion of the prism patterns 2212' is inserted in the coating layer 2314'.

In the present embodiment, the coating layer 2314' has low viscosity. Thus, the coating layer 2314' may be diffused toward a side surface of the prism patterns 2212'.

FIG. 28 is a cross-sectional view illustrating a coupling of prism patterns as shown in FIG. 27 and the coating layer.

Referring to FIGS. 27 and 28, a portion of the coating layer 2314' is diffused to a position which corresponds to the diffusion portion 2316 due to a surface tension with the prism patterns 2212.

Then, ultraviolet light is irradiated to the coating layer 2314' to form the organic layer 2314 and the diffusion portion 2316.

A depth to which each of the prism patterns 2212' is inserted is smaller than the thickness of the coating layer 2314'. That is, a depth 'd' of an imaginary edge where two side surfaces of each of the prism patterns 2212 are extended is smaller than the thickness 'h' of the organic layer 2214.

Therefore, the air tunnels 2320 are formed. The air tunnels 2320 includes a side surface defined by the prism patterns 2212, a rounded edge defined by the diffusion portion 2316, and an upper surface defined by the organic layer 2214.

According to the present embodiment, the light control film 2310 includes the curved surface portion 2316, so that the side surface edges of each of the air tunnels 2320 are rounded. In addition, since the curved surface portion 2316 diffuses light rays without an additional dispersant, luminance uniformity may be enhanced without decreasing luminance.

Example Embodiment 9

Figure 29A:
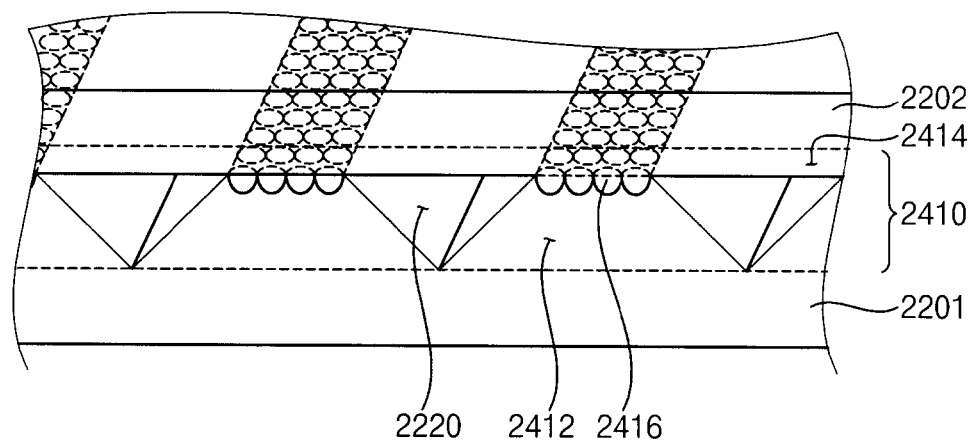
FIG. 29A is a perspective view illustrating an optical sheet according to Example Embodiment 9 of the present invention.
Figure 29B:
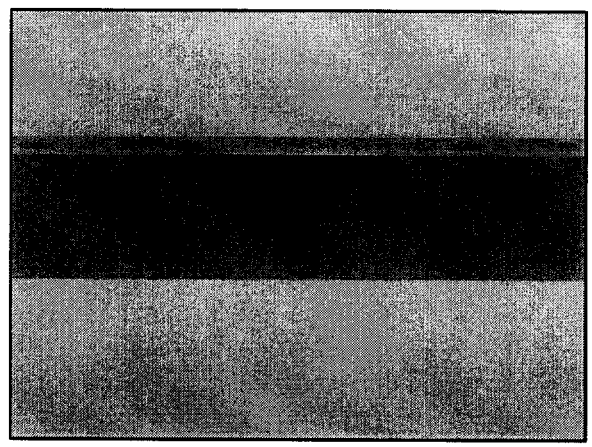
FIGS. 29B and 29C are images showing the optical sheet of FIG. 29A.
Figure 29C:
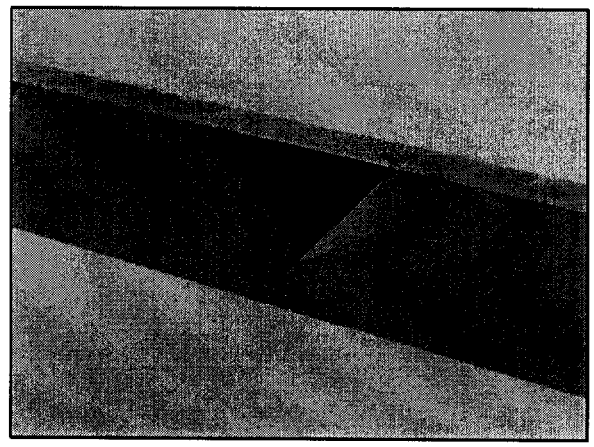

FIG. 29A is a perspective view illustrating an optical sheet according to Example Embodiment 9 of the present invention. FIGS. 29B and 29C are images showing the optical sheet of FIG. 29A. In the present embodiment, the optical sheet is substantially the same as the optical sheet of Example Embodiment 6 except for air capsules, and thus any further detailed descriptions concerning the same elements will be omitted.

Referring to FIGS. 29A, 29B and 29C, the optical sheet includes a first base film 2201, a light control film 2410 and a second base film 2202.

The light control film 2410 is disposed on the first base film 2201 to include a plurality of air tunnels 2220 arranged in a direction parallel with the first base film 2201.

In the present embodiment, the prism patterns 2412 and the organic layer 2412 are coupled with each other to form the air tunnels 2220 of the light control film 2410.

A plurality of air capsules 2416 is formed on an upper portion of each of the prism patterns 2412. In the present embodiment, the air capsules 2416 are disposed between the prism patterns 2412 and the organic layer 2414. For example, the air capsules 2416 may have a hemispherical shape, a polygonal pyramid shape, a hexahedral shape, etc.

A portion of light rays incident to the optical sheet is diffused by the air capsules 2416, so that luminance uniformity may be enhanced.

Figure 30A:
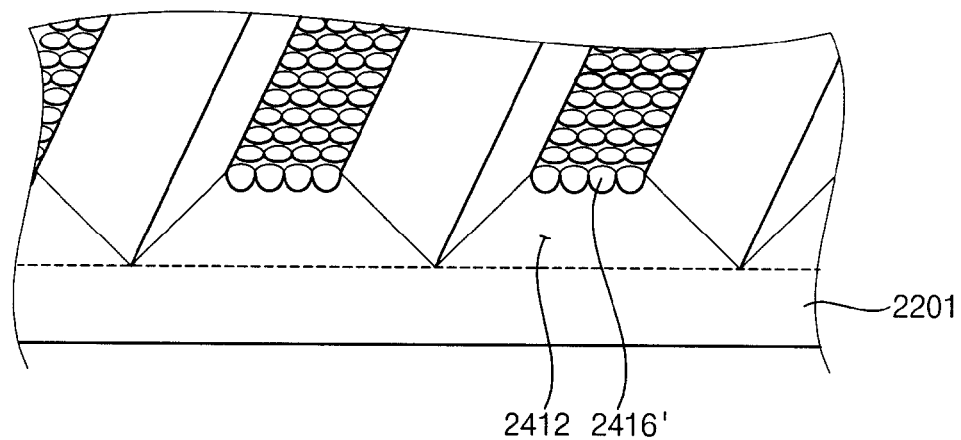
FIGS. 30A, 33 and 34 are perspective views illustrating a method of manufacturing the optical sheet of FIG. 29A.
Figure 30B:
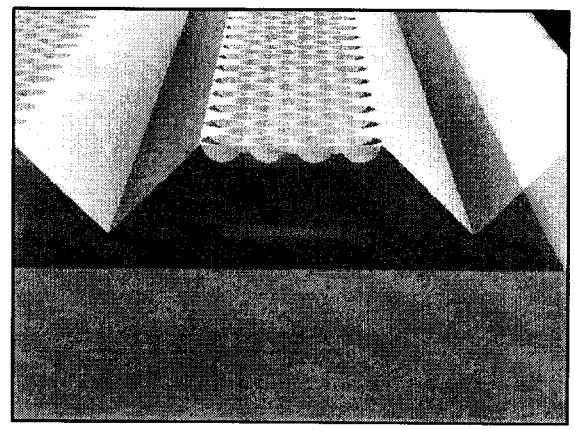
FIG. 30B is an image showing prism patterns of FIG. 30A.
Figure 31:
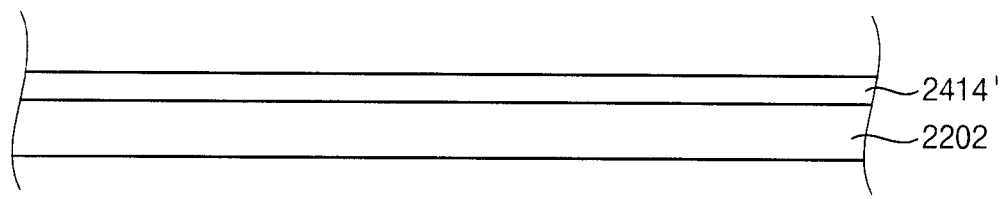
FIGS. 31 and 32 are cross-sectional views illustrating a method of manufacturing the optical sheet of FIG. 29A.
Figure 32:
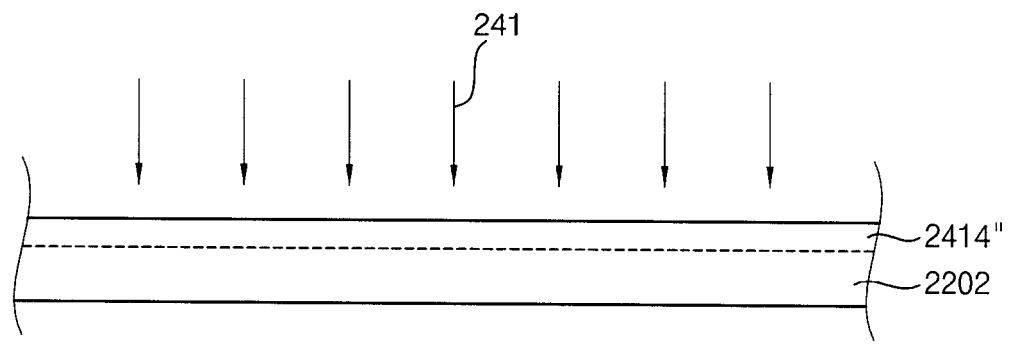
Figure 33:
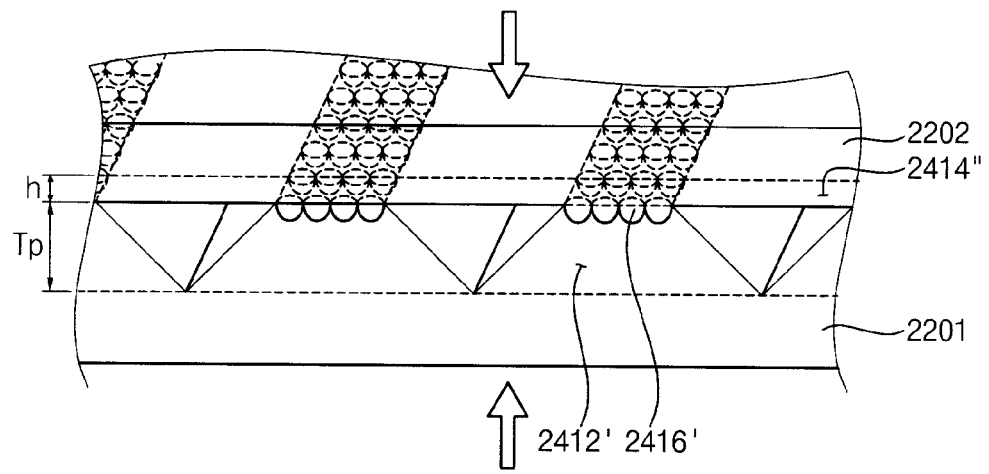

FIGS. 30A, 33 and 34 are perspective views illustrating a method of manufacturing the optical sheet of FIG. 29A. FIG. 30B is an image showing prism patterns of FIG. 30A. FIGS. 31 and 32 are cross-sectional views illustrating a method of manufacturing the optical sheet of FIG. 29A. FIG. 30A is a perspective view illustrating a step of forming prism patterns 2412' on the first base film 2201. FIG. 30B is an image showing prism patterns 2412' of FIG. 30A.

Referring to FIGS. 30A and 30B, each of the prism patterns 2412' has a shape which an upper portion thereof is cut. A plurality of recesses 2416' is formed on upper surfaces of the prism patterns 2412', respectively.

In the present embodiment, the recesses 2416' are disposed adjacent to each other. Here, the recesses 2416' may be spaced apart from each other.

FIG. 31 is a cross-sectional view illustrating a step of coating a coating layer 2414' on the second base film 2202.

Referring to FIG. 31, the coating layer 2414' is not cured to thus have fluidity.

FIG. 32 is a cross-sectional view illustrating step of irradiating ultraviolet light on the coating layer of FIG. 31.

Referring to FIG. 32, ultraviolet light is irradiated to the coating layer (2414' as shown in FIG. 31) which is coated on the second base film 2202 to increase viscosity.

FIG. 33 is a cross-sectional view illustrating a step of arranging the second base film of FIG. 31 on the first base film of FIG. 30A.

Referring to FIG. 33, the second base film 2202 is arranged on the first base film 2201 so that the coating layer 2414" faces the prism patterns 2412'. In this case, a distance between the first base film 2201 and the second base film 2202 is substantially equal to the total sum of the height Tp of the prism patterns 2412' and the thickness 'h' of the coating layer 2414".

Then, the second base film 2202 is pressed toward the first base film 2201 to insert an upper portion of the prism patterns 2212' into the coating layer 2214' to which the ultraviolet light is irradiated.

Figure 34A:
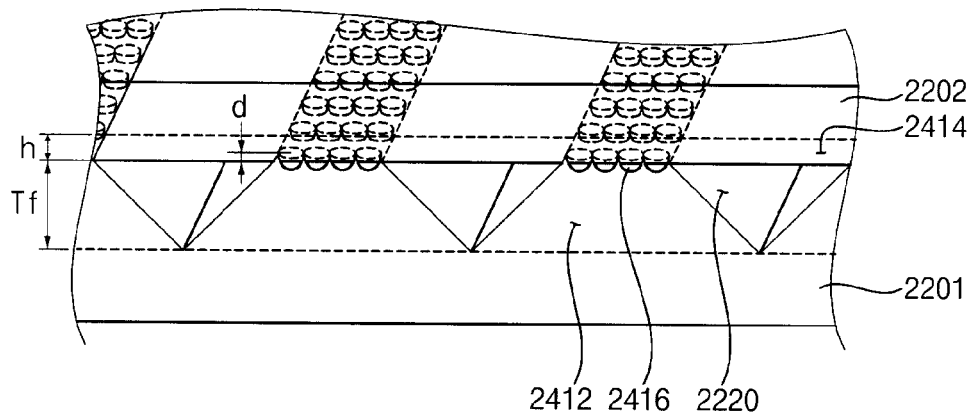
FIGS. 34B, 34C and 34D are images showing the optical sheet of FIG. 34A.
Figure 34B:
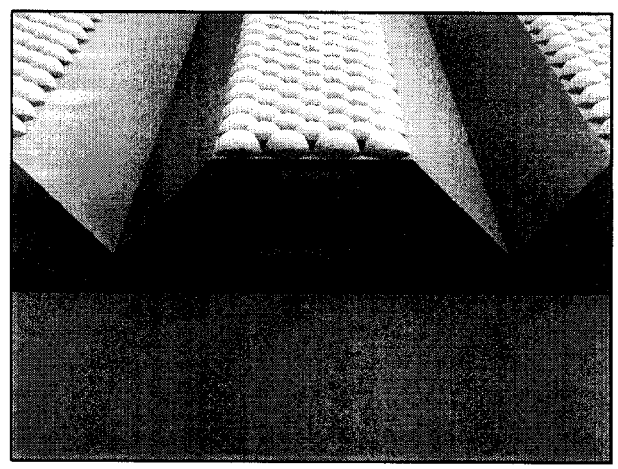
Figure 34C:
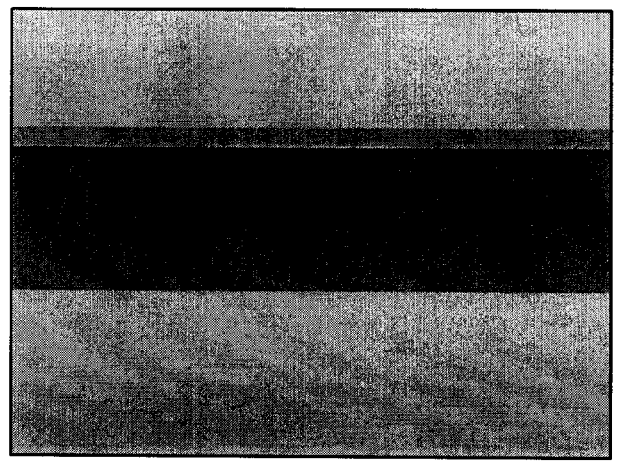
Figure 34D:
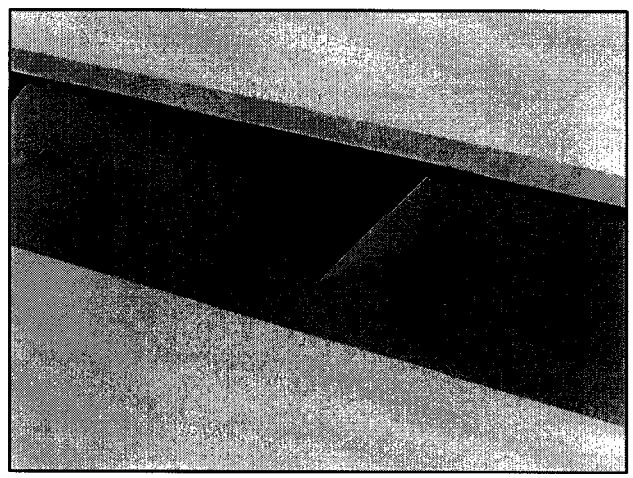

FIG. 34A is a cross-sectional view illustrating a coupling of the prism patterns of FIG. 33 and a coating layer. FIGS. 34B, 34C and 34D are images showing the optical sheet of FIG. 34A.

Referring to FIGS. 33, 34A, 34B, 34C and 34D, a portion of the coating layer 2412" covers an upper portion of the recesses 2416' formed on the prism patterns 2412' to form the air capsules 2416.

An insertion depth of the prism patterns 2412' into the coating layer 2414" is smaller than the thickness 'h' of the coating layer 2414". Thus, a distance Tf between a lower surface of the prism pattern 2412 and a lower surface of the coating layer 2414" is smaller than the height Tp of the prism patterns 2412' before pressing.

Then, ultraviolet light is irradiated to the coating layer 2412" to form the organic layer 2412.

Thus, the air tunnels 2320 and the air capsules 2416 are formed. The air tunnels 2320 has a side surface being defined by the prism patterns 2412 and an upper surface being defined by the organic layer 2414. The air capsules 2416 has side surface and lower surface being defined by the recesses 2416' formed on an upper surface of the prism patterns 2412 and an upper surface being defined by the organic layer 2414.

According to the present embodiment, the light control film 2410 includes the air capsules 2416, so that light rays may be diffused without an additional dispersant. Therefore, luminance uniformity may be enhanced without decreasing luminance.

Example Embodiment 10

Figure 35A:
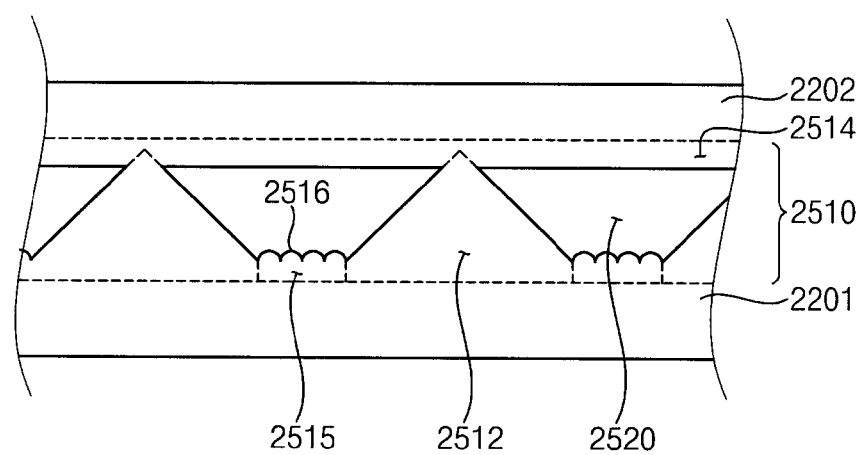
FIG. 35A is a cross-sectional view illustrating an optical sheet according to Example Embodiment 10 of the present invention.
Figure 35B:
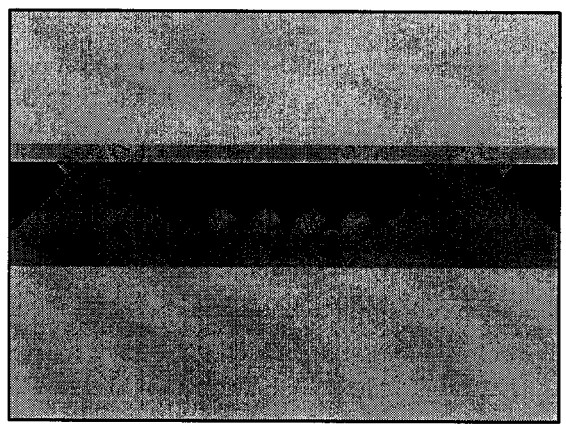
FIGS. 35B and 35C are images showing the optical sheet of FIG. 35A.
Figure 35C:
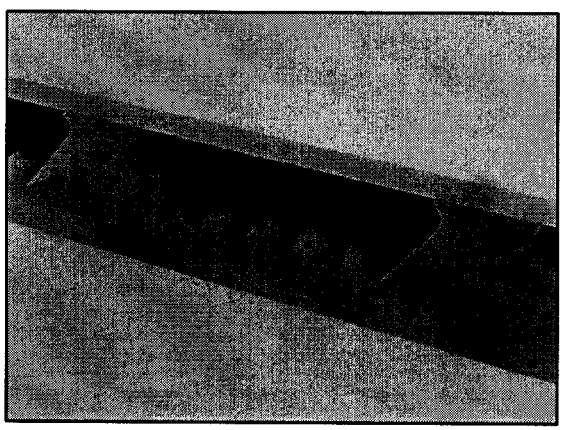

FIG. 35A is a cross-sectional view illustrating an optical sheet according to Example Embodiment 10 of the present invention. FIGS. 35B and 35C are images showing the optical sheet of FIG. 35A. In the present embodiment, the optical sheet is substantially the same as the optical sheet of Example Embodiment 6 except for the diffusion member, and thus any further detailed descriptions concerning the same elements will be omitted.

Referring to FIGS. 35A, 35B and 35C, a light control film 2510 includes a plurality of prism patterns 2512, a plurality of diffusion portions 2515 and an organic layer 2514.

The diffusion portion 2515 is disposed between the prism patterns 2512 adjacent to each other to diffuse light rays.

In the present embodiment, the diffusion portion 2515 includes a plurality of hemispherical protrusion parts 2516.

A side surface of the prism patterns 2512, an upper surface of the diffusion portion 2512 and a lower surface of the organic layer 2514 may define a plurality of air tunnels 2520.

Light rays incident to the optical sheet are guided from a boundary surface between a peripheral portion of the air tunnels 2520 and the prism patterns 2512 to a front direction thereof, and are diffused at a boundary surface between a central portion of the air tunnels 2520 and the diffusion portion 2515.

Example Embodiment 11

Figure 36A:
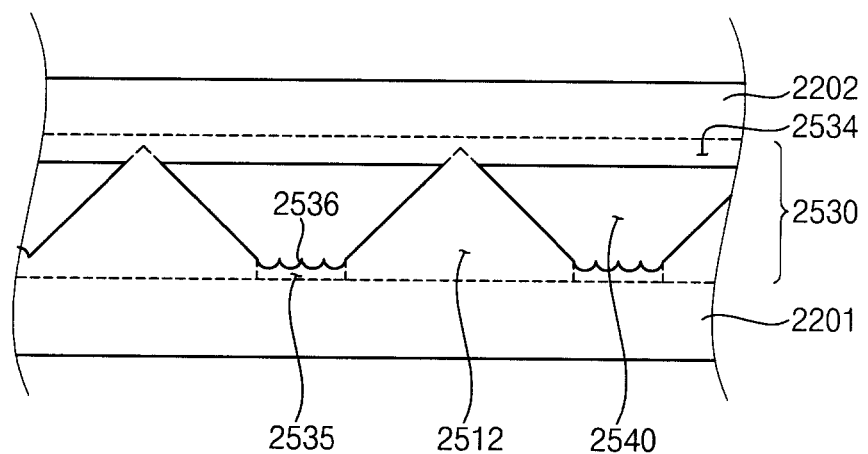
FIG. 36A is a cross-sectional view illustrating an optical sheet according to Example Embodiment 11 of the present invention.
Figure 36B:
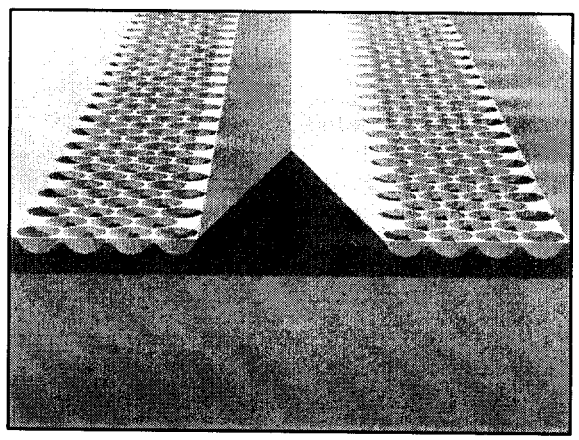
FIG. 36B is an image showing the prism patterns of FIG. 36A.
Figure 36C:
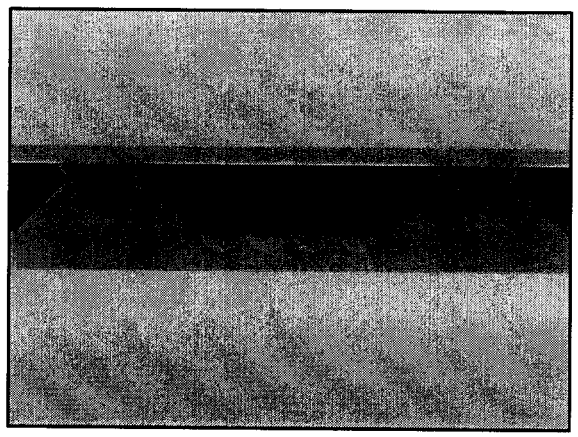
FIGS. 36C and 36D are images showing the optical sheet of FIG. 36A.
Figure 36D:
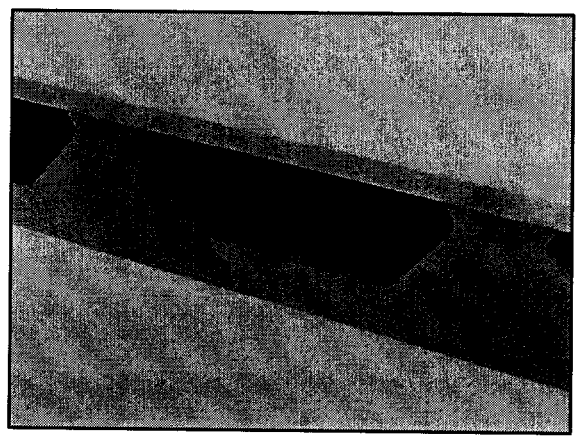

FIG. 36A is a cross-sectional view illustrating an optical sheet according to Example Embodiment 11 of the present invention. FIG. 36B is an image showing the prism patterns of FIG. 36A. FIGS. 36C and 36D are images showing the optical sheet of FIG. 36A. In the present embodiment, the optical sheet is substantially the same as the optical sheet of Example Embodiment 10 except for the diffusion member, and thus any further detailed descriptions concerning the same elements will be omitted.

Referring to FIGS. 36A, 36B, 36C and 36D, a light control film 2530 includes a plurality of prism patterns 2512, a plurality of diffusion members 2535 and an organic layer 2534.

The diffusion member 2535 is disposed between adjacent prism patterns 2512 to diffuse light.

In the present embodiment, the diffusion member 2535 includes a plurality of hemispherical shape recesses 2536.

A side surface of the prism patterns 2512, a bottom surface of the diffusion portion 2535 and a lower surface of the organic layer 2534 may define a plurality of air tunnels 2540.

Example Embodiment 12

Figure 37A:
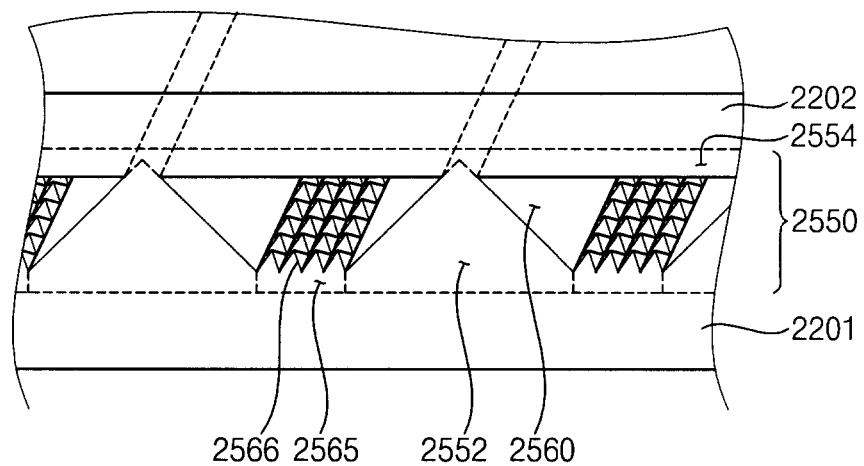
FIG. 37A is a perspective view illustrating an optical sheet according to Example Embodiment 12 of the present invention.
Figure 37B:
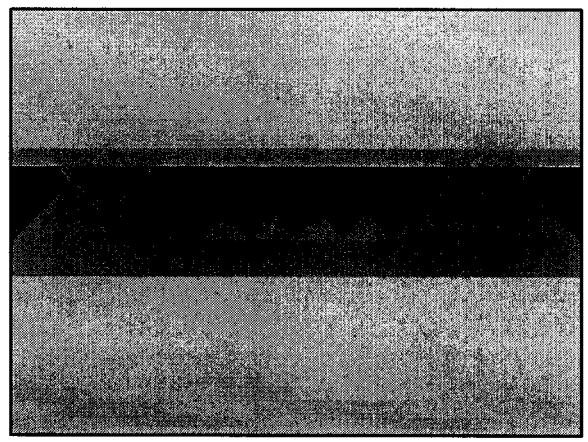
FIGS. 37B and 37C are images showing an optical sheet according to another embodiment of the present invention.
Figure 37C:
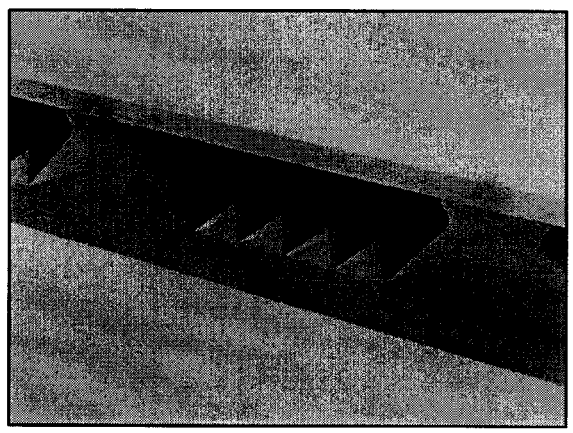

FIG. 37A is a perspective view illustrating an optical sheet according to Example Embodiment 12 of the present invention. FIGS. 37B and 37C are images showing an optical sheet according to another embodiment of the present invention. In the present embodiment, the optical sheet is substantially the same as the optical sheet of Example Embodiment 5 except for the diffusion member, and thus any further detailed descriptions concerning the same elements will be omitted.

Referring to FIGS. 37A, 37B and 37C, a light control film 2550 includes a plurality of prism patterns 2552, a plurality of diffusion portions 2565 and an organic layer 2554.

The diffusion portion 2565 is disposed between the prism patterns 2552 adjacent to each other to diffuse light rays.

In the present embodiment, the diffusion portion 2565 includes a plurality of pyramid-shaped protrusion parts 2516.

A side surface of the prism patterns 2552, an upper surface of the diffusion portion 2562 and a lower surface of the organic layer 2554 may define a plurality of air tunnels 2560.

Figure 37D:
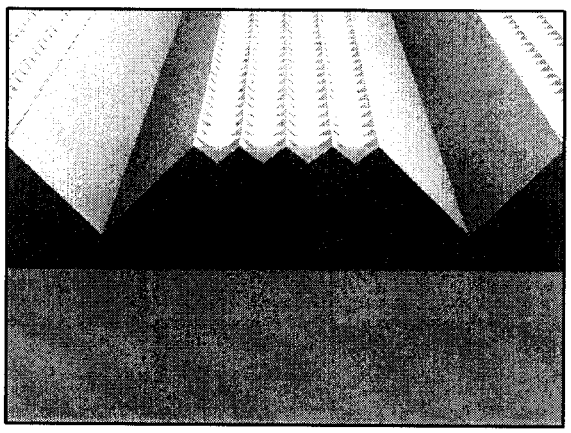
FIGS. 37D, 37E and 37F are images showing another example of an optical sheet according to Example Embodiment 12 of the present invention.
Figure 37E:
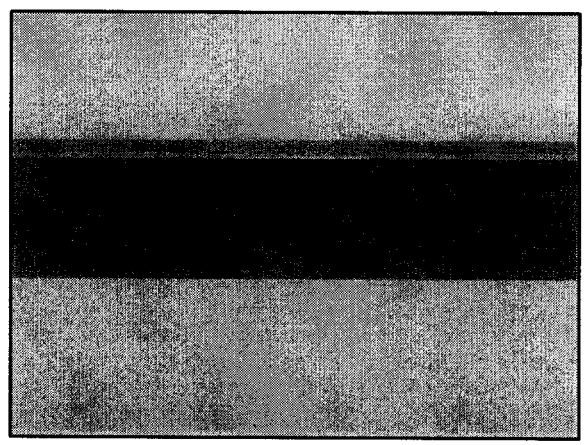
Figure 37F:
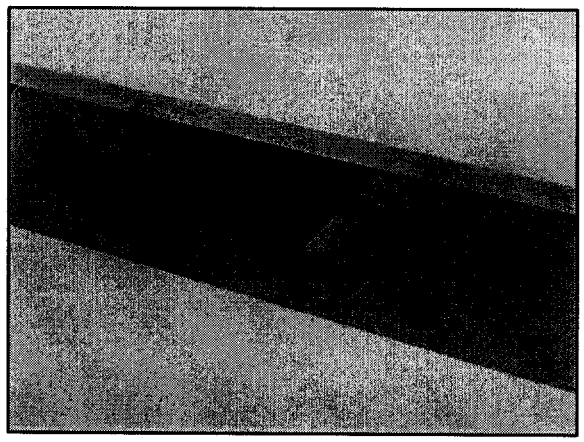

FIGS. 37D, 37E and 37F are images showing another example of an optical sheet according to Example Embodiment 12 of the present invention. In the present embodiment, the optical sheet is substantially the same as the optical sheet of Example Embodiment 12 except for the diffusion member, and thus any further detailed descriptions concerning the same elements will be omitted.

Referring to FIGS. 37D, 37E and 37F, the diffusion portion includes pyramid-shaped air capsules that are disposed between air tunnels adjacent to each other.

Example Embodiment 13

Figure 38:
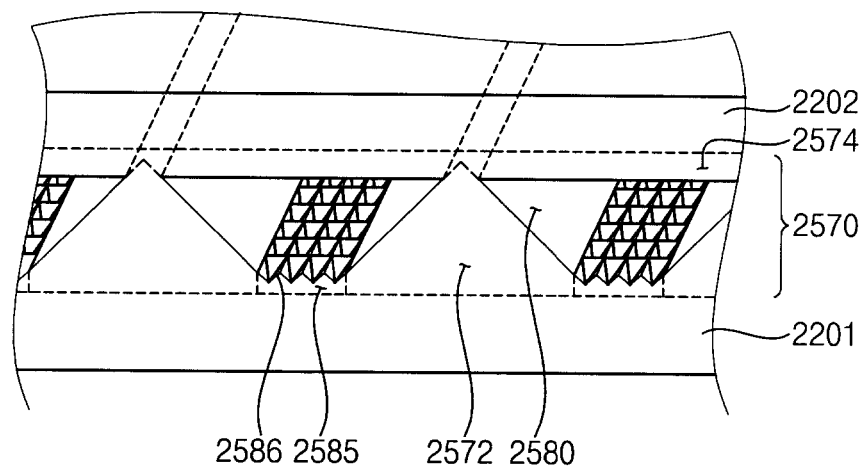
FIG. 38 is a perspective view illustrating an optical sheet according to Example Embodiment 13 of the present invention.

FIG. 38 is a perspective view illustrating an optical sheet according to Example Embodiment 13 of the present invention. In the present embodiment, the optical sheet is substantially the same as the optical sheet of Example Embodiment 12 except for the diffusion member, and thus any further detailed descriptions concerning the same elements will be omitted.

Referring to FIG. 38, a light control film 2570 includes a plurality of prism patterns 2572, a plurality of diffusion portions 2585 and an organic layer 2574.

The diffusion portion 2585 is disposed between adjacent prism patterns 2572 to diffuse light rays.

In the present embodiment, the diffusion portion 2585 includes a plurality of recesses 2586 having a pyramid shape.

A side surface of the prism patterns 2572, an upper surface of the diffusion portion 2585 and a lower surface of the organic layer 2574 may define a plurality of air tunnels 2580.

Example Embodiment 14

Figure 39A:
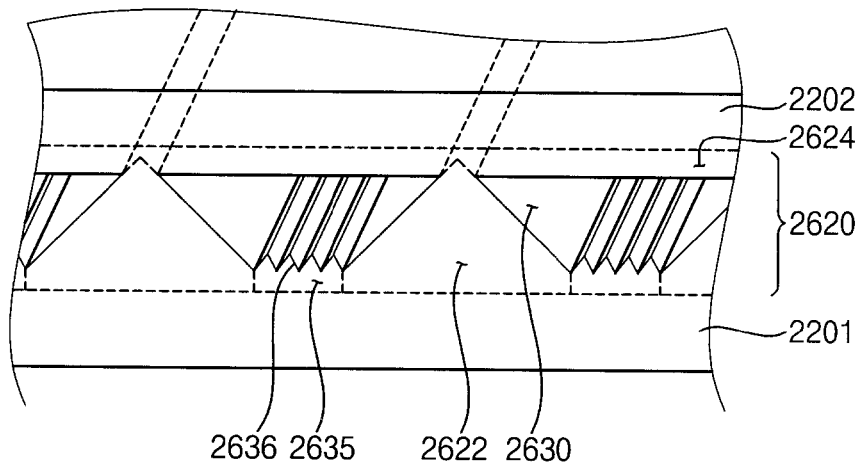
FIG. 39A is a perspective view illustrating an optical sheet according to Example Embodiment 14 of the present invention.
Figure 39B:
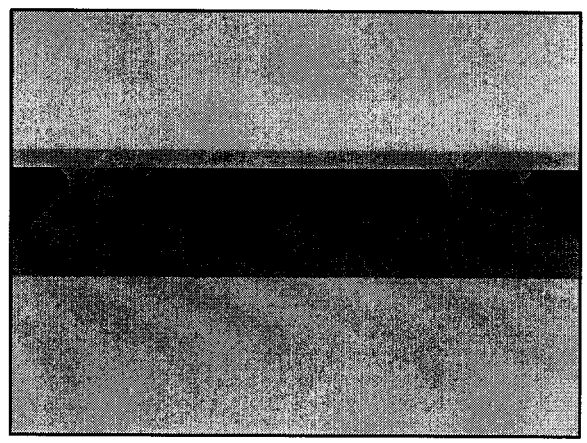
FIGS. 39B and 39C are images showing the optical sheet of FIG. 39A.
Figure 39C:
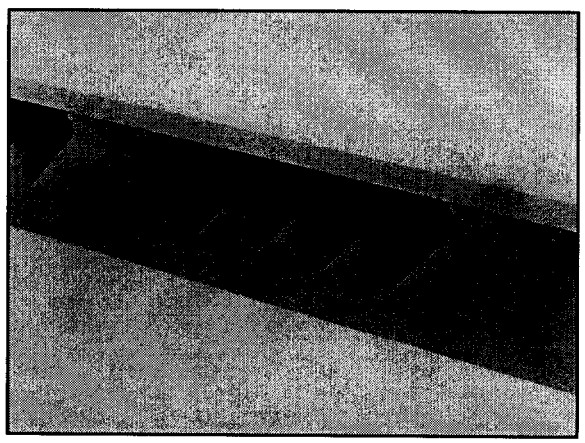

FIG. 39A is a perspective view illustrating an optical sheet according to Example Embodiment 14 of the present invention. FIGS. 39B and 39C are images showing the optical sheet of FIG. 39A. In the present embodiment, the optical sheet is substantially the same as the optical sheet of Example Embodiment 5 except for the diffusion member, and thus any further detailed descriptions concerning the same elements will be omitted.

Referring to FIGS. 39A, 39B and 39C, the light control film 2620 includes a prism pattern 2622, a plurality of diffusion portions 2635 and an organic layer 2624.

The diffusion portion 2635 is disposed between adjacent prism patterns 2622 to diffuse light rays.

In the present embodiment, the diffusion portion 2635 includes a plurality of prism type protrusion portions 2636.

A side surface of the prism patterns 2622, an upper surface of the diffusion portion 2635 and a lower surface of the organic layer 2624 may define a plurality of air tunnels 2630.

Figure 39D:
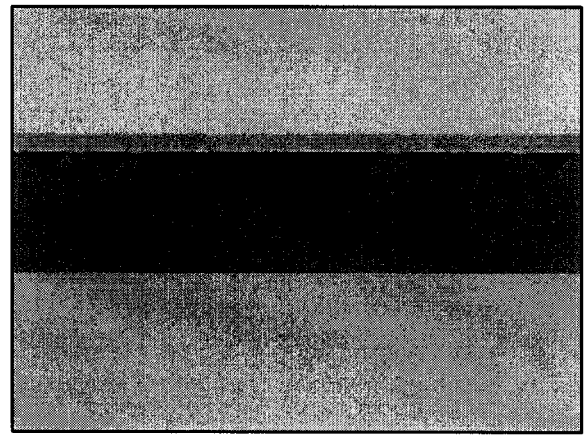
FIGS. 39D and 39E are images showing another example of an optical sheet according to Example Embodiment 14 of the present invention.
Figure 39E:
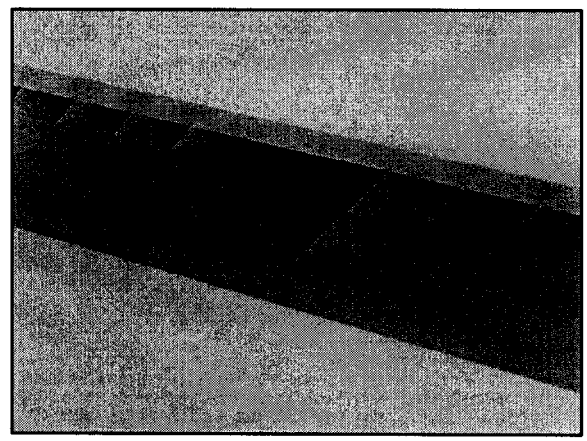

FIGS. 39D and 39E are images showing another example of an optical sheet according to Example Embodiment 14 of the present invention. In the present embodiment, the optical sheet is substantially the same as the optical sheet of Example Embodiment 14 except for the diffusion member, and thus any further detailed descriptions concerning the same elements will be omitted.

Referring to FIGS. 39A and 39E, the diffusion part includes a plurality of auxiliary air tunnels disposed between air tunnels adjacent to each other. The auxiliary air tunnels are extended in the same direction as the air tunnels. The auxiliary tunnels may have a triangular shape.

Example Embodiment 15

Figure 40A:
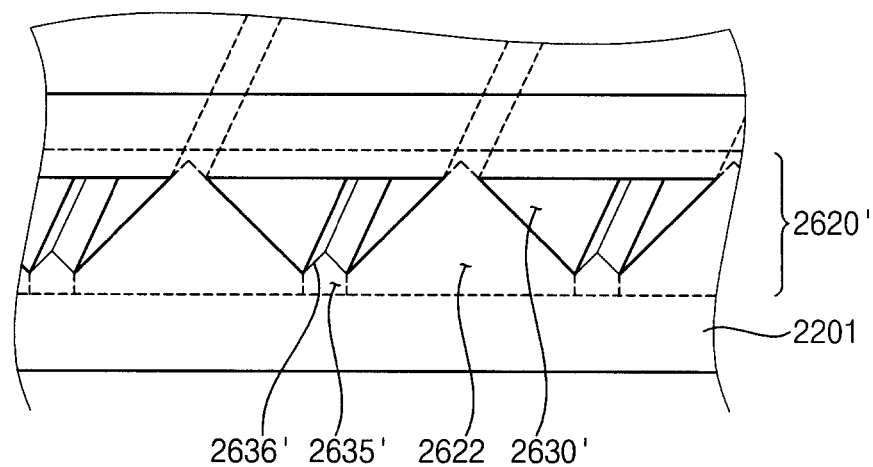
FIG. 40A is a perspective view illustrating an optical sheet according to Example Embodiment 15 of the present invention.
Figure 40B:
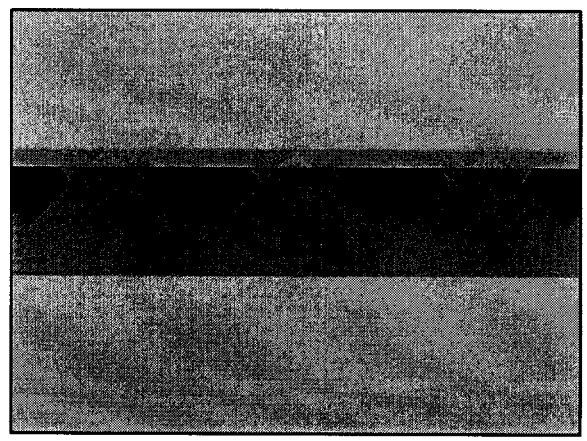
FIGS. 40B and 40C are images showing the optical sheet of FIG. 40A.
Figure 40C:
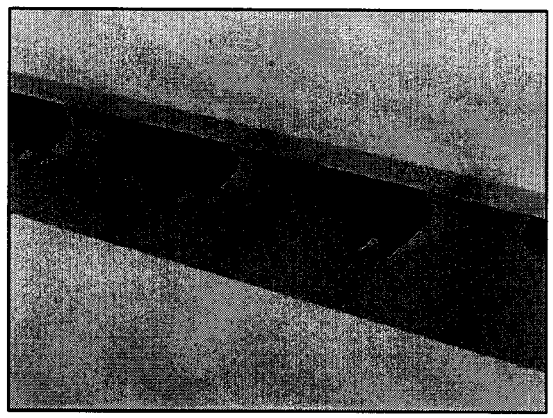

FIG. 40A is a perspective view illustrating an optical sheet according to Example Embodiment 15 of the present invention. FIGS. 40B and 40C are images showing the optical sheet of FIG. 40A. In the present embodiment, the optical sheet is substantially the same as the optical sheet of Example Embodiment 14 except for the diffusion member, and thus any further detailed descriptions concerning the same elements will be omitted.

Referring to FIGS. 40A, 40B and 40C, a light control film 2620' includes a plurality of prism patterns 2622, a plurality of diffusion portions 2635' and an organic layer 2624.

The diffusion portion 2635' is disposed between the prism patterns 2622 adjacent to each other to diffuse light rays.

In the present embodiment, the diffusion portion 2635' includes pyramid-shaped protrusion parts 2636'.

A side surface of the prism patterns 2622, an upper surface of the diffusion portion 2635' and a lower surface of the organic layer 2624 may define a plurality of air tunnels 2630.

Figure 40D:
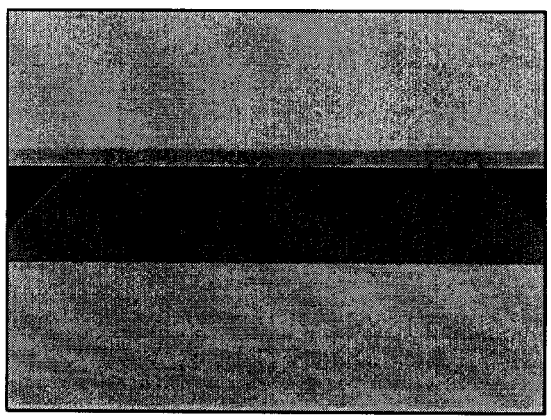
FIGS. 40D and 40E are images showing another example of an optical sheet according to Example Embodiment 15 of the present invention.
Figure 40E:
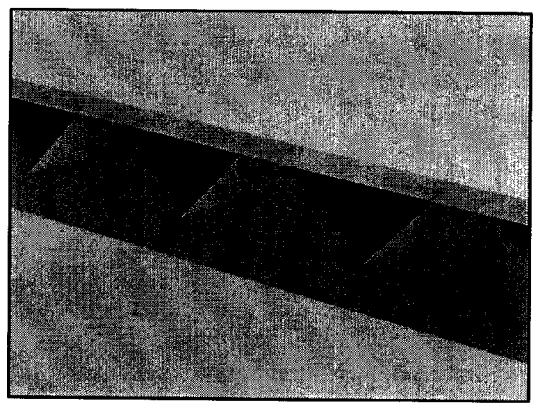

FIGS. 40D and 40E are images showing another example of an optical sheet according to Example Embodiment 15 of the present invention. In the present embodiment, the optical sheet is substantially the same as the optical sheet of Example Embodiment 15 except for the diffusion member, and thus any further detailed descriptions concerning the same elements will be omitted.

Referring to FIGS. 40D and 40E, the diffusion portion includes an auxiliary air tunnel disposed between adjacent air tunnels. In the present embodiment, one auxiliary air tunnel is disposed between adjacent air tunnels. The auxiliary air tunnel has a cross-section of a triangle shape.

Example Embodiment 16

Figure 41A:
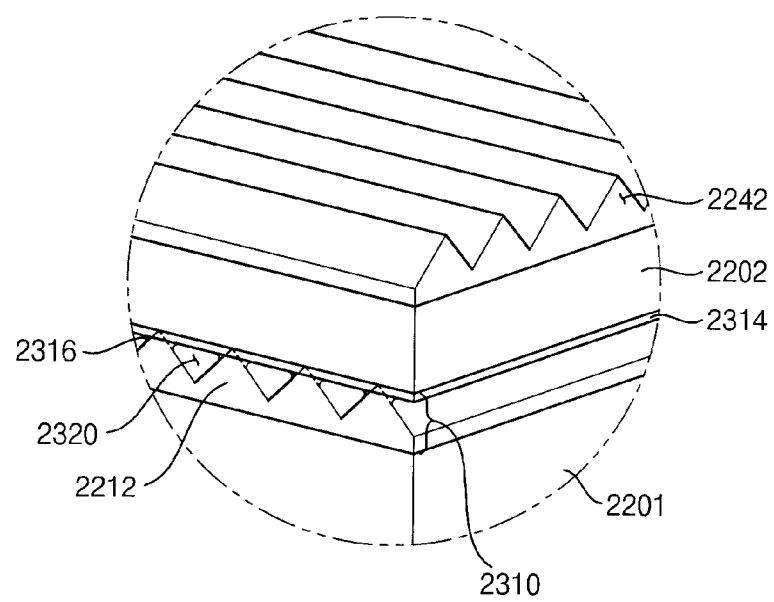
FIG. 41A is a perspective view illustrating an optical sheet according to Example Embodiment 16 of the present invention.
Figure 41B:
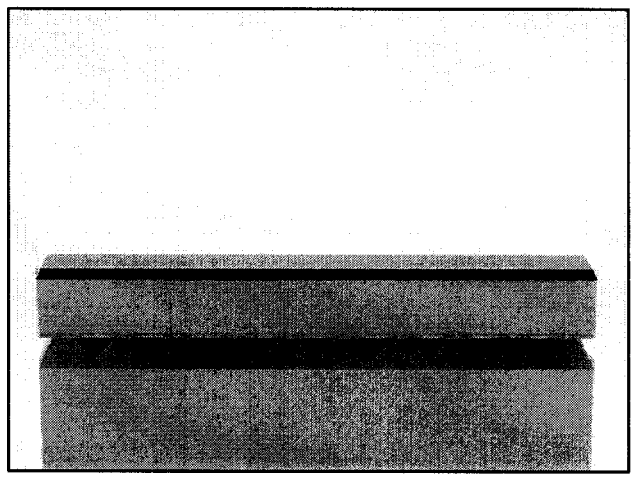
FIGS. 41B and 41C are images showing the optical sheet of FIG. 41A.
Figure 41C:
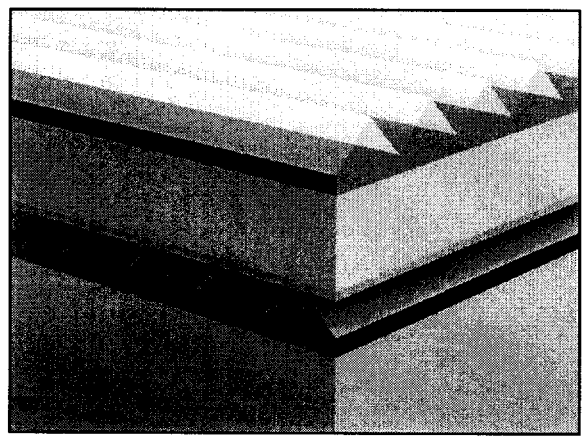

FIG. 41A is a perspective view illustrating an optical sheet according to Example Embodiment 16 of the present invention. FIGS. 41B and 41C are images showing the optical sheet of FIG. 41A. In the present embodiment, the optical sheet is substantially the same as the optical sheet of Example Embodiment 8 except for upper prism patterns 2242, and thus any further detailed descriptions concerning the same elements will be omitted.

Referring to FIGS. 41A, 41B and 41C, the optical sheet includes a first base film 2201, a light control film 2310, a second base film 2202 and a plurality of upper prism patterns 2242.

The light control film 2310 is disposed on the first base film 2201 to include a plurality of air tunnels 2320 arranged in a direction parallel with the first base film 2201. In the present embodiment, side surface edges of each of the air tunnel 2320 have a rounded shape. In the present embodiment, the side surface edges of each air tunnels 2320 may have a triangular shape, a sharp shape, etc.

The upper prism patterns 2242 is disposed on the second base film 2202 to be arranged in a direction crossing an extended direction of the air tunnels 2320. For example, the extended direction of the upper prism patterns 2242 may be substantially perpendicular to an extended direction of the air tunnels 2320. In the present embodiment, the upper prism patterns 2242 may include the same material as the prism patterns 2212. Alternatively, the upper prism patterns 2242 may include a different material from that of the prism patterns 2212.

According to the present embodiment, the air tunnels 2320 and the upper prism patterns 2242 are coupled with each other, so that front luminance may be enhanced.

Example Embodiment 17

Figure 42A:
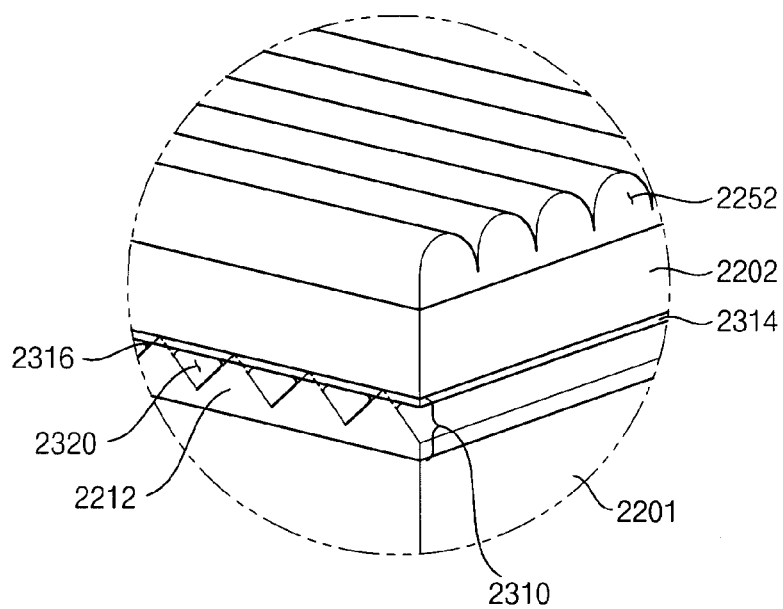
FIG. 42A is a perspective view illustrating an optical sheet according to Example Embodiment 17 of the present invention.
Figure 42B:
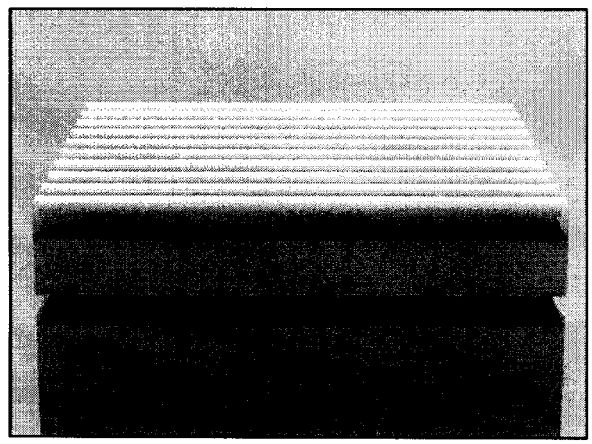
FIGS. 42B and 42C are images showing the optical sheet of FIG. 42A.
Figure 42C:
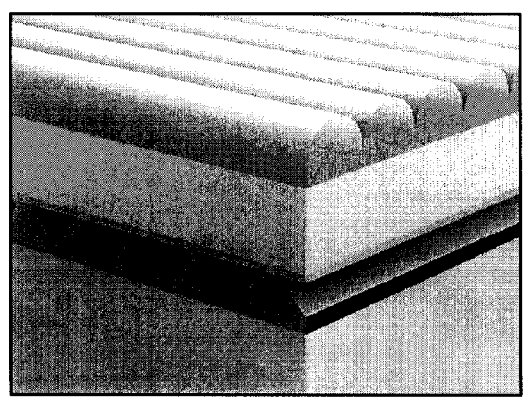

FIG. 42A is a perspective view illustrating an optical sheet according to Example Embodiment 17 of the present invention. FIGS. 42B and 42C are images showing the optical sheet of FIG. 42A. In the present embodiment, the optical sheet is substantially the same as the optical sheet of Example Embodiment 11 except for light control patterns 2252, and thus any further detailed descriptions concerning the same elements will be omitted.

Referring to FIGS. 42A, 42B and 42C, the light control patterns 2252 is disposed on the second base film 2202 to be extended in a direction crossing the air tunnels 2320. For example, the light control patterns 2252 may have a cross-sectional view of a horseshoe shape.

According to the present embodiment, the light control patterns 2252 having the horseshoe shape and the upper prism patterns 2242 are coupled with each other, so that a viewing angle may be enhanced.

Example Embodiment 18

Figure 43A:
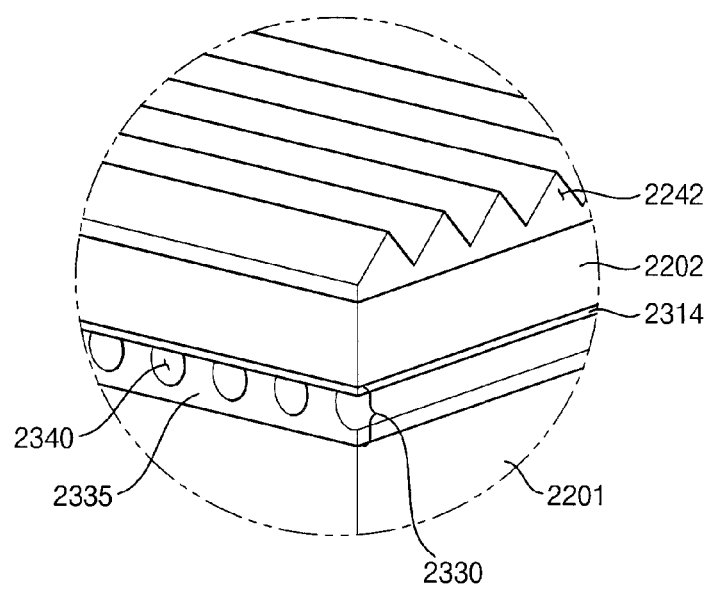
FIG. 43A is a perspective view illustrating an optical sheet according to Example Embodiment 18 of the present invention.
Figure 43B:
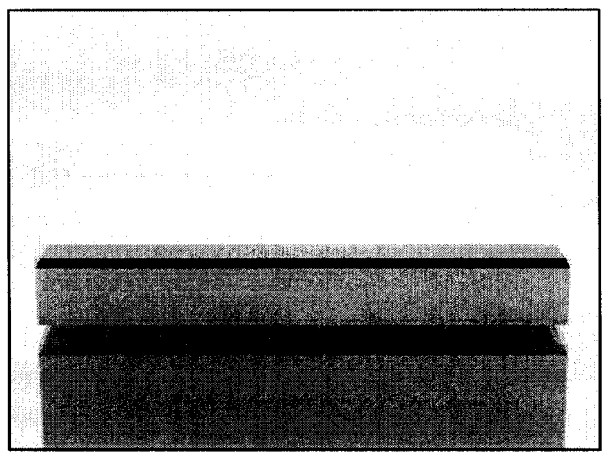
FIGS. 43B and 43C are images showing the optical sheet of FIG. 43A.
Figure 43C:
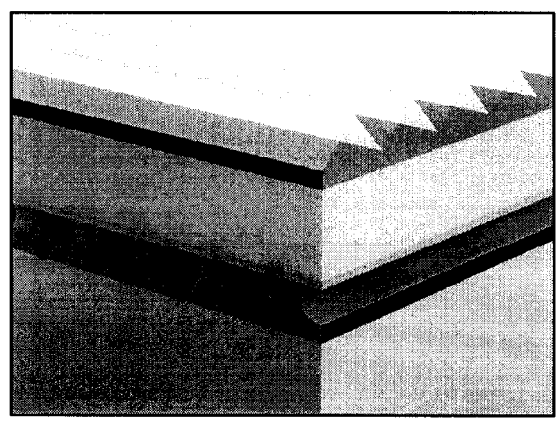

FIG. 43A is a perspective view illustrating an optical sheet according to Example Embodiment 18 of the present invention. FIGS. 43B and 43C are images showing the optical sheet of FIG. 43A. In the present embodiment, the optical sheet is substantially the same as the optical sheet of Example Embodiment 16 except for a light control film 2330, and thus any further detailed descriptions concerning the same elements will be omitted.

Referring to FIGS. 43A, 43B and 43C, the light control film 2330 is disposed on the first base film 2202 to include a plurality of air tunnels 2340 arranged in a direction parallel with the first base film 2201.

In the present embodiment, each of the air tunnels 2340 have a cross-sectional view of a horseshoe shape. The prism patterns 2335 adjacent to each other may define a circumference of the horseshoe shape.

According to the present embodiment, the air tunnels 2340 of the horseshoe shape and the upper prism patterns 2242 are coupled with each other, so that a viewing angle may be enhanced.

Example Embodiment 19

Figure 44A:
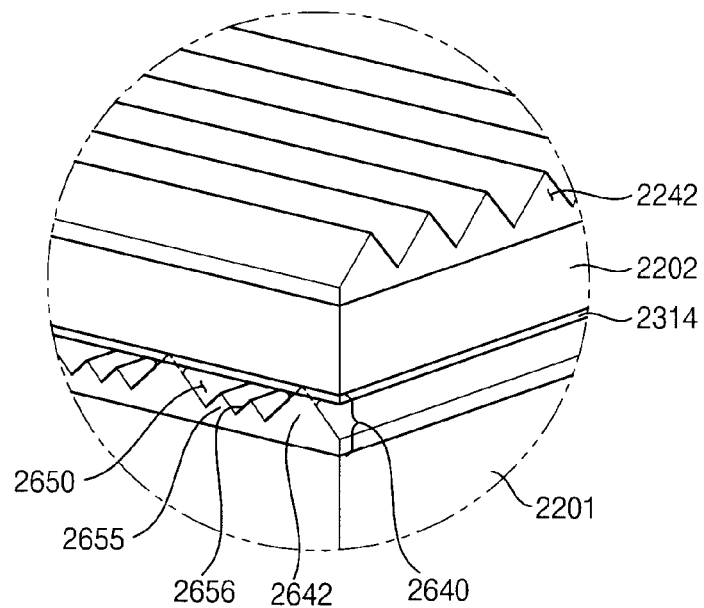
FIG. 44A is a perspective view illustrating an optical sheet according to Example Embodiment 19 of the present invention.
Figure 44B:
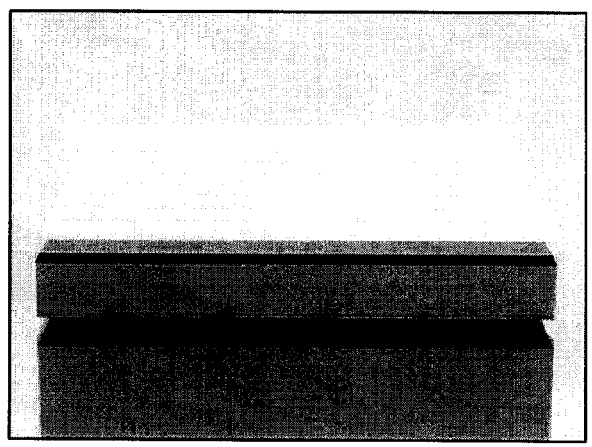
FIGS. 44B and 44C are images showing the optical sheet of FIG. 44A.
Figure 44C:
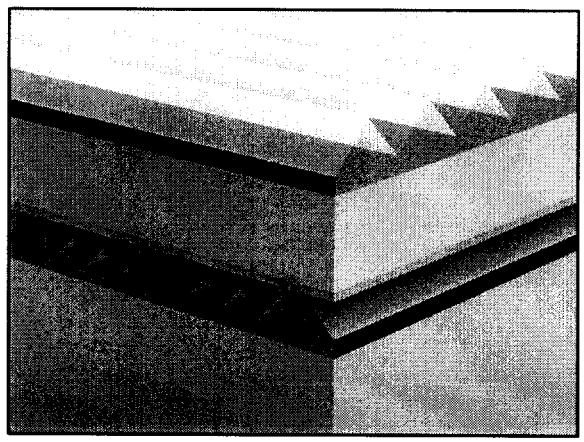

FIG. 44A is a perspective view illustrating an optical sheet according to Example Embodiment 19 of the present invention. FIGS. 44B and 44C are images showing the optical sheet of FIG. 44A. In the present embodiment, the optical sheet is substantially the same as the optical sheet of Example Embodiment 11 except for a light control film 2640, and thus any further detailed descriptions concerning the same elements will be omitted.

Referring to FIGS. 44A, 44B and 44C, the light control film 2640 is disposed on the first base film 2201 to include a plurality of air tunnels 2650 arranged in a direction parallel with the first base film 2201.

The light control film 2640 further includes a diffusion portion 2655 disposed between adjacent prism patterns 2642 to diffuse light. The diffusion portion 2655 includes an auxiliary prism 2656 extended in a direction identical to that of the prism patterns 2642.

Optical characteristics of the optical sheet of FIG. 44A were measured with respect to a brightness enhancement film (BEF) by 3M Company. A Topcon BM-7 instrument was used as a measuring device for measuring the optical characteristics.

When the front luminance of the BEF is assumed to be about 100%, it can be seen that the luminance of the optical sheet of the present embodiment was about 127.8% so that luminance has been greatly enhanced.

In the above embodiments, one light control film is disposed between two base films. In another embodiment, the optical sheet may further include a second light control film disposed on the second base film to include a plurality of air tunnels arranged in parallel with the second base film, and a third base film disposed on the second light control film to protect the second light control film. Moreover, the optical sheet may have a multilayer structure including at least four base films and at least three light control films respectively disposed between the base films.

According to the present embodiment, the air tunnels are formed within the light control film to enhance the front luminance of the LCD device. Moreover, an upper edge of the prism patterns is not exposed to an outer side thereof, so that scratches may be prevented in another optical sheet.

Moreover, the optical sheet includes the diffusion portion or the air capsule, so that the luminance uniformity of an LCD device may be enhanced. Moreover, an additional diffusion sheet is omitted, so that an assembly process of the LCD device may be simple so that manufacturing costs thereof may be decreased.

Example Embodiment 20

Figure 45:
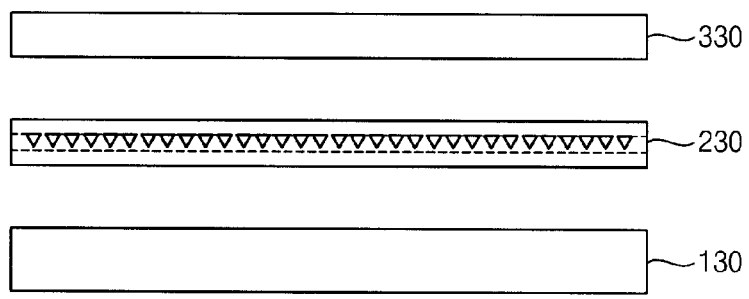
FIG. 45 is a cross-sectional view illustrating an LCD device according to Example Embodiment 20 of the present invention.

FIG. 45 is a cross-sectional view illustrating an LCD device according to Example Embodiment 20 of the present invention.

Referring to FIG. 45, the LCD device includes a light source module 310, an optical sheet 320 and an LCD panel 330.

The light source module 310 provides light toward the optical sheet 320. The light source module 310 may be classified as either a direct illumination type light source module or an edge illumination type light source module.

When the light source module 310 is a direct illumination type light source module, a plurality of light sources (not shown) such as a CCFL, a FFL, an LED, etc., may be arranged on a plane.

When the light source module 310 is an edge illumination type light source module, the light source module 310 may include a light source such as a fluorescent lamp, an LED, etc., and a light guide plate (not shown) guiding light generated by the light source toward the optical sheet 320.

The optical sheet 320 is disposed on the light source module 310 to enhance optical characteristics of light generated by the light source module 310. For example, the optical sheet 320 may enhance front luminance, luminance uniformity, etc. In the present embodiment, the optical sheet 320 may include an optical sheet which will be described below.

In another embodiment, the LCD device may further include various optical sheets such as a diffusion plate, a diffusion sheet, an optical sheet, a semitransmissive film, a protective film, etc.

The LCD panel 330 is disposed on the optical sheet 320 to display an image by transmitting light passing through the optical sheet 320 through a liquid crystal layer interposed between two substrates. Alternatively, instead of the LCD panel 330, a passive-type display panel such as an electrophoretic display device may be employed.

Figure 46:
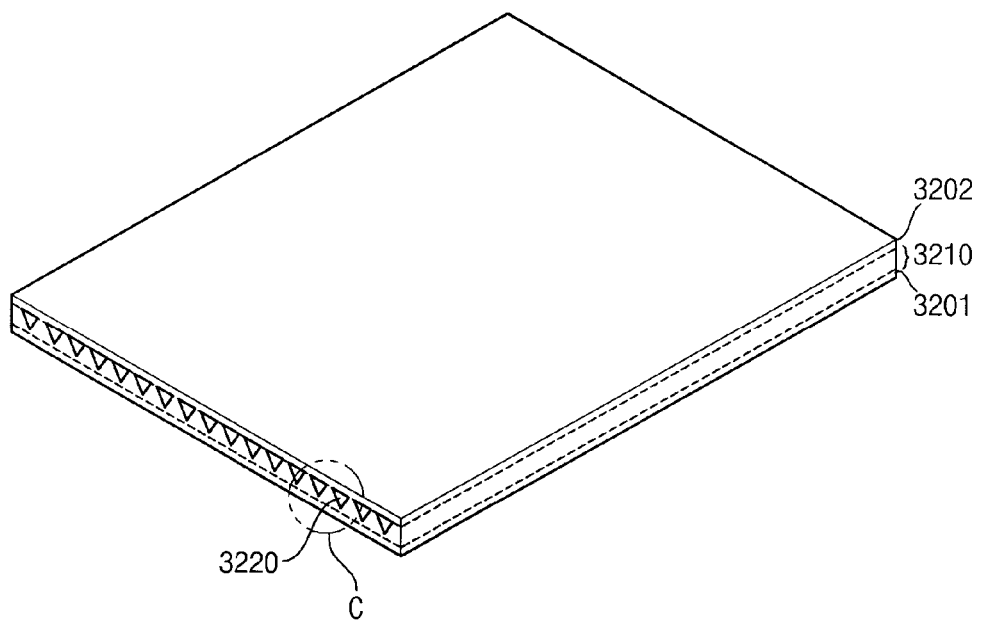
FIG. 46 is a perspective view illustrating the optical sheet of FIG. 45.
Figure 47:
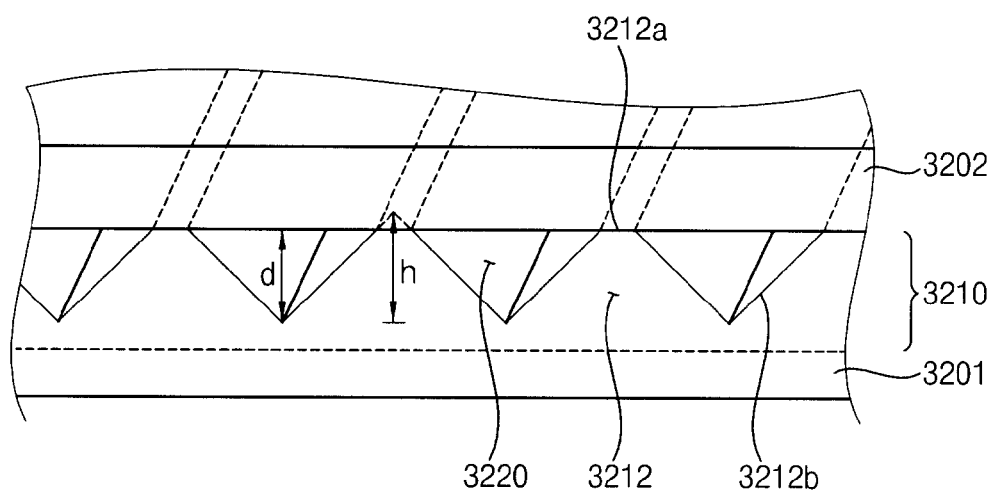
FIG. 47 is an enlarged perspective view illustrating a portion 'C' of FIG. 46.

FIG. 46 is a perspective view illustrating the optical sheet of FIG. 45. FIG. 47 is an enlarged perspective view illustrating a portion 'C' of FIG. 46.

Referring to FIGS. 46 and 47, the optical sheet 320 includes a first base film 3201, a temporary adhesive layer 3210 and a second base film 3202.

The first base film 3201 may have a film shape. The first base film 3201 may include a transparent synthetic resin. For example, the synthetic resin may include polyethylene terephthalate (PET), a methacrylic resin, an acrylic resin, a polycarbonate (PC) resin, a polyester resin, a vinyl chloride resin, etc. In the present embodiment, the first base film 3201 includes polyethylene terephthalate (PET).

The temporary adhesive layer 3210 is disposed on the first base film 3201 to include a plurality of grooves 3212*b* arranged in a direction parallel with the first base film 3201 and a contact portion 3212*a* between adjacent grooves 3212*b*.

The temporary adhesive layer 3210 includes a temporary adhesive material. In the present embodiment, the temporary adhesive material is different from a permanent adhesive material. The permanent adhesive material is a material of which an adhesive force is lost after curing. The temporary adhesive material is a material of which an adhesive force is maintained even though adhered portions are separated from an adherend so that the temporary adhesive material may be re-adhered to an adherend by pressure.

In the present embodiment, the term "temporary adhesion" is used differently from the terms "attachment" and "permanent adhesion." "Temporary adhesion" refers to an adhesive being adhered to an adherend to semi-permanently maintain an adhesive force. In contrast, "attachment" and "permanent adhesion" refer to an adhesive force only existing during a process, and the adhesive force is lost after the process is completed.

For example, the temporary adhesive material may include a rubber resin, an acrylic polymer, an acrylate, silicon, etc. In this case, the temporary adhesive material may further include auxiliary agents such as ester rubber, phenolic resin, etc., and a low molecular weight material such as castor oil, polyisobutylene, etc. In the present embodiment, when the temporary adhesive layer 3210 is temporarily adhered to the second base film 3202, the temporary adhesive layer 3210 may not be easily removed from the second base film 3202 since the temporary adhesive material has a high adhesive force.

In the present embodiment, the temporary adhesive material 3210 is integrally formed with the first base film 3201.

The second base film 3202 is temporarily adhered to the contact portion 3212a of the temporary adhesive layer 3210 to form a plurality of air tunnels 3220 between the grooves 3212b and a lower surface of the second base film 3202. The grooves 3212b define side surfaces of the air tunnels 3220, and the lower surface of the second base film 3202 defines an upper surface of the air tunnels 3220.

In the present embodiment, the air tunnels 3220 have a cross-section of a triangle shape. In this case, each of the air tunnels 3220 may have an isosceles triangle shape, a right-angle triangle shape, a trapezoidal shape, etc. In another embodiment, each of the air tunnels 3220 may have a cross-sectional shape such as a polygonal shape, a horseshoe shape, a semicircular shape, a round shape, etc.

In the present embodiment, the second base film 3202 includes the same material as the first base film 3201.

The temporary adhesive layer 3210 includes a plurality of prism patterns 3212 defined by the grooves 3212b. In the present embodiment, an upper portion of the prism patterns 3212 is removed to form the contact portion 3212a. The prism patterns 3212 are exposed by the air tunnels 3220 at the grooves 3212b, so that light rays may be refracted at a boundary surface between the prism patterns 3212 and the air tunnels 3220. Thus, light rays incident from the first base film 3201 are guided in a direction perpendicular to the first base film 3201, so that front luminance of the LCD device may be enhanced.

A distance 'd' between an outmost portion of the grooves 3212b and the second base film 3202 is smaller than an imaginary height 'h' of the prism pattern 3212.

In the present embodiment, the second base film 3202 is temporarily adhered on the temporary adhesive layer 3210 integrally formed with the first base film 3201 to form the optical sheet 320.

Figure 48:
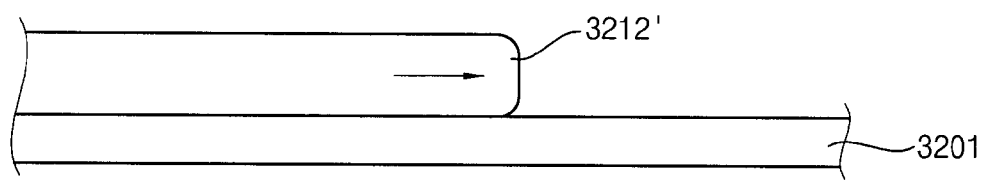
FIGS. 48, 49, 50 and 51 are cross-sectional views illustrating a method of manufacturing the optical sheet of FIG. 47.

FIGS. 48, 49, 50 and 51 are cross-sectional views illustrating a method of manufacturing the optical sheet of FIG. 47. FIG. 48 is a cross-sectional view illustrating a step of forming an adhesive coating layer 3212' on the first base film 3201.

Referring to FIG. 48, the adhesive coating layer 3212' is formed on the first base film 3201. In the present embodiment, a temporary adhesion solution having a high viscosity is coated on the first base film 3201 to form the temporary adhesive layer 3212'.

Figure 49:
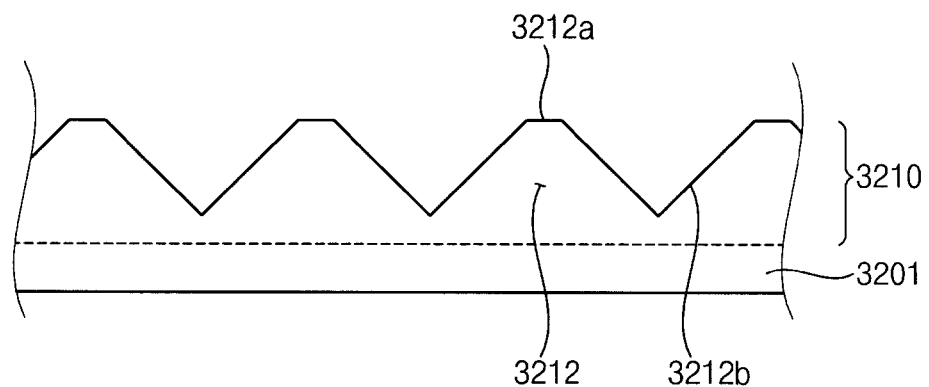

FIG. 49 is a cross-sectional view illustrating a step of patterning the temporary adhesion coating layer 3212' of FIG. 48.

Figure 50:
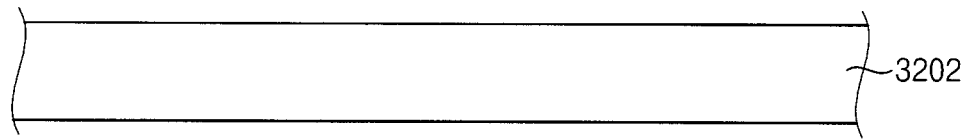

Referring to FIG. 50, the temporary adhesion coating layer 3212' is patterned to form the grooves 3212b and the contact portion 3212a. In the present embodiment, the grooves 3212b and the contact portion 3212a are formed through various methods such as roller, pressing, printing, etching, etc. In the present embodiment, the contact portion 3212a is parallel with a surface of the first base film 3201.

Then, the viscosity of the photocurable coating layer 3212' (as shown in FIG. 48) where the grooves 3212b and the contact portion 3212a are formed thereon to form the temporary adhesive layer 3212 that is integrally formed with the first base film 3201. For example, the viscosity of the temporary adhesive layer 3212' may be increased through a drying process, a heating process, an exposure process, etc. In this case, the exposure process may use light rays such as ultraviolet light, visible light, etc. In another embodiment, a step patterning the temporary adhesion coating layer 3212' and a step of increasing the viscosity of the temporary adhesion coating layer 3212' may be simultaneously performed.

FIG. 50 is a cross-sectional view illustrating a step of forming the second base film 3202.

Referring to FIG. 50, the second base film 3202 has a planar surface.

In the present embodiment, a primer coating layer (not shown) may be formed on a first surface of the second base film 3202. For example, the primer coating layer may be formed through a drying process, a heating process, an exposure process, etc., after a liquid resin having a high viscosity is coated on the second base film 3202.

The primer coating layer includes an organic material that is different from the remaining portion of the second base film 3202 to enhance a refraction ratio of the second base film 3202 and a temporary adhesive force for the temporary adhesive layer 3212.

Figure 51:
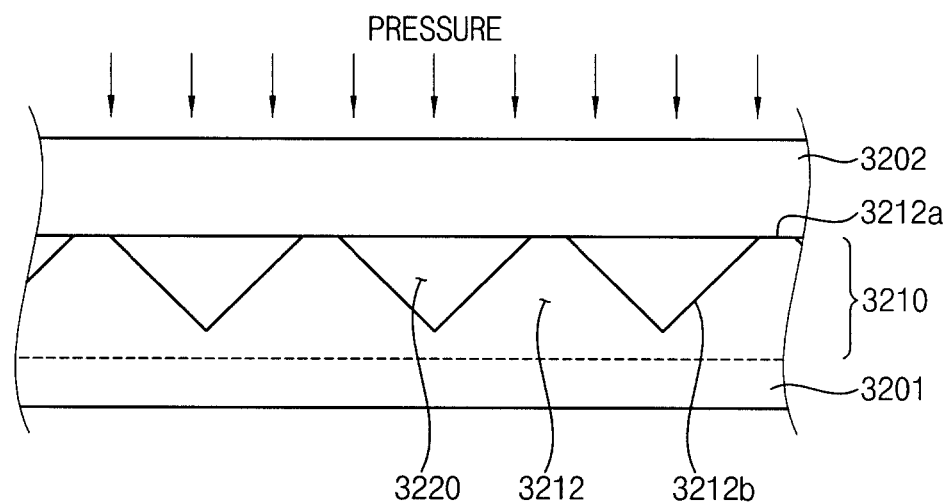

FIG. 51 is a cross-sectional view illustrating a step of temporarily adhering the second base film 3202 of FIG. 50 on the temporary adhesive layer 3210 of FIG. 49.

Referring to FIG. 51, the second base film 3202 is temporarily adhered to the contact portion 3212a of the temporary adhesive layer 3210. In the present embodiment, the temporary adhesive layer 3210 is a pressure-sensitive temporary adhesive layer. When the second base film 3202 is pressed, a lower surface of the second base film 3202 is temporarily adhered to the contact portion 3212a of the temporary adhesive layer 3210.

In the present embodiment, the second base film 3202 is temporarily adhered on the temporary adhesive layer 3210 by using only pressure. In another embodiment, the second base film 3202 is temporarily pre-adhered on the temporary adhesive layer 3210 by using pressure, and then light such as ultraviolet light is re-irradiated to the temporary adhesive layer 3210 to further increase a temporary adhesive force of the temporary adhesive layer 3210 so that the second base film 3202 may be strongly adhered on the temporary adhesive layer 3210. When the second base film 3202 is temporarily adhered on the temporary adhesive layer 3210 by using pressure, a manufacturing process thereof may be simple compared to re-irradiating ultraviolet light. Moreover, when ultraviolet light is re-irradiated, a portion of ultraviolet light is dispersed by the second base film 3202 so that energy consumption is increased. Thus, the temperature of a lamp used for re-irradiating the ultraviolet light may be increased, and thus a fire hazard may be created.

According to the present embodiment, the air tunnels 3220 are formed within the optical sheet 320 to enhance the front luminance of the LCD device. Moreover, an upper edge of the prism patterns 3212 is not exposed to an outer side thereof, so that scratches may be prevented in another optical sheet.

Moreover, since the temporary adhesive force of the contact portion 3212a of the temporary adhesive layer 3210 is maintained after the optical sheet 320 is manufactured, even though a portion of the second base film 3202 is stripped from the contact portion 3212a due to impacts, the stripped portion may again be temporarily adhered to the contact portion 3212a by pressing the second base film 3202.

Furthermore, a manufacturing process of the optical sheet 320 may be simple, so that manufacturing costs of the optical sheet 320 may be decreased.

Example Embodiment 21

Figure 52:
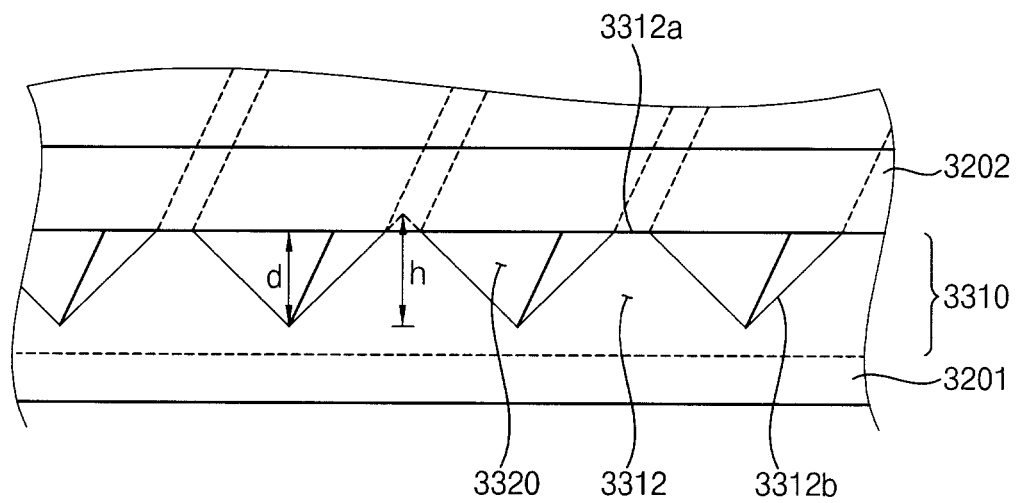
FIG. 52 is a perspective view illustrating an optical sheet according to Example Embodiment 21 of the present invention.

FIG. 52 is a perspective view illustrating an optical sheet according to Example Embodiment 21 of the present invention. In the present embodiment, the optical sheet is substantially the same as the optical sheet of FIGS. 46, 47, 48, 49, 50 and 51 except for a light guiding layer, and thus any further detailed descriptions concerning the same elements will be omitted.

Referring to FIG. 52, the optical sheet 320 includes a first base film 3201, a light-guiding layer 3310 and a second base film 3202.

In the present embodiment, the light-guiding layer 3310 includes a photocurable resin. The light-guiding layer 3310 includes a plurality of grooves 3312b and an adhesive portion 3312a. Here, the light-guiding layer 3310 may include a thermosetting resin, a thermoplastic resin, a photoplastic resin, etc. The adhesive portion 3312a is directly attached to a lower surface of the second base film 3202.

The second base film 3202 may have a film shape. The second film 3202 includes a transparent synthetic resin. For example, the synthetic resin may include polyethylene terephthalate (PET), a methacrylic resin, an acrylic resin, polycarbonate (PC) resin, a polyester resin, a vinyl chloride resin, etc. In the present embodiment, the second base film 3202 includes polyethylene terephthalate (PET).

Figure 53:
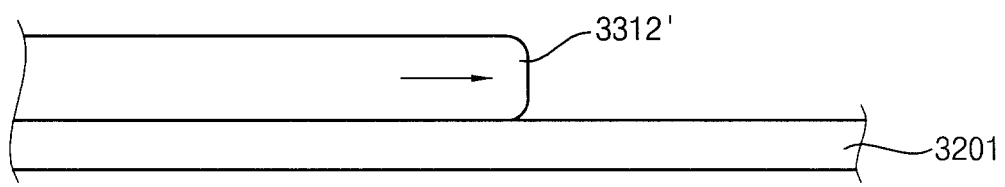
FIGS. 53, 54, 55 and 56 are cross-sectional views illustrating a method of manufacturing the optical sheet of FIG. 52.

FIGS. 53, 54, 55 and 56 are cross-sectional views illustrating a method of manufacturing the optical sheet of FIG. 52. FIG. 53 is a cross-sectional view illustrating a step of forming a photocurable coating layer 3312' on the first base film 3201.

Referring to FIG. 53, the photocurable coating layer 3312' is formed on the first base film 3201. In the present embodiment, the photocurable coating layer 3312' may include a material which is cured by irradiating ultraviolet light. In another embodiment, a thermosetting coating layer (not shown) may be formed on the first base film 3201.

Figure 54:
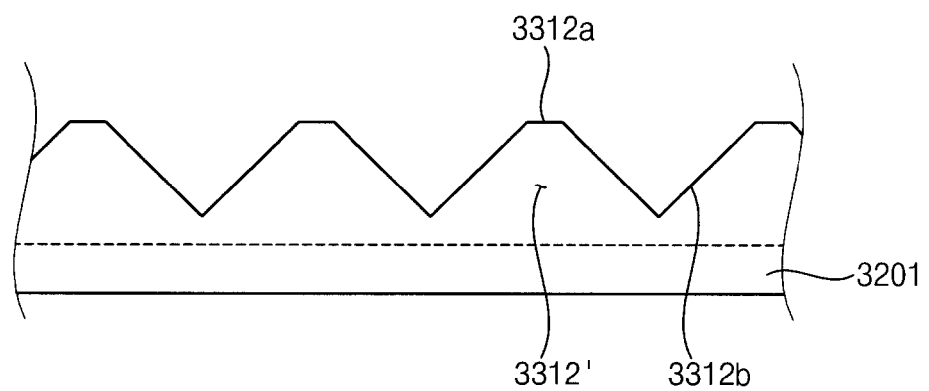

FIG. 54 is a cross-sectional view illustrating a step of patterning the photocurable coating layer 3312' of FIG. 53.

Referring to FIG. 54, the photocurable coating layer 3312' is patterned to form the grooves 3312b and the adhesive portion 3312a. In the present embodiment, the grooves 3312b and the adhesive portion 3312a are formed through various methods such as roller, pressing, printing, etching, etc. In the present embodiment, the adhesive portion 3312a is parallel with a surface of the first base film 3201.

Figure 55:
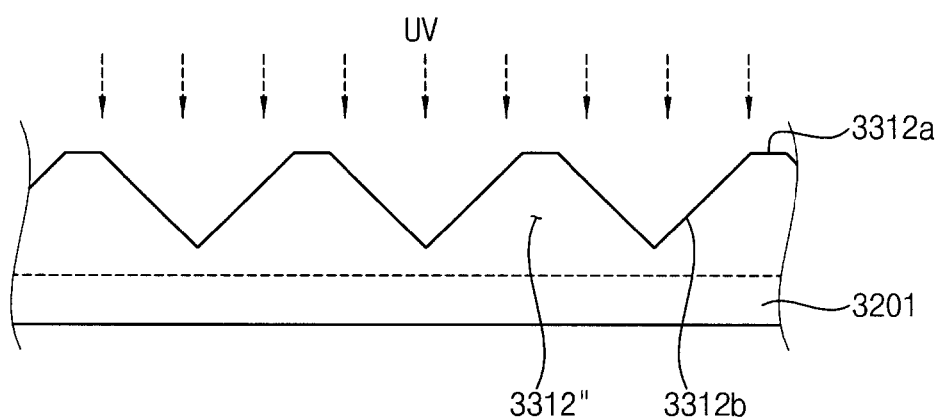

FIG. 55 is a cross-sectional view illustrating a step of increasing the viscosity of the photocurable coating layer 3312' of FIG. 54.

Referring to FIG. 55, the viscosity of the photocurable coating layer 3312' (as shown in FIG. 54) where the grooves 3312b and the adhesive portion 3312a are formed thereon. For example, the viscosity of the photocurable coating layer 3312' may be increased through a drying process, a heating process, an exposure process, etc. In the present embodiment, the viscosity of the photocurable coating layer 3312' may be increased by using an ultraviolet light. In this case, a step patterning the photocurable coating layer 3312' and a step of increasing the viscosity of the photocurable coating layer 3312' may be simultaneously performed. In another embodiment, the step of increasing the viscosity of the photocurable coating layer 3312' may be omitted.

Figure 56:
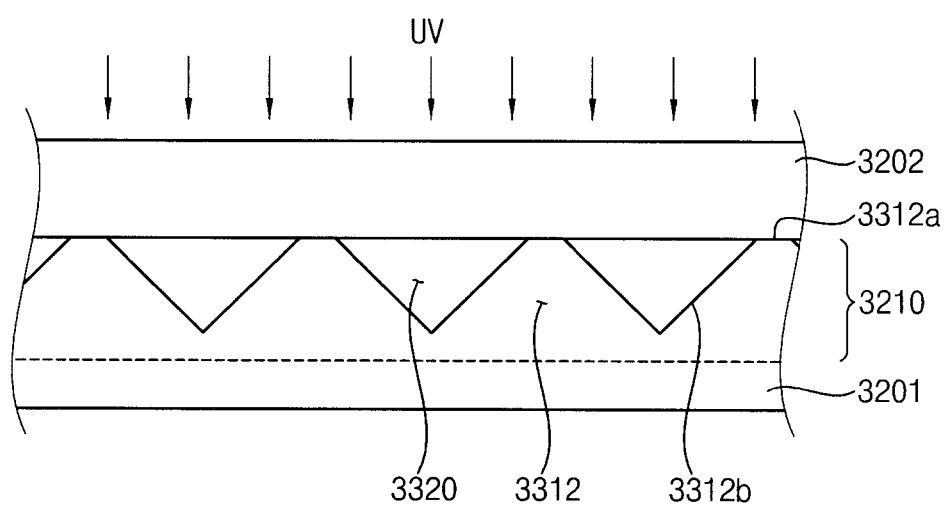

FIG. 56 is a cross-sectional view illustrating a step of forming the optical sheet by using the photocurable coating layer 3312" of FIG. 55.

Referring to FIG. 56, the second base film 3202 is attached on the adhesive portion 3312a of the photocurable coating layer 3312" (as shown in FIG. 55). In the present embodiment, the photocurable coating layer 3312" maintains fluidity, so that the second base film 3202 is attached on the adhesive portion 3312a of the photocurable coating layer 3312" due to a surface tension of the second base film 3202 of the photocurable coating layer 3312".

Then, the photocurable coating layer 3312" disposed between the first base film 3201 and the second base film 3202 is cured to form the light-guiding layer 3310 that is integrally formed with the first base film 3201 and the second base film 3202.

According to the present embodiment, the light-guiding layer 3310 is integrally formed with the first base film 3201 and the second base film 3202 to enhance the physical stability of the optical sheet.

Moreover, a manufacturing process of the optical sheet is simplified, so that manufacturing costs thereof may be decreased.

Example Embodiment 22

Figure 57:
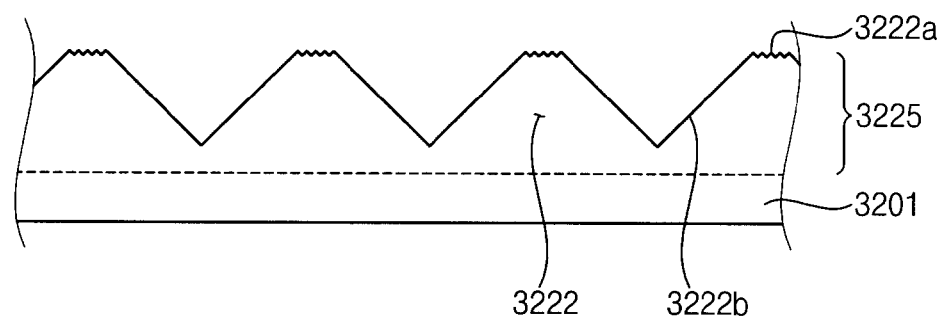
FIG. 57 is a cross-sectional view illustrating a portion of a method of manufacturing the optical sheet according to Example Embodiment 22 of the present invention.

FIG. 57 is a cross-sectional view illustrating a portion of a method of manufacturing the optical sheet according to Example Embodiment 22 of the present invention. In the present embodiment, the optical sheet is substantially the same as the optical sheet of FIGS. 46, 47, 48, 49, 50 and 51 except for a contact portion, and thus any further detailed descriptions concerning the same elements will be omitted.

Referring to FIG. 57, a temporary adhesion coating layer 3212' (as shown in FIG. 48) is formed on a first base film 3201, and then the temporary adhesion coating layer 3212' is patterned to form a plurality of grooves 322b and a contact portion 3222a.

In the present embodiment, the contact portion 3222a has a surface which a roughness is high. For example, the contact portion 3222a may have various shapes such as an irregular convex-concave pattern, an embossing pattern, a protrusion pattern, a recess pattern, etc.

Then, the second base film 3202 (as shown in FIG. 51) is temporarily adhered on the contact portion 3222a of the temporary adhesive layer 3210.

According to the present embodiment, the roughness of the contact portion 3222a is increased, so that adhesiveness between the contact portion 3222a and the second base film 3202 may be increased.

Example Embodiment 23

Figure 58:
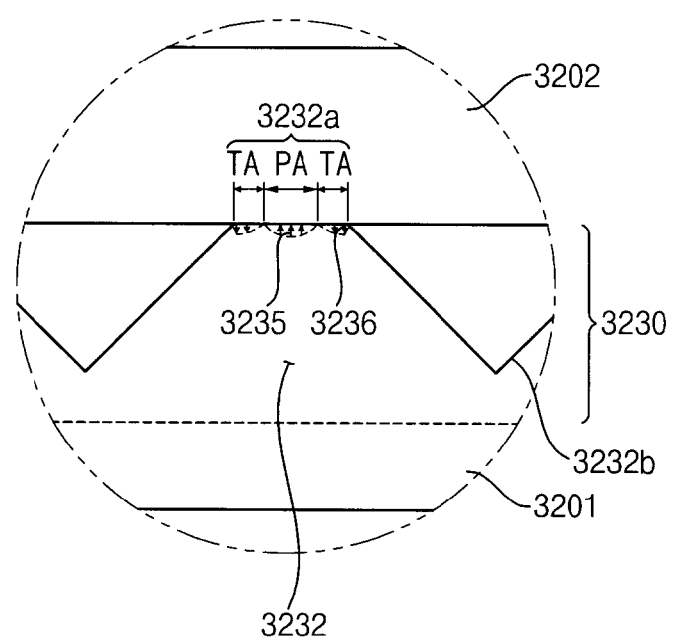
FIG. 58 is a cross-sectional view illustrating an optical sheet according to Example Embodiment 23 of the present invention.

FIG. 58 is a cross-sectional view illustrating an optical sheet according to Example Embodiment 23 of the present invention. In the present embodiment, the optical sheet is substantially the same as the optical sheet of FIGS. 46, 47, 48, 49, 50 and 51 except for an active combination between a contact portion and a second base film, and thus any further detailed descriptions concerning the same elements will be omitted.

Referring to FIG. 58, the optical sheet includes a first base film 3201, a temporary adhesive layer 3230 and a second base film 3202.

The temporary adhesive layer 3230 is disposed on the first base film 3201 to include a plurality of grooves 3232b and a contact portion 3232a. The grooves 3232b are arranged in a direction parallel with the first base film 3201. The contact portion 3232a is formed between adjacent grooves 3232b. The temporary adhesive layer 3230 includes a temporary adhesion material.

The second base film 3202 is temporarily adhered to the contact portion 3232a to form a plurality of air grooves 3220 between the grooves 3232b and the second base film 3202.

The contact portion 3232a of the temporary adhesive layer 3230 and the second base film 3202 may be an active combination. In the present embodiment, the active combination refers to the temporary adhesive layer 3230 being temporarily adhered to the second base film 3202 in a state in which a compression stress is applied to a central area PA of the contact portion 3232*a* and a tensile stress is applied to a peripheral area TA.

When external impacts are applied to the optical sheet, a portion corresponding to the active combination may absorb the external impacts due to a balance of the compression stress and the tensile stress. Thus, a coupling of the contact portion 3232*a* and the second base film 3202 may be stably maintained.

Figure 59:
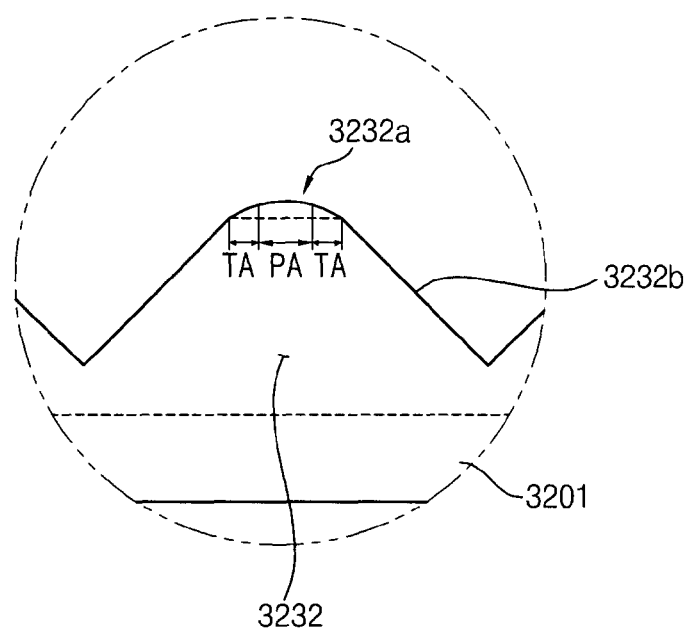
FIG. 59 is a cross-sectional view illustrating a method of manufacturing the optical sheet of FIG. 58.

FIG. 59 is a cross-sectional view illustrating a method of manufacturing the optical sheet of FIG. 58.

Referring to FIG. 59, an adhesion coating layer (3212' as shown in FIG. 48) is formed on a first base film 3201, and then the temporary adhesion coating layer 3212' is patterned to form groves 3232*b* and a contact portion 3232*a*.

In the present embodiment, the contact portion 3232*a* has a convex shape which a central area PA thereof is protruded from a peripheral area TA thereof. For example, the contact portion 3232*a* may include a convex portion that is extended in a direction parallel with the grooves 3232*b* and a plurality of convex portions that is discontinuously arranged in a direction parallel with the grooves 3232*b*.

Then, the second base film 3202 (as shown in FIG. 51) is temporarily adhered on the contact portion 3232*a* of the temporary adhesive layer 3230.

According to the present embodiment, a shock-absorbing force for external impacts may be increased due to the active combination of the contact portion 3232*a* and the second base film 3202.

Example Embodiment 24

Figure 60:
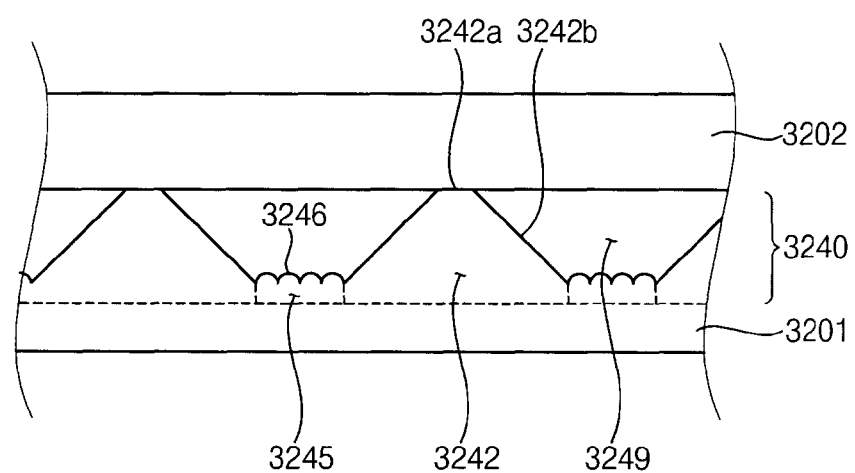
FIG. 60 is a cross-sectional view illustrating an optical sheet according to Example Embodiment 24 of the present invention.

FIG. 60 is a cross-sectional view illustrating an optical sheet according to Example Embodiment 24 of the present invention. In the present embodiment, the optical sheet is substantially the same as the optical sheet of FIGS. 46, 47, 48, 49, 50 and 51 except for the diffusion member, and thus any further detailed descriptions concerning the same elements will be omitted.

Referring to FIG. 60, the optical sheet includes a first base film 3201, a temporary adhesive layer 3240 and a second base film 3202.

The temporary adhesive layer 3240 is disposed on the first base film 3201 to include a plurality of prism patterns 3242 and a diffusion portion 3245. The prism patterns 3242 are extended in a direction parallel with the first base film 3201 to have a cross-section of a trapezoidal shape in which an upper portion thereof has a planar shape. The diffusion portion 3245 is disposed between adjacent prism patterns 3242. An upper portion of the prism patterns 3242 forms a contact portion 3242*a* which is temporarily adhered to the second base film 3202.

An inclined surface 3242*b* is formed in two sides of the contact portion 3242*a*, so that the inclined surface 3242*b* guides incident light from a lower portion thereof toward a front surface direction.

In the present embodiment, the diffusion portion 3245 includes a plurality of protrusions 3246 of a hemispherical shape. In another embodiment, the diffusion portion 2345 may have various shapes such as pyramid-shaped protrusions, prism-shaped protrusions, hemispherical shape recesses, pyramid-shaped recesses, prism-shaped recesses, etc.

According to the present embodiment, the optical sheet includes the prism patterns 3242 and the diffusion portion 3245, so that the front luminance and luminance uniformity of light rays passing through the optical sheet are simultaneously enhanced.

Example Embodiment 25

Figure 61:
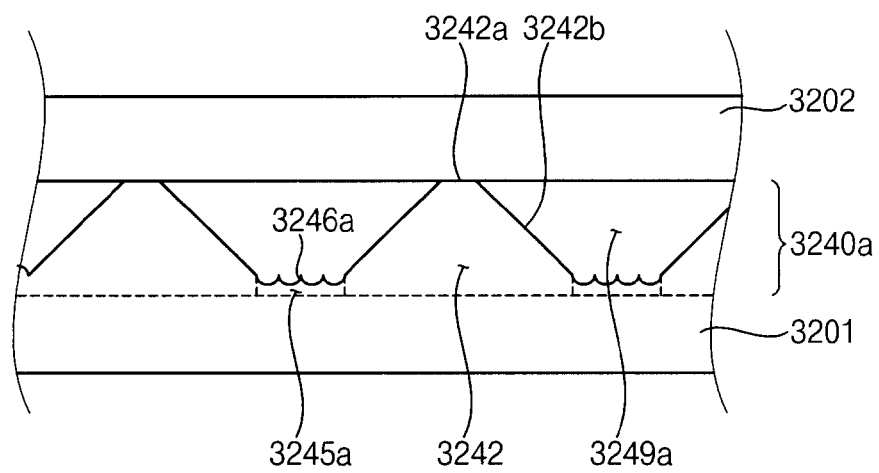
FIG. 61 is a cross-sectional view illustrating an optical sheet according to Example Embodiment 25 of the present invention.

FIG. 61 is a cross-sectional view illustrating an optical sheet according to Example Embodiment 25 of the present invention. In the present embodiment, the optical sheet is substantially the same as the optical sheet of FIG. 60 except for the diffusion member, and thus any further detailed descriptions concerning the same elements will be omitted.

Referring to FIG. 61, the optical sheet includes a first base film 3201, a temporary adhesive layer 3240*a* and a second base film 3202.

The temporary adhesive layer 3240*a* is disposed on the first base film 3201 to include a plurality of prism patterns 3242 and a diffusion portion 3245*a*. The prism patterns 3242 are extended in a direction parallel with the first base film 3201 to have a cross-section of a trapezoidal shape in which an upper portion thereof has a planar shape. The diffusion portion 3245*a* is disposed between adjacent prism patterns 3242. An upper portion of the prism patterns 3242 forms a contact portion 3242*a* which is temporarily adhered to the second base film 3202.

In the present embodiment, the diffusion portion 3245*a* includes a plurality of recesses 3246*a* of a hemispherical shape.

Example Embodiment 26

Figure 62:
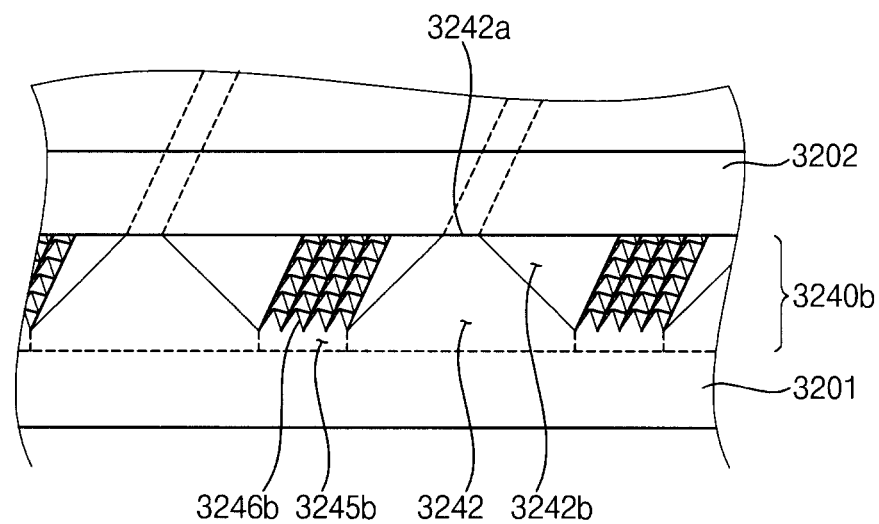
FIG. 62 is a perspective view illustrating an optical sheet according to Example Embodiment 26 of the present invention.

FIG. 62 is a perspective view illustrating an optical sheet according to Example Embodiment 26 of the present invention. In the present embodiment, the optical sheet is substantially the same as the optical sheet of FIG. 60 except for the diffusion member, and thus any further detailed descriptions concerning the same elements will be omitted.

Referring to FIG. 62, the optical sheet includes a first base film 3201, a temporary adhesive layer 3240*b* and a second base film 3202.

The temporary adhesive layer 3240*b* is disposed on the first base film 3201 to include a plurality of prism patterns 3242 and a diffusion portion 3245*b*. The prism patterns 3242 are extended in a direction parallel with the first base film 3201 to have a cross-section of a trapezoidal shape in which an upper portion thereof has a planar shape. The diffusion portion 3245*b* is disposed between adjacent prism patterns 3242. An upper portion of the prism patterns 3242 forms a contact portion 3242*a* which is temporarily adhered to the second base film 3202.

In the present embodiment, the diffusion portion 3245*b* includes a plurality of protrusions 3246*b* of a pyramid shape.

Example Embodiment 27

Figure 63:
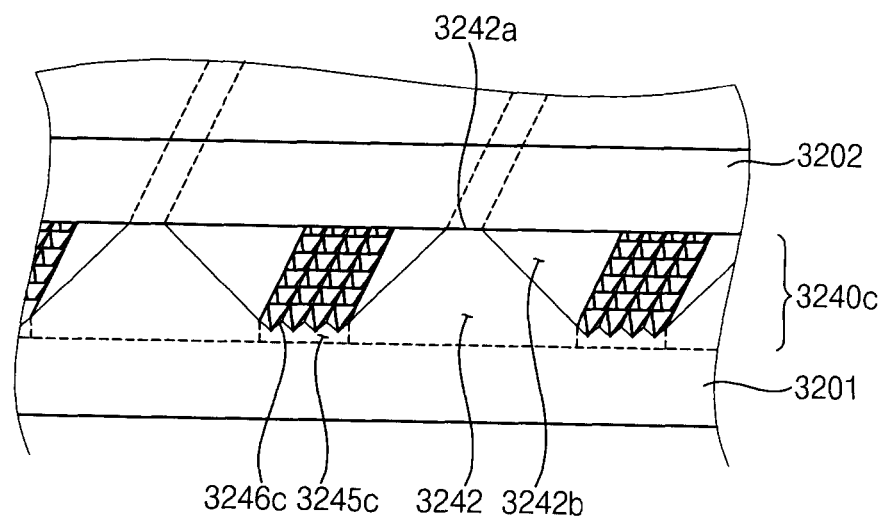
FIG. 63 is a perspective view illustrating an optical sheet according to Example Embodiment 27 of the present invention.

FIG. 63 is a perspective view illustrating an optical sheet according to Example Embodiment 27 of the present invention. In the present embodiment, the optical sheet is substantially the same as the optical sheet of FIG. 60 except for the diffusion member, and thus any further detailed descriptions concerning the same elements will be omitted.

Referring to FIG. 63, the optical sheet includes a first base film 3201, a temporary adhesive layer 3240*c* and a second base film 3202.

The temporary adhesive layer 3240c is disposed on the first base film 3201 to include a plurality of prism patterns 3242 and a diffusion portion 3245c. The prism patterns 3242 are extended in a direction parallel with the first base film 3201 to have a cross-section of a trapezoidal shape in which an upper portion thereof has a planar shape. The diffusion portion 3245c is disposed between adjacent prism patterns 3242. An upper portion of the prism patterns 3242 forms a contact portion 3242a which is temporarily adhered to the second base film 3202.

In the present embodiment, the diffusion portion 3245c includes a plurality of recesses 3246c of a pyramid shape.

Example Embodiment 28

Figure 64:
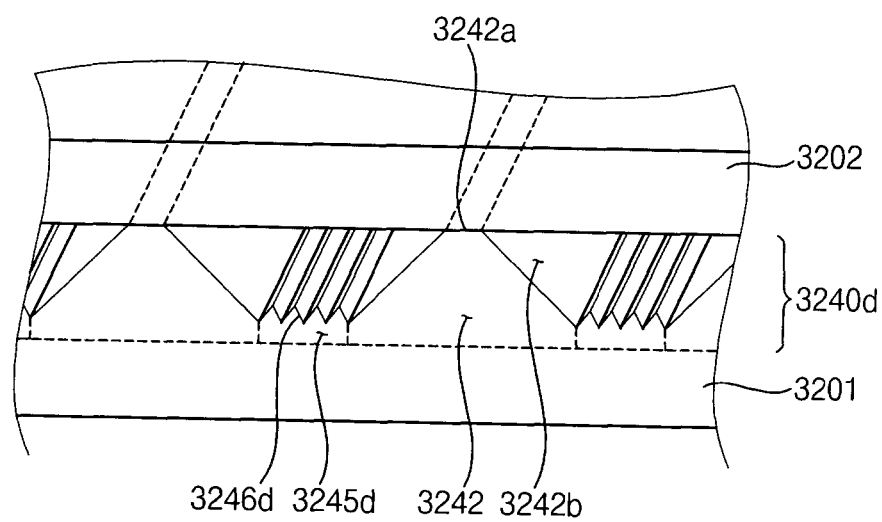
FIG. 64 is a perspective view illustrating an optical sheet according to Example Embodiment 28 of the present invention.

FIG. 64 is a perspective view illustrating an optical sheet according to Example Embodiment 28 of the present invention. In the present embodiment, the optical sheet is substantially the same as the optical sheet of FIG. 60 except for the diffusion member, and thus any further detailed descriptions concerning the same elements will be omitted.

Referring to FIG. 64, the optical sheet includes a first base film 3201, an adhesive layer 3240d and a second base film 3202.

The temporary adhesive layer 3240d is disposed on the first base film 3201 to include a plurality of prism patterns 3242 and a diffusion portion 3245d. The prism patterns 3242 are extended in a direction parallel with the first base film 3201 to have a cross-section of a trapezoidal shape in which an upper portion thereof has a planar shape. The diffusion portion 3245d is disposed between adjacent prism patterns 3242. An upper portion of the prism patterns 3242 forms a contact portion 3242a which is temporarily adhered to the second base film 3202.

In the present embodiment, the diffusion portion 3245d includes a plurality of auxiliary prism patterns 3246d.

According to the present embodiment, the front luminance and luminance uniformity of light rays passing through the optical sheet may be enhanced due to the auxiliary prism patterns 3246d.

Example Embodiment 29

Figure 65:
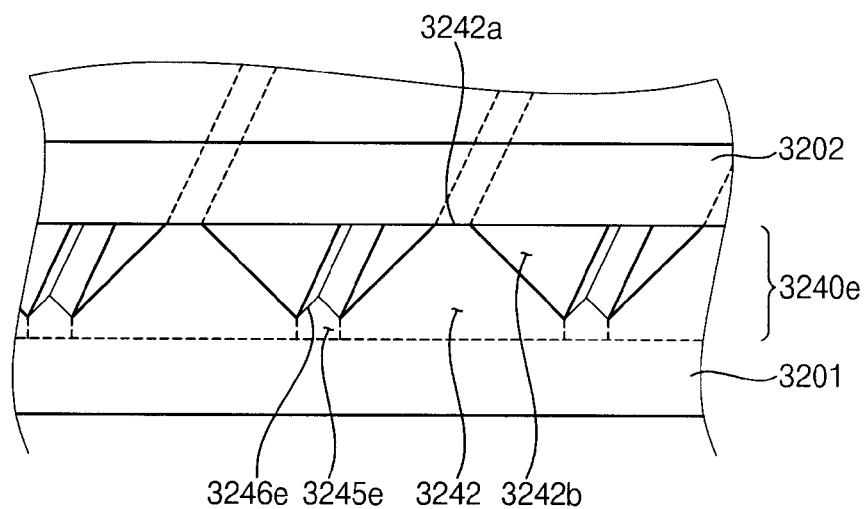
FIG. 65 is a perspective view illustrating an optical sheet according to Example Embodiment 29 of the present invention.

FIG. 65 is a perspective view illustrating an optical sheet according to Example Embodiment 29 of the present invention. In the present embodiment, the optical sheet is substantially the same as the optical sheet of FIG. 60 except for the number of auxiliary prism patterns, and thus any further detailed descriptions concerning the same elements will be omitted.

Referring to FIG. 65, the optical sheet includes a first base film 3201, an adhesive layer 3240e and a second base film 3203.

The temporary adhesive layer 3240e is disposed on the first base film 3201 to include a plurality of prism patterns 3242 and a diffusion portion 3245e. The prism patterns 3242 are extended in a direction parallel with the first base film 3201 to have a cross-section of a trapezoidal shape in which an upper portion thereof has a planar shape. The diffusion portion 3245e is disposed between adjacent prism patterns 3242. An upper portion of the prism patterns 3242 forms a contact portion 3242a which is temporarily adhered to the second base film 3202.

In the present embodiment, the diffusion portion 3245e includes a plurality of auxiliary prism patterns 3246e, and one auxiliary prism pattern 3246e is formed between adjacent prism patterns 3242.

Example Embodiment 30

Figure 66:
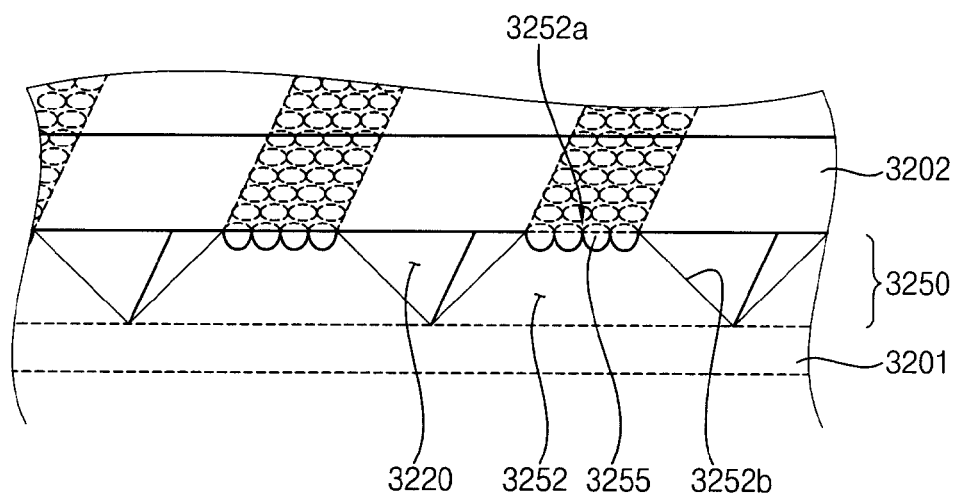
FIG. 66 is a perspective view illustrating an optical sheet according to Example Embodiment 30 of the present invention.

FIG. 66 is a perspective view illustrating an optical sheet according to Example Embodiment 30 of the present invention. In the present embodiment, the optical sheet is substantially the same as the optical sheet of FIGS. 46, 47, 48, 49, 50 and 51 except for an air capsule, and thus any further detailed descriptions concerning the same elements will be omitted.

Referring to FIG. 66, the optical sheet includes a first base film 3201, a temporary adhesive layer 3250 and a second base film 3202.

The temporary adhesive layer 3250 is disposed on the first base film 3201 to include a plurality of grooves 3252b arranged in a direction parallel with the first base film 3201 and a contact portion 3252a disposed between adjacent grooves 3252b. The temporary adhesive layer 3250 includes a temporary adhesive material.

In the present embodiment, the contact portion 3252a includes a plurality of recesses.

The second base film 3202 is temporarily adhered to the contact portion 3252a to include a plurality of air tunnels 3220 and a plurality of air capsules 3255. The air tunnels 3220 are formed between the grooves 3252b and a lower surface of the second base film 3202, and the air capsules 3255 are formed between the recesses of the contact portion 3252a and the lower surface of the second base film 3202.

In the present embodiment, the air capsules 3255 have a hemispherical shape. Alternatively, the air capsules 3255 may have various shapes such as a pyramid shape, a prism shape, etc.

According to the present embodiment, the optical sheet includes the air capsules 3255 to increase an area where light passing through the optical sheet is diffused to enhance a diffusion effect. Thus, front luminance and luminance uniformity are simultaneously enhanced. Moreover, a viewing angle is increased so that display quality may be enhanced.

Example Embodiment 31

Figure 67:
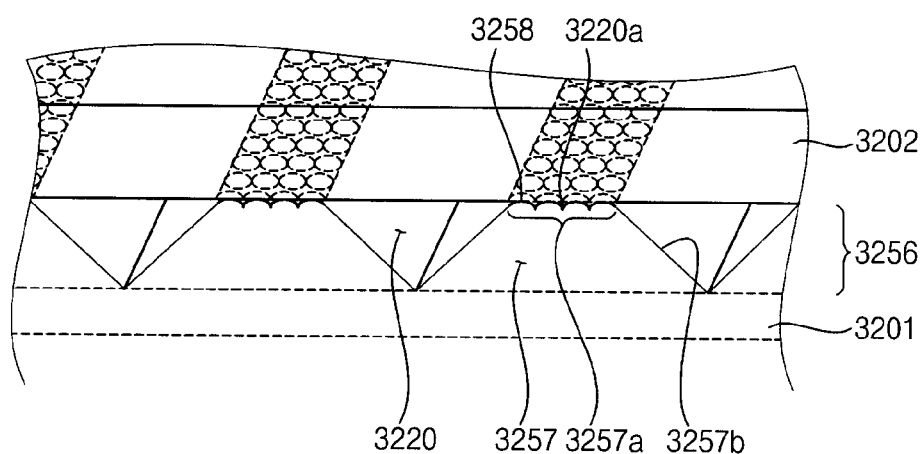
FIG. 67 is a perspective view illustrating an optical sheet according to Example Embodiment 31 of the present invention.

FIG. 67 is a perspective view illustrating an optical sheet according to Example Embodiment 31 of the present invention. In the present embodiment, the optical sheet is substantially the same as the optical sheet of FIG. 66 except for an air capsule, and thus any further detailed descriptions concerning the same elements will be omitted.

Referring to FIG. 67, the optical sheet includes a first base film 3201, a temporary adhesive layer 3256 and a second base film 3202.

The temporary adhesive layer 3256 is disposed on the first base film 3201 to include a plurality of grooves 3257b arranged in a direction parallel with the first base film 3201 and a contact portion 3257a disposed between adjacent grooves 3257b. The temporary adhesive layer 3256 includes a temporary adhesive material.

In the present embodiment, the contact portion 3257a includes a plurality of protrusions 3258.

The second base film 3202 is temporarily adhered to an upper portion of the protrusions 3258 of the contact portion 3257a of the temporary adhesive layer 3256 to form a plurality air tunnels 3220 and a plurality of air nets 3220a. The air tunnels 3220 are formed between the grooves 3257b and a lower surface of the second base film 3202, and the air nets 3220a are formed between the recesses of the contact portion 3257a and the lower surface of the second base film 3202.

According to the present embodiment, the optical sheet includes the air nets 3220a to increase an area where light passing through the optical sheet is diffused to enhance a diffusion effect. Thus, front luminance and luminance uniformity are simultaneously enhanced. Moreover, a viewing angle is increased so that display quality may be enhanced.

Example Embodiment 32

Figure 68:
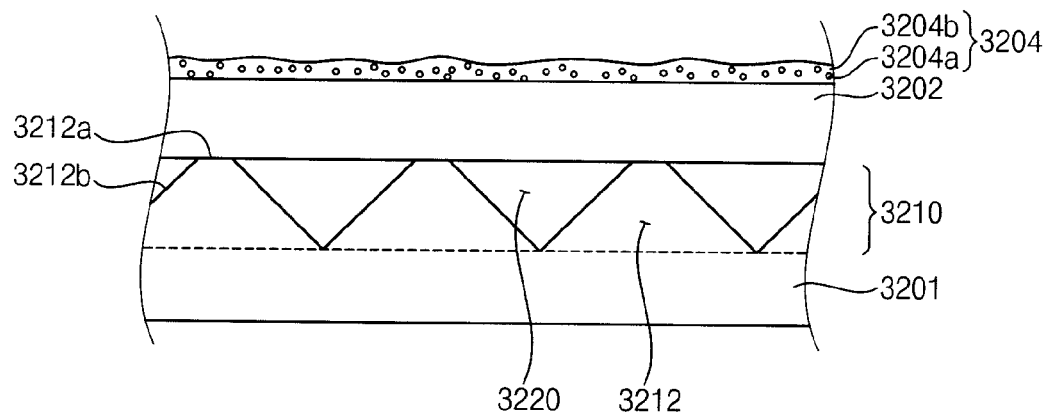
FIG. 68 is a cross-sectional view illustrating an optical sheet according to Example Embodiment 32 of the present invention.

FIG. 68 is a cross-sectional view illustrating an optical sheet according to Example Embodiment 32 of the present invention. In the present embodiment, the optical sheet is substantially the same as the optical sheet of FIGS. 46, 47, 48, 49, 50 and 51 except for a diffusion layer, and thus any further detailed descriptions concerning the same elements will be omitted.

Referring to FIG. 68, the optical sheet includes a first base film 3201, a temporary adhesive layer 3210, a second base film 3202 and a diffusion layer 3204.

The diffusion layer 3204 is attached on the second base film 3202 to include a plurality of diffusion particles 3204a and a resin 3204b. The resin 3204b attaches the diffusion particles 3204a on the second base film 3202. For example, the diffusion particles 3204a may include optically transparent particles having a refraction ratio that is different from that of the resin 3204b. The optically transparent particles may be air bubbles. In another embodiment, the diffusion particles 3202a may be disposed in the second base film 3202 or the first base film 3201.

According to the present embodiment as described above, the optical sheet includes the diffusion layer 3204, so that the luminance uniformity of an LCD device may be enhanced. Moreover, an additional diffusion sheet is omitted, so that an assembly process of the LCD device may be simple so that manufacturing costs thereof may be decreased.

Example Embodiment 33

Figure 69:
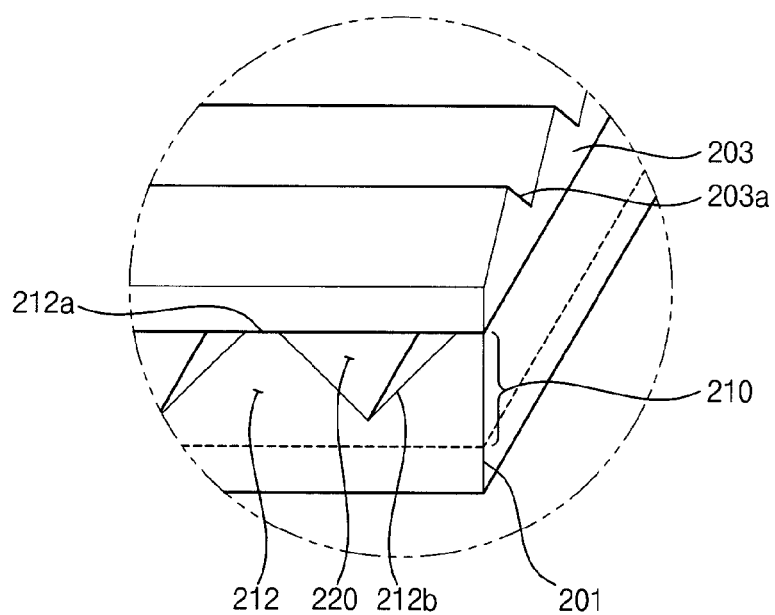
FIG. 69 is a perspective view illustrating an optical sheet according to Example Embodiment 33 of the present invention.

FIG. 69 is a perspective view illustrating an optical sheet according to Example Embodiment 33 of the present invention. In the present embodiment, the optical sheet is substantially the same as the optical sheet of Example Embodiment 9 except for an upper prism pattern, and thus any further detailed descriptions concerning the same elements will be omitted.

Referring to FIG. 69, the optical sheet includes a first base film 3201, an adhesive layer 3210 and a second base film 3203.

The second base film 3203 may have a film shape in which a plurality of prism patterns 3203a is formed thereon. The second film 3203 includes a transparent synthetic resin. For example, the synthetic resin may include polyethylene terephthalate (PET), methacrylic resin, an acrylic resin, polycarbonate (PC) resin, a polyester resin, a vinyl chloride resin, etc. In the present embodiment, the second base film 3203 includes polyethylene terephthalate (PET).

In the present embodiment, the prism patterns 3203a of the second base film 3203 are extended in a direction substantially perpendicular to prism patterns 3212 of the temporary adhesive layer 3210. In another embodiment, the prism patterns 3203a may have various shapes such as a horseshoe shape, a hemispherical shape, etc.

Example Embodiment 34

Figure 70:
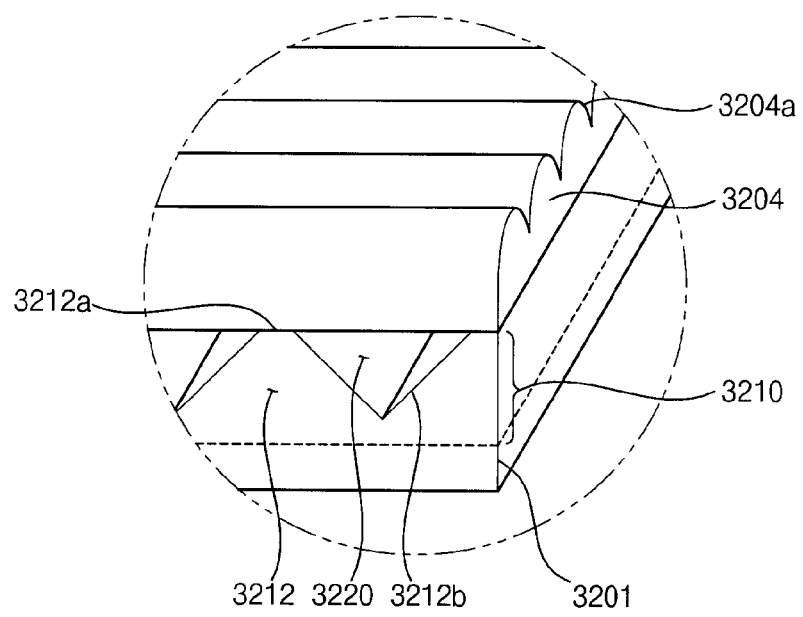
FIG. 70 is a perspective view illustrating an optical sheet according to Example Embodiment 34 of the present invention.

FIG. 70 is a perspective view illustrating an optical sheet according to Example Embodiment 34 of the present invention. In the present embodiment, the optical sheet is substantially the same as the optical sheet of FIG. 69 except for an upper diffusion pattern, and thus any further detailed descriptions concerning the same elements will be omitted.

Referring to FIG. 70, the optical sheet includes a first base film 3201, an adhesive layer 3210 and a second base film 3204.

The second base film 3204 may have a film shape which a plurality of upper diffusion patterns 3204a is formed thereon. In the present embodiment, the upper diffusion patterns 3204a have a cross-section of a horseshoe shape.

According to the present embodiment, front luminance may be enhanced by the air tunnels 3220 of the temporary adhesive layer 3210, and luminance uniformity may be enhanced by the upper diffusion patterns 3204a of the second base film 3204. Moreover, a viewing angle may be enhanced by the air tunnels 3220 and the upper diffusion patterns 3204a.

Example Embodiment 35

Figure 71:
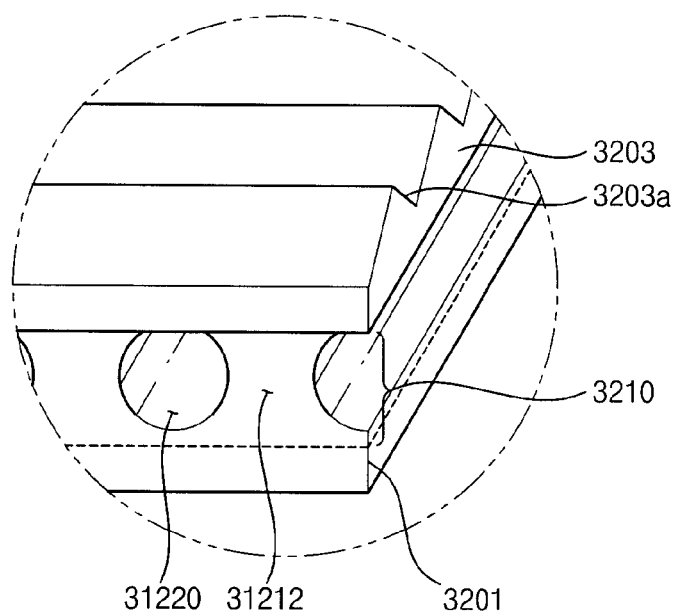
FIG. 71 is a perspective view illustrating an optical sheet according to Example Embodiment 35 of the present invention.

FIG. 71 is a perspective view illustrating an optical sheet according to Example Embodiment 35 of the present invention. In the present embodiment, the optical sheet is substantially the same as the optical sheet of FIG. 69 except for an adhesive layer, and thus any further detailed descriptions concerning the same elements will be omitted.

Referring to FIG. 71, the optical sheet includes a first base film 3201, an adhesive layer 31210 and a second base film 3203.

The temporary adhesive layer 31320 includes a plurality of grooves 31212 having a cross-section of a horseshoe shape. The temporary adhesive layer 31320 is coupled with the second base film 3203 to form a plurality of air tunnels 31220 having a cross-section of the horseshoe shape.

According to the present embodiment, luminance uniformity may be enhanced by the air tunnels 31220 of the temporary adhesive layer 3120, and front luminance may be enhanced by the prism patterns 3203a of the second base film 3203. Moreover, a viewing angle may be enhanced by the air tunnels 31220 and the prism patterns 3203a.

Example Embodiment 36

Figure 72:
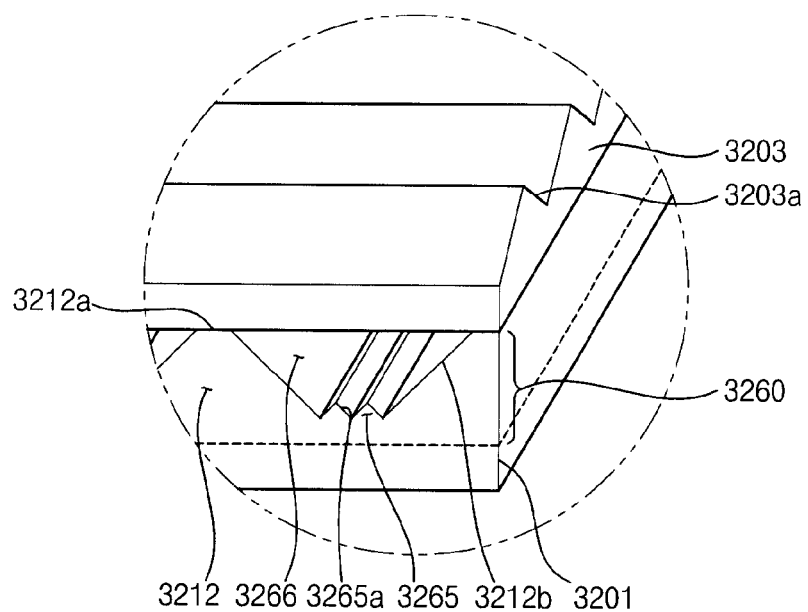
FIG. 72 is a perspective view illustrating an optical sheet according to Example Embodiment 36 of the present invention.

FIG. 72 is a perspective view illustrating an optical sheet according to Example Embodiment 36 of the present invention. In the present embodiment, the optical sheet is substantially the same as the optical sheet of FIG. 69 except for a temporary adhesive layer, and thus any further detailed descriptions concerning the same elements will be omitted.

Referring to FIG. 72, the optical sheet includes a first base film 3201, an adhesive layer 3260 and a second base film 3203.

The temporary layer 3260 is disposed on the first base film 3201 to include a plurality of prism patterns 3212 and an auxiliary optical portion 3265. The prism patterns 3212 are extended in a direction parallel with the first base film 3201 to have a cross-section of a trapezoidal shape in which an upper portion thereof is planar. The auxiliary optical portion 3265 is disposed between adjacent prism patterns 3212.

In the present embodiment, a plurality of auxiliary prism patterns 3265a is formed on the auxiliary optical portion 3265 to enhance the front luminance and viewing angle of light rays incident from a lower surface of optical sheet. In another embodiment, the auxiliary optical portion 3265 includes a plurality of protrusions, a plurality of recesses, etc., to enhance luminance uniformity of light rays incident from the lower surface of the optical sheet. For example, the protrusions or the recesses may have various shapes such as a hemispherical shape, a pyramid shape, etc.

Example Embodiment 37

Figure 73:
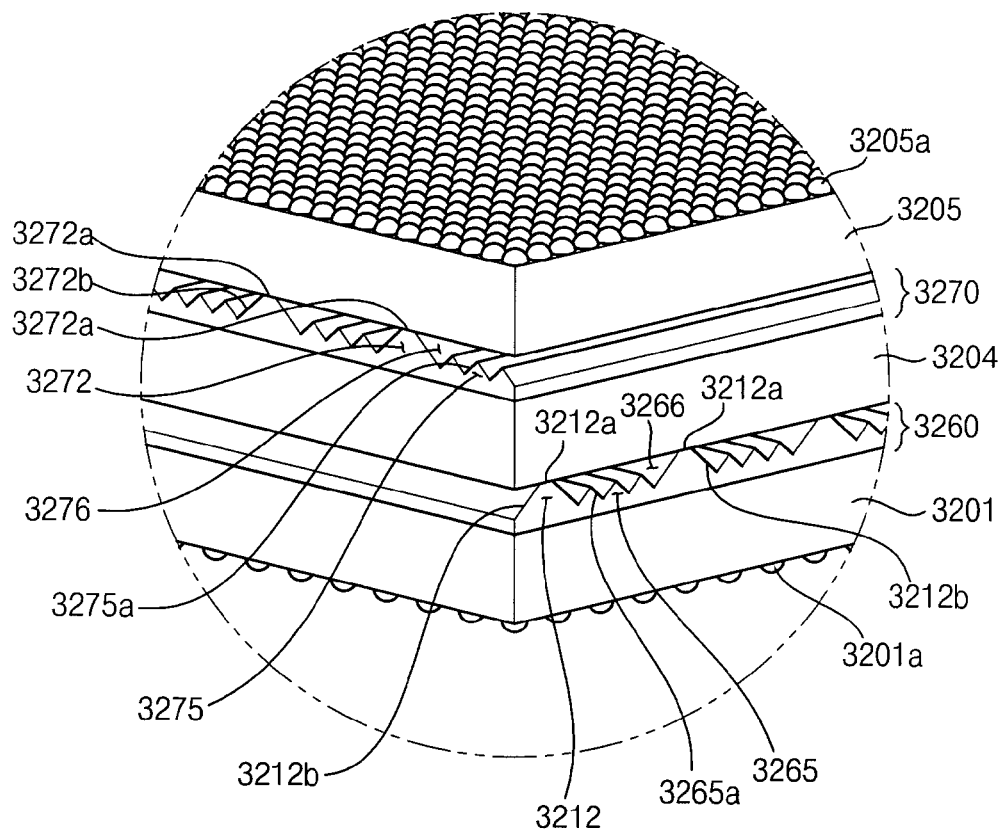
FIG. 73 is a perspective view illustrating an optical sheet according to Example Embodiment 37 of the present invention.
Figure 74:
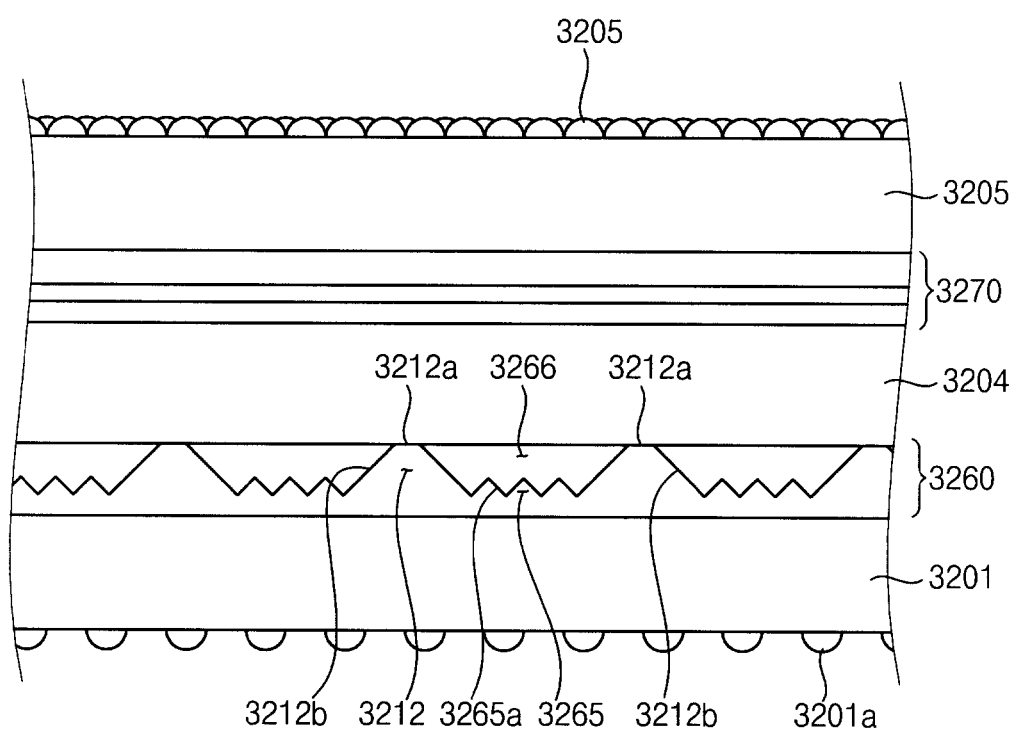
FIG. 74 is a cross-sectional view illustrating the optical sheet of FIG. 73.

FIG. 73 is a perspective view illustrating an optical sheet according to Example Embodiment 37 of the present invention. FIG. 74 is a cross-sectional view illustrating the optical sheet of FIG. 73.

Referring to FIGS. 73 and 74, the optical sheet 320 includes a first base film 3201, a first adhesive layer 3260, a second base film 3204, a second adhesive layer 3270 and a third base film 3205.

The first base film 3201 may have a film shape. The first base film 3201 may include a transparent synthetic resin. In the present embodiment, a plurality of first diffusion dots 3201a is formed on a lower surface of the first base film 3201. For example, the first diffusion dots 3201a may be spaced apart from each other. The first diffusion dots 3201a may enhance luminance uniformity of light incident from a lower surface of the optical sheet and may protect the first base film 3201 from physical impacts or scratches from an external side.

The first adhesive layer 3260 is disposed on the first base film 3201 to have an adhesion material. The first adhesive layer 3260 includes a plurality of prism patterns 3212 arranged in a direction parallel with each other and a first auxiliary optical portion 3265 disposed between adjacent first prism patterns 3212.

In the present embodiment, a plurality of first auxiliary prism patterns 3265a is formed on the first auxiliary optical portion 3265 to firstly enhance the front luminance and viewing angle of light rays incident from a lower surface of the optical sheet. In another embodiment, the first auxiliary optical portion 3265 may include a plurality of recesses, a plurality of protrusions, a plurality of half-circular shape cylinders, etc.

The second base film 3204 is temporarily adhered to a contact portion 3212a of the first prism patterns 3212 of the first temporary adhesive layer 3260 to form a plurality of air tunnels 3266 between first grooves 3212b of the first prism patterns 3212, the first auxiliary optical portion 3265 and a lower surface of the second base film 3204. The first grooves 3212b define a plurality of side surfaces of the first air tunnels 3266, the lower surface of the second base film 3204 defines an upper surface of the first air tunnels 3266, and the first auxiliary optical portion 3265 defines a lower surface of the first air tunnels 3266.

The temporary adhesive layer 3270 is disposed on the second base film 3204 to include a plurality of second prism patterns 3272 and a second auxiliary optical portion 3275. The second prism patterns 3272 are arranged in directions parallel to each other. The second auxiliary optical portion 3275 is disposed between adjacent second prism patterns 3272. In the present embodiment, an extension direction of the first prism patterns 3212 may be substantially perpendicular to that of the second prism patterns 3272. In another embodiment, the first prism patterns 3212 and the second prism patterns 3272 may be extended in an identical direction, an opposite direction, a direction forming an acute angle, etc. The second temporary adhesive layer 3270 includes a temporary adhesive material.

The present embodiment, a plurality of second auxiliary prism patterns 3275a is formed on the second auxiliary optical portion 3275 to secondly enhance the front luminance and viewing angle of light rays incident from a lower surface of the second base film 3204. In another embodiment, the second auxiliary optical portion 3275 may include a plurality of recesses, a plurality of protrusions, a plurality of half-circular shape cylinders, etc.

The third base film 3205 is temporarily adhered to a contact portion 3272a of the second prism patterns 3272 of the second temporary adhesive layer 3270 to form a plurality of air tunnels 3276 between second grooves 3272b of the second prism patterns 3272, the second auxiliary optical portion 3275 and a lower surface of the third base film 3205. The second grooves 3272b define a plurality of side surfaces of the second air tunnels 3276, the lower surface of the third base film 3205 defines an upper surface of the second air tunnels 3276, and the second auxiliary optical portion 3275 defines a lower surface of the second air tunnels 3276.

In the present embodiment, a plurality of second diffusion dots 3205a is formed on the third base film 3205. For example, the second diffusion dots 3205a may be disposed to be adjacent to each other. The second diffusion dots 3205a may enhance luminance uniformity of light incident from a lower surface of the third base film 3205 and may protect the third base film 3205 from physical impacts or scratches from an external side.

When a prism pattern of an optical sheet is exposed, a protection tape of high costs has been required in order to protect the prism pattern during transportation. Particularly, when the protection tapes are attached in two sides of the optical sheet, costs of transport may be greatly increased. In addition, the protection tape may not be easily separated from the optical sheet during assembly of a backlight assembly, so that the optical sheet may be damaged due to static electricity, external impacts, etc. However, in the present embodiment, the first temporary adhesive layer 3260 and the second temporary adhesive layer 3270 are protected by the first base film 3201 and the third base film 3205, respectively, so that the optical sheet may be easily transported without an additional protection tape. In addition, resistance to external scratches may be increased due to the first dot patterns 3201a and the second dot patterns 3205a.

In the present embodiment, a density of the first dot patterns 3201e is smaller than that of the second dot patterns 3205e. Alternatively, a density of the first dot patterns 3201a is equal to or greater than that of the second dot patterns 3205e.

Also, when an optical sheet includes only one base film, the thickness of the base film is increased to protect the optical sheet from external impacts. Thus, when a prism assembly including a plurality of optical sheets is used, the thickness of each optical sheet is increased so that the thickness of an entire optical sheet assembly may be increased. However, a plurality of base films 3201, 3204 and 3205 are laminated to form one optical sheet in accordance with the present embodiment, resistance to external impacts may be increased due to a complex function of the base films 3201, 3204 and 3205 even though the thickness of the base films 3201, 3204 and 3205 is decreased. Therefore, the total thickness of an optical sheet may be decreased.

As described above, according to the present invention, an optical sheet includes a temporary adhesive layer, so that defects due to external impacts may be easily repaired. Moreover, a temporary adhesive pattern according to the present invention maintains an active combination state, so that resistance to external impacts may be enhanced.

Moreover, the optical sheet includes a diffusion portion or an air capsule, so that the luminance uniformity of an LCD device may be enhanced.

Furthermore, the display quality of a display device may be improved through enhanced luminance, viewing angle, etc., and the thickness of a backlight assembly or the LCD device may be decreased so that the display device may be manufactured in a slim form.

Moreover, the manufacturing process of the optical sheet having a complex function may be simple, so that the defect rate of the optical sheet may be decreased so that manufacturing costs of the optical sheet may be decreased.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. An optical sheet disposed on a light guide plate of a backlight assembly, comprising:
   a base film in which light is incident from a lower side;
   a plurality of prism patterns protruded to be spaced apart from each other by a predetermined interval on a first surface of the base film to enhance the front luminance of light incident from the lower side of the base film; and
   a diffusion member disposed between the adjacent prism patterns disposed on the first surface of the base film to have a diffusion surface in parallel with the base film, the diffusion member comprising a plurality of diffusion dots capable of enhancing the luminance uniformity of light incident from the lower side of the base film, wherein scratches or cracks are formed on a surface of each of the prism patterns and a surface of the diffusion dots to enhance luminance uniformity, a viewing angle and a half-power angle of the optical sheet.

2. The optical sheet of claim 1, wherein each of the diffusion dots comprises a recess formed thereon.

3. The optical sheet of claim 2, wherein the recess comprises a hemispherical shape, an elliptical hemisphere shape or a polygonal pyramid shape.

4. The optical sheet of claim 1, wherein each of the diffusion dots comprises a protrusion portion.

5. The optical sheet of claim 4, wherein the protrusion portion comprises a hemispherical shape, an elliptical hemisphere shape or a polygonal pyramid shape.

6. The optical sheet of claim 1, wherein a material of the diffusion member is the same as that of the prism patterns.

7. The optical sheet of claim 1, wherein the height of the diffusion surface is lower than that of the prism patterns.

8. The optical sheet of claim 1, further comprising:
   an auxiliary diffusion member disposed within an auxiliary diffusion area defined between a diffusion area corresponding to the diffusion member and a prism area corresponding to the prism patterns to have an identical material of the prism patterns and the diffusion member, and integrally formed with the prism patterns and the diffusion member to refract or reflect light incident thereto.

9. The optical sheet of claim 8, wherein the auxiliary diffusion member has a curved surface shape extended in a direction parallel with the prism patterns.

10. The optical sheet of claim 1, wherein each of the prism patterns has a cross-sectional shape of three to thirty-two sides.

11. The optical sheet of claim 10, wherein a lower side of each of the prism pattern has a trapezoidal shape, a pentagonal shape or a heptagonal shape in parallel with the base film.

12. The optical sheet of claim 10, wherein a cross-section of each of the prism patterns is an isosceles triangle shape, and a vertex of the isosceles triangle shape is about 1 degree to about 179 degrees.

13. The optical sheet of claim 1, wherein centers of adjacent diffusion dots are arranged in a triangular shape when viewed from a plan view.

14. The optical sheet of claim 1, wherein centers of adjacent diffusion dots are arranged in a rectangular shape when viewed from a plan view.

* * * * *